(12) United States Patent
Fisher et al.

(10) Patent No.: US 8,639,719 B2
(45) Date of Patent: Jan. 28, 2014

(54) SYSTEM AND METHOD FOR METADATA CAPTURE, EXTRACTION AND ANALYSIS

(76) Inventors: Paul Tepper Fisher, Brooklyn, NY (US); Zeeshan Hussain Zaidi, Princeton, NJ (US)

( * ) Notice: Subject to any disclaimer, the term of this patent is extended or adjusted under 35 U.S.C. 154(b) by 52 days.

(21) Appl. No.: 13/364,487

(22) Filed: Feb. 2, 2012

(65) Prior Publication Data
US 2013/0036117 A1      Feb. 7, 2013

Related U.S. Application Data

(60) Provisional application No. 61/438,841, filed on Feb. 2, 2011.

(51) Int. Cl.
*G06F 7/00* (2006.01)
*G06F 17/30* (2006.01)

(52) U.S. Cl.
USPC .......................................................... 707/776

(58) Field of Classification Search
None
See application file for complete search history.

(56) References Cited

U.S. PATENT DOCUMENTS 6,833,865 B1 * 12/2004 Fuller et al. ................. 348/231.2
2012/0191716 A1 * 7/2012 Omoigui ....................... 707/740

* cited by examiner

*Primary Examiner* — Uyen Le
(74) *Attorney, Agent, or Firm* — Lando & Anastasi LLP

(57) ABSTRACT

System and methods are provided that enable a data and information repository with a semantic engine that enables users to easily capture information in various formats from various devices along with rich metadata relating to that information. The information repository can be configured to query the captured information and any metadata to extrapolate new meaning, including semantic meaning, and to perform various tasks, including but not limited to sharing of the information and metadata. In some embodiments, the information repository is configured to generate recommendations to users based on analysis of the captured information.

36 Claims, 47 Drawing Sheets

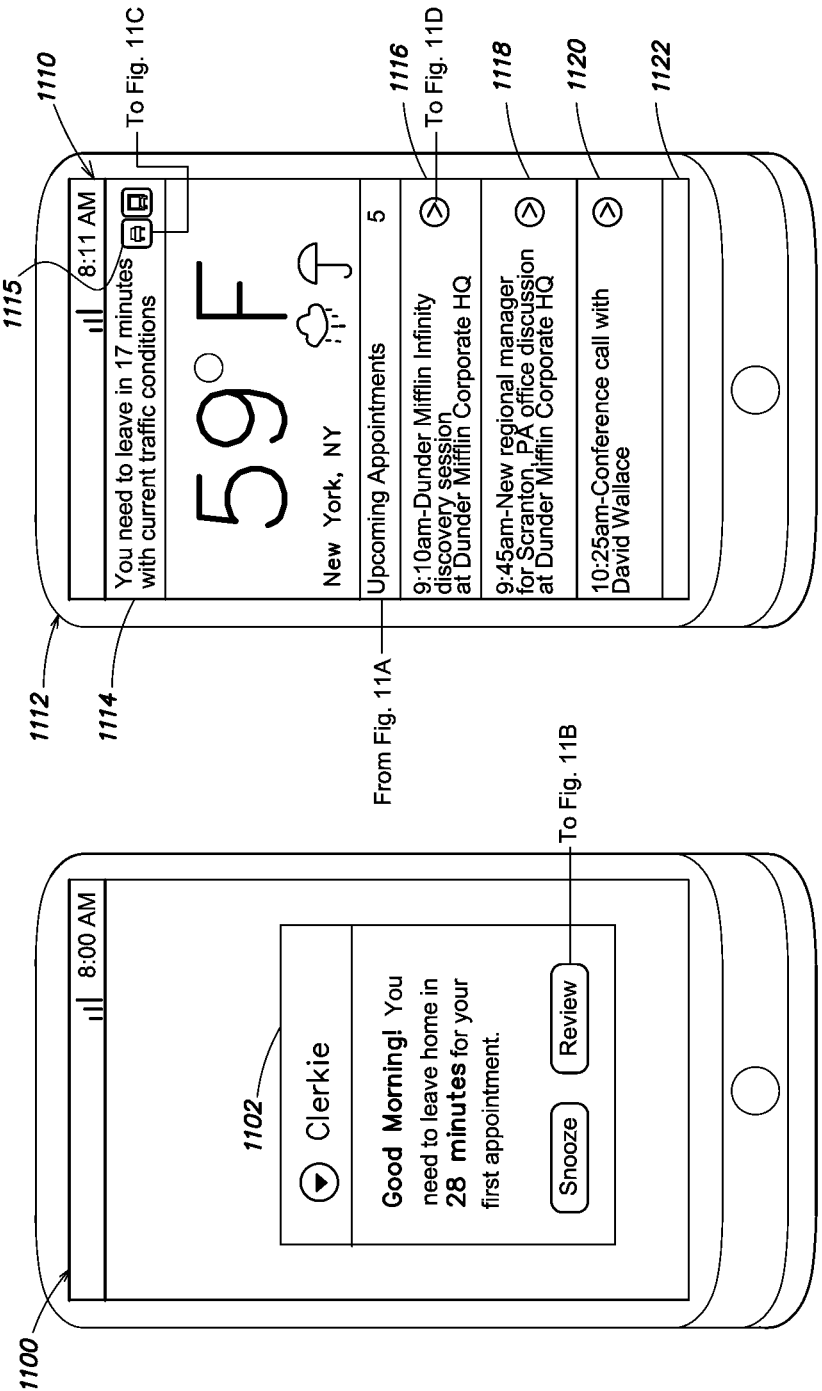

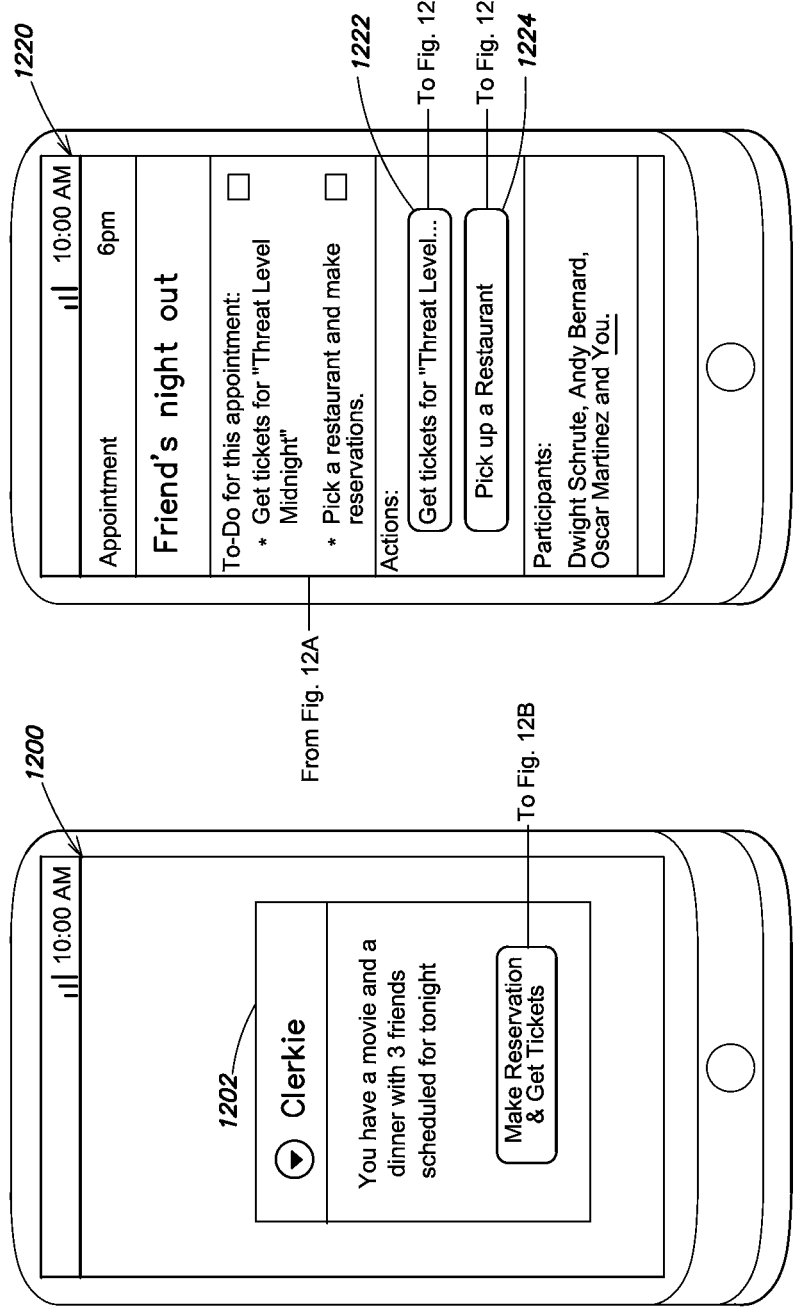

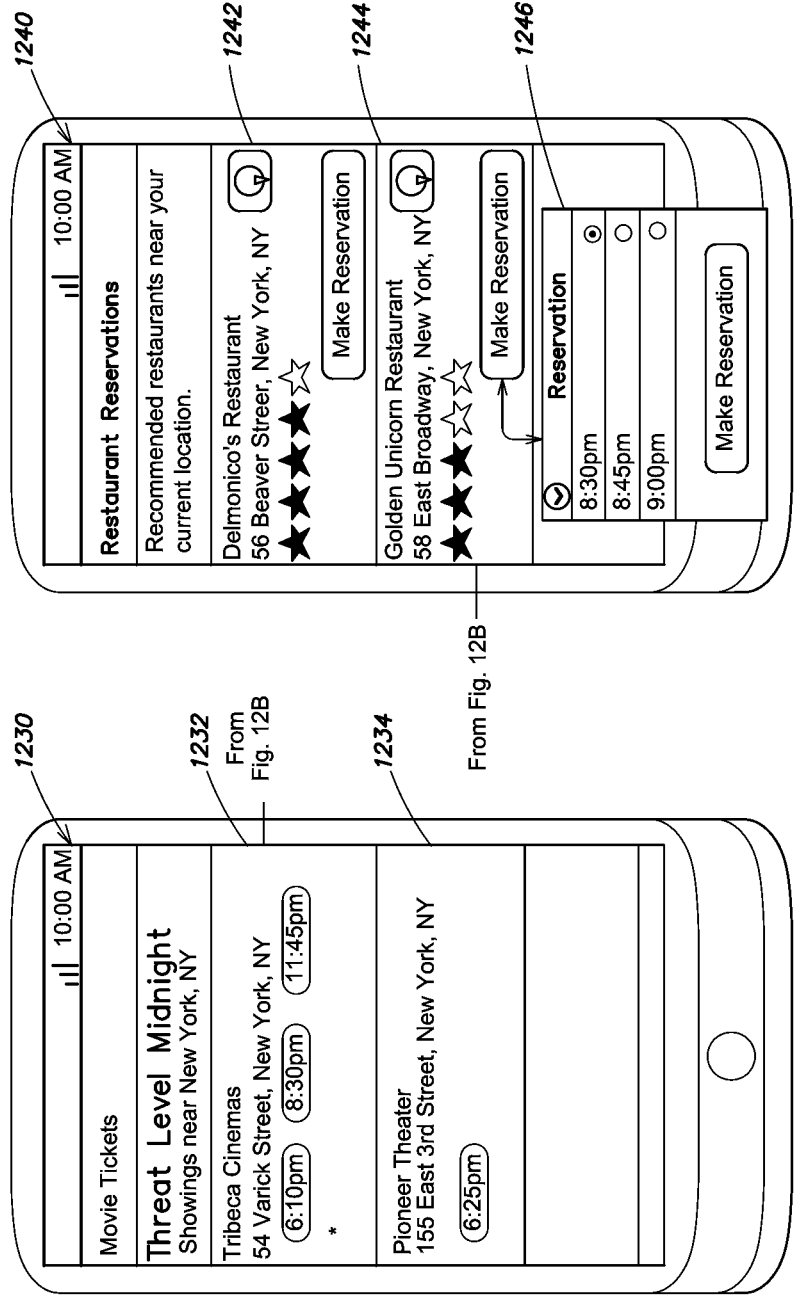

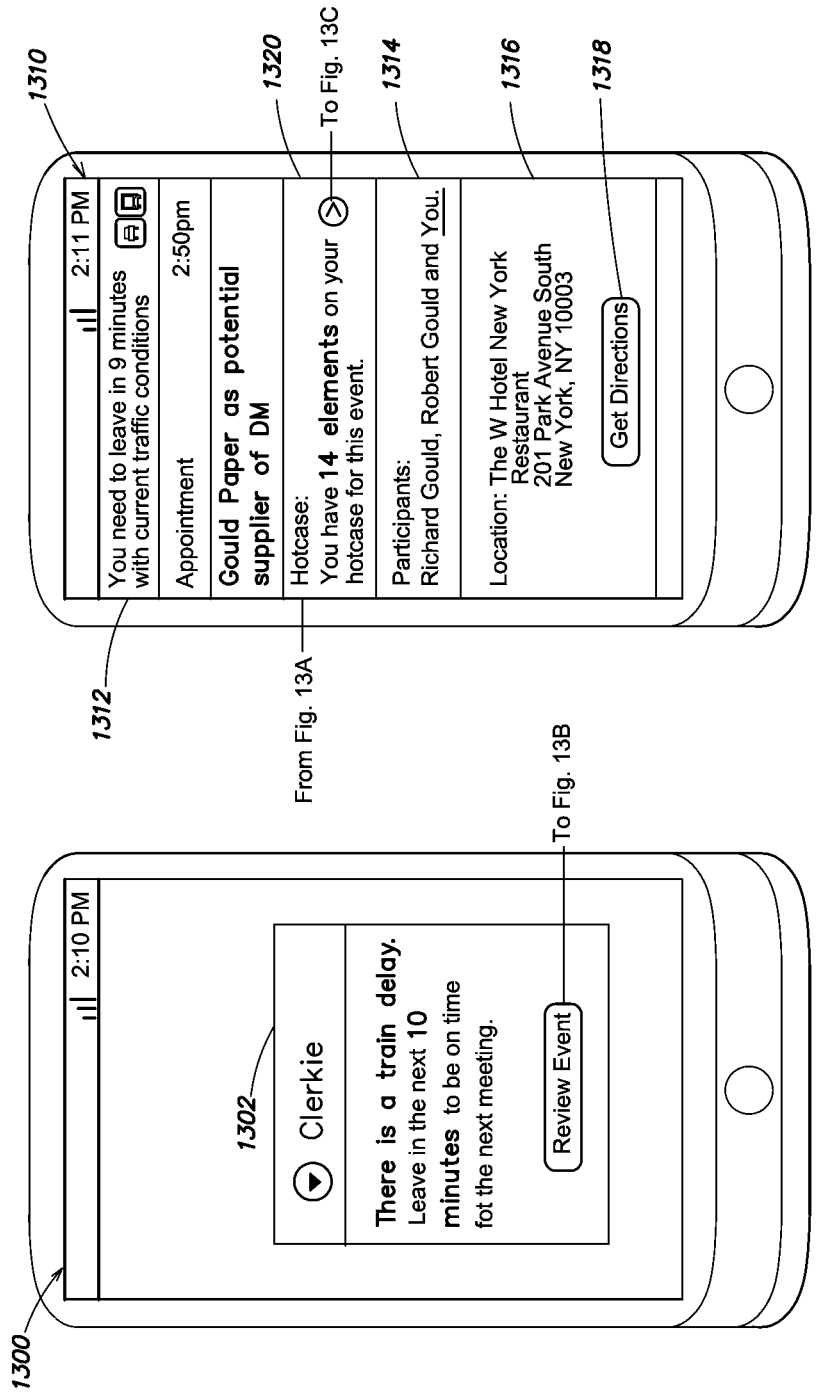

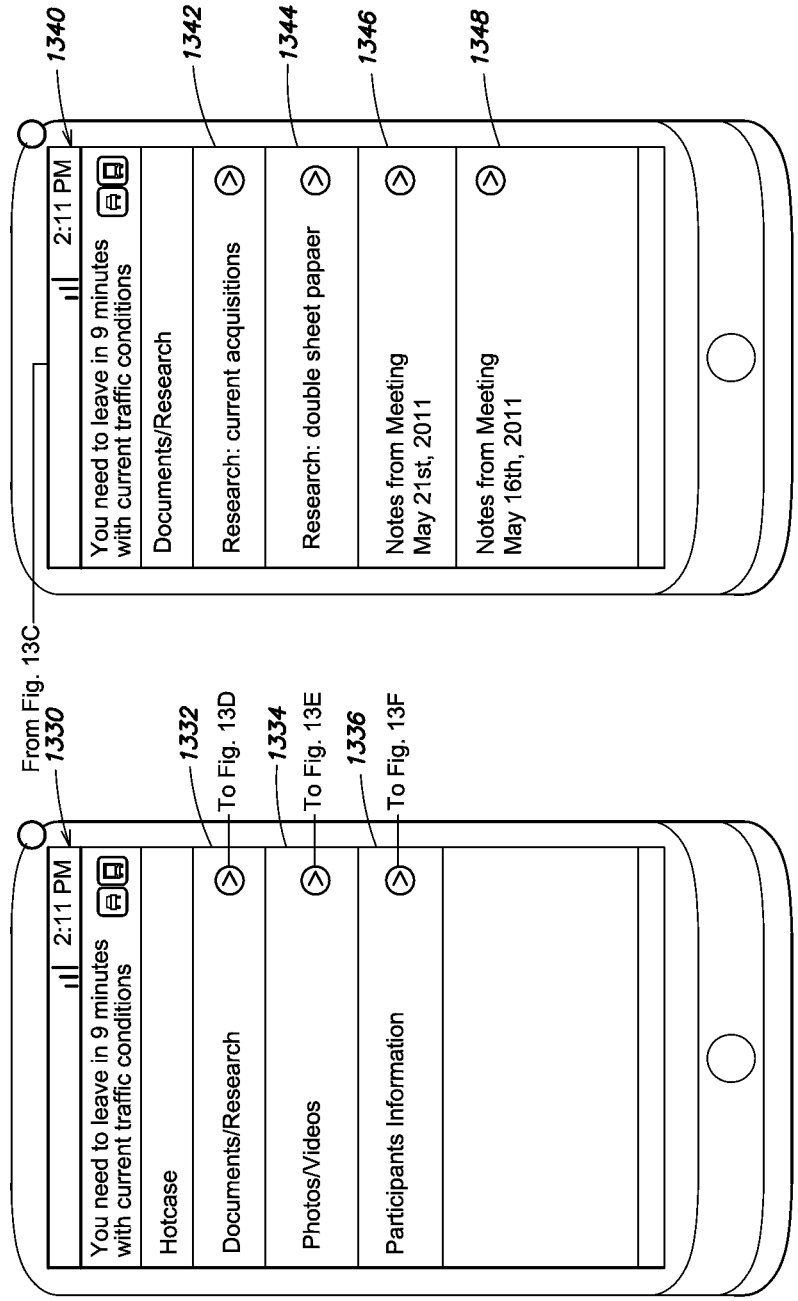

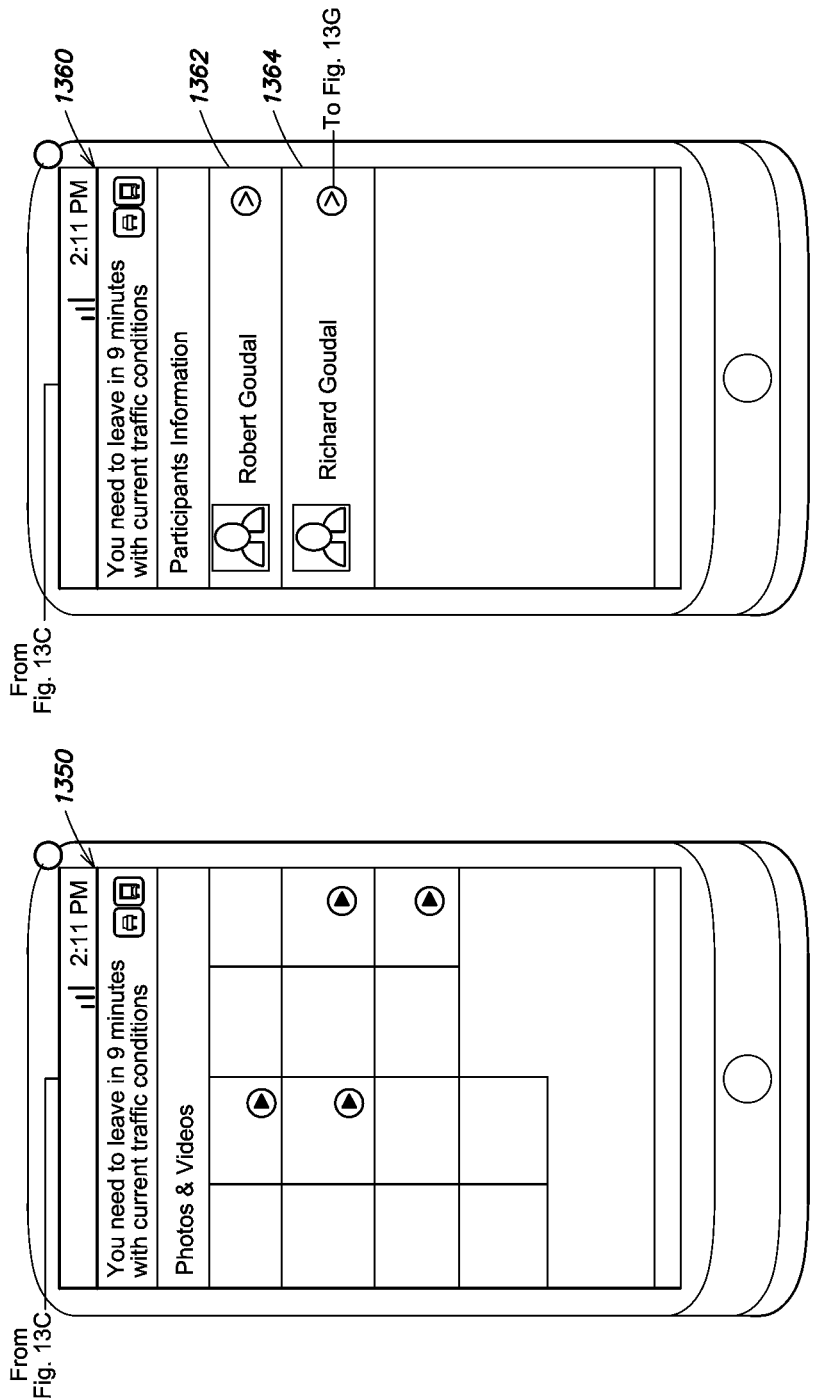

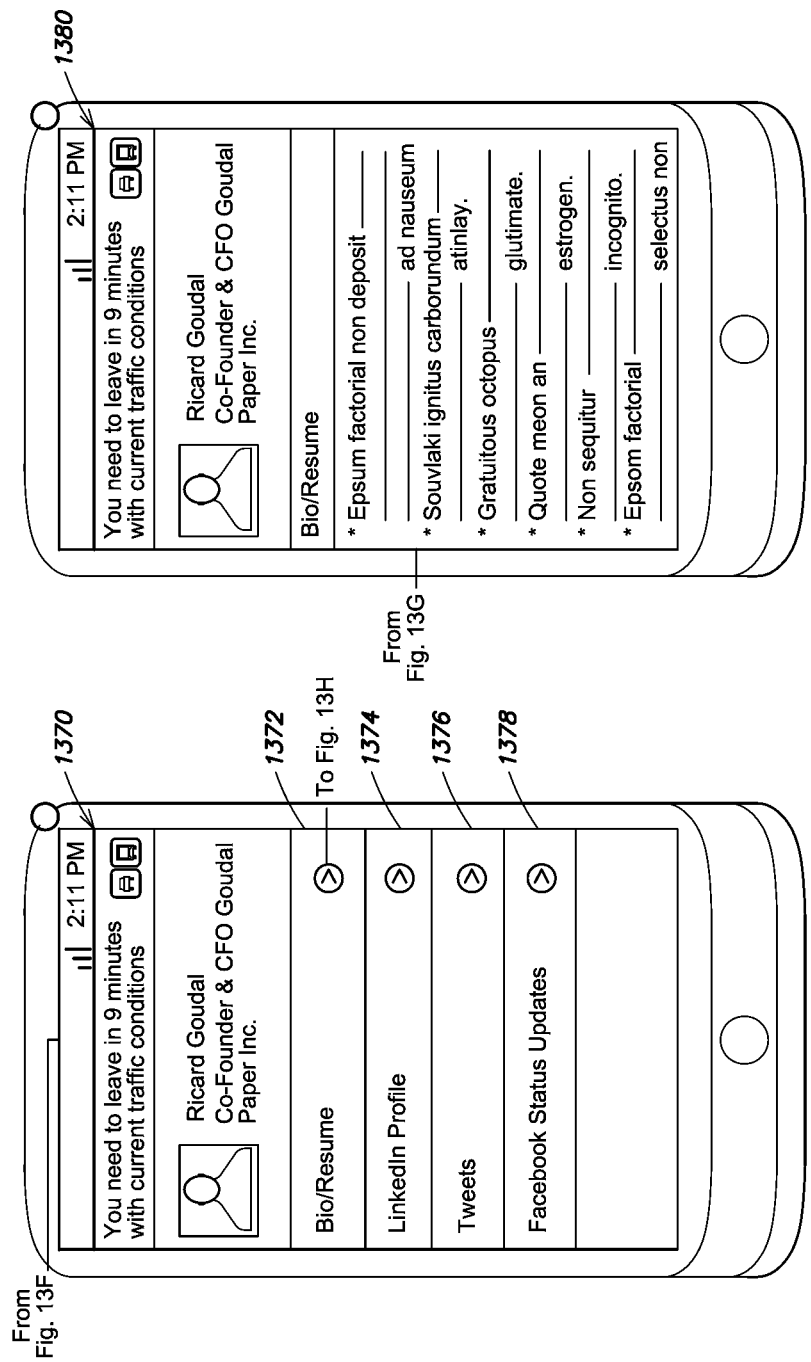

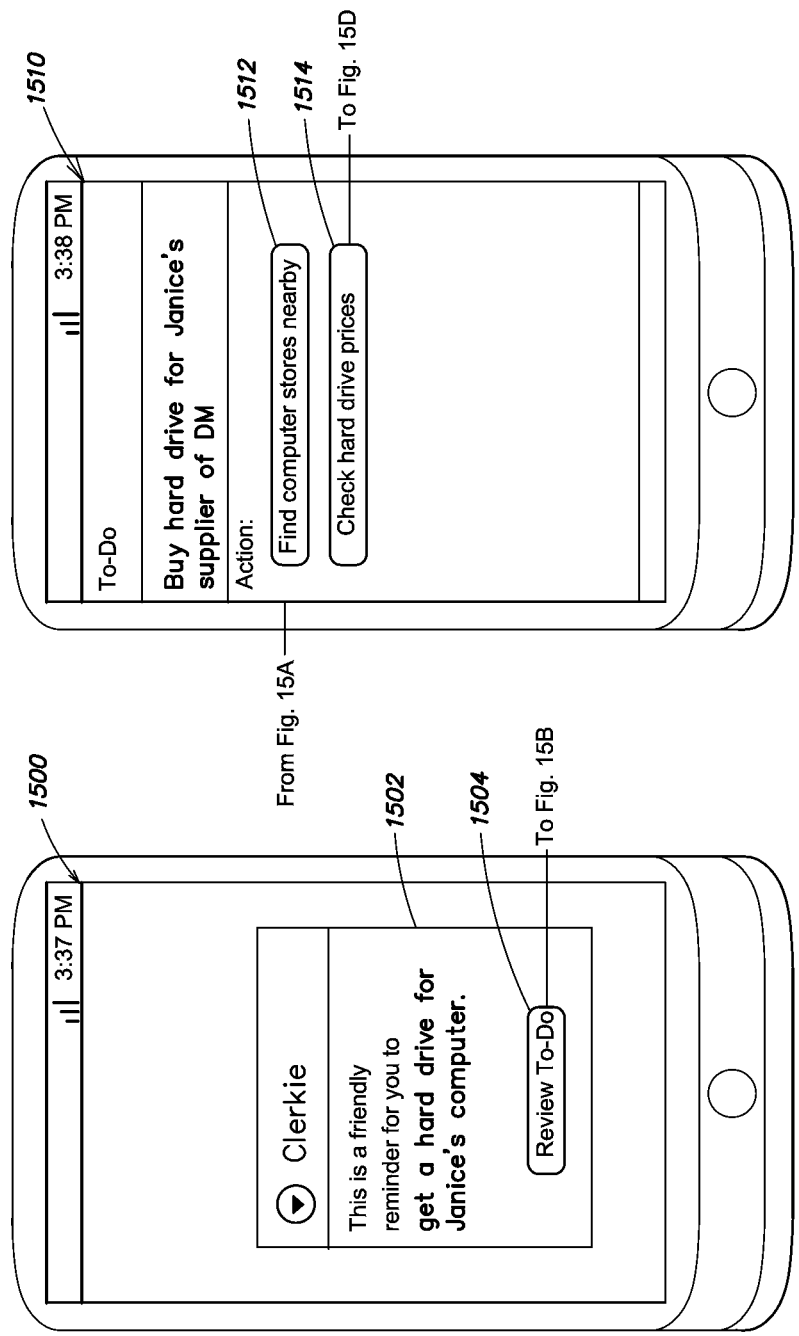

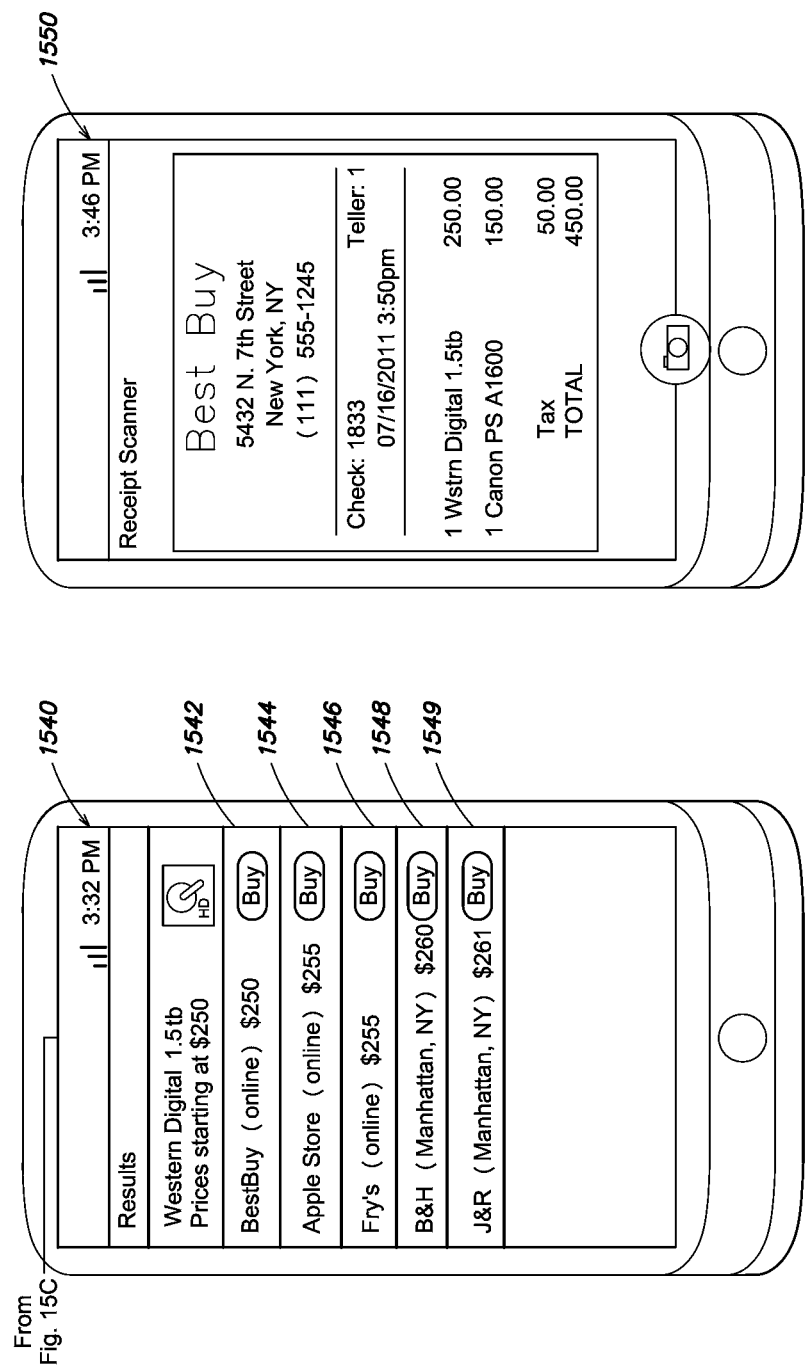

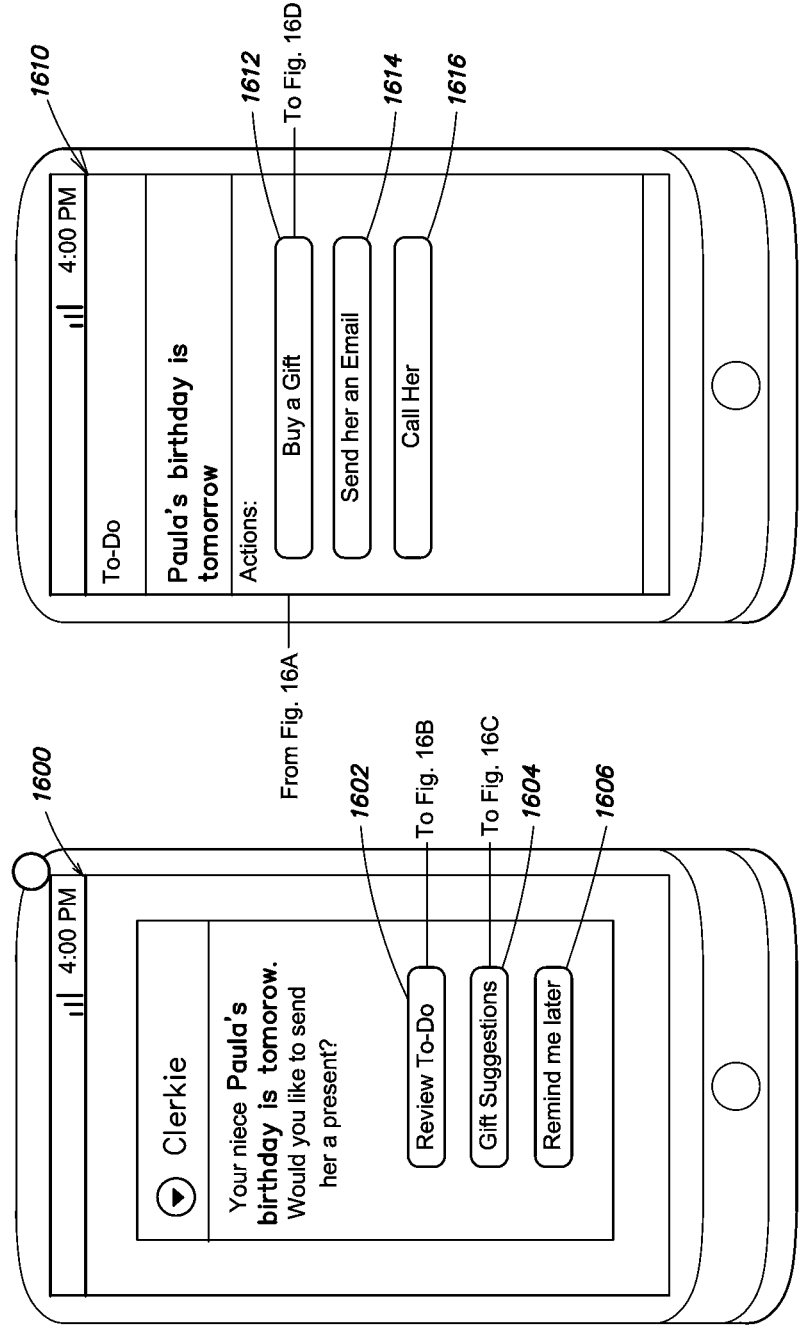

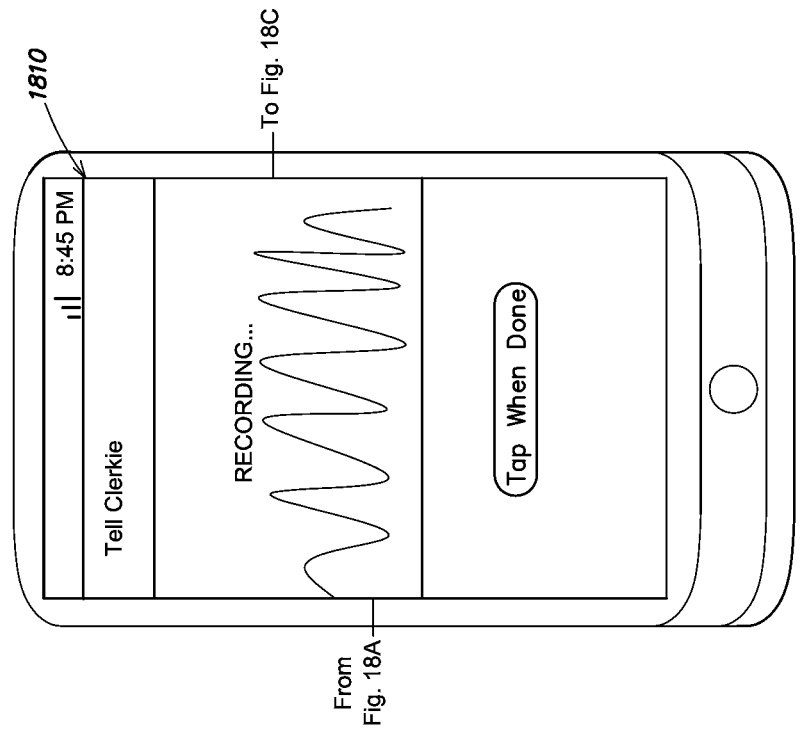
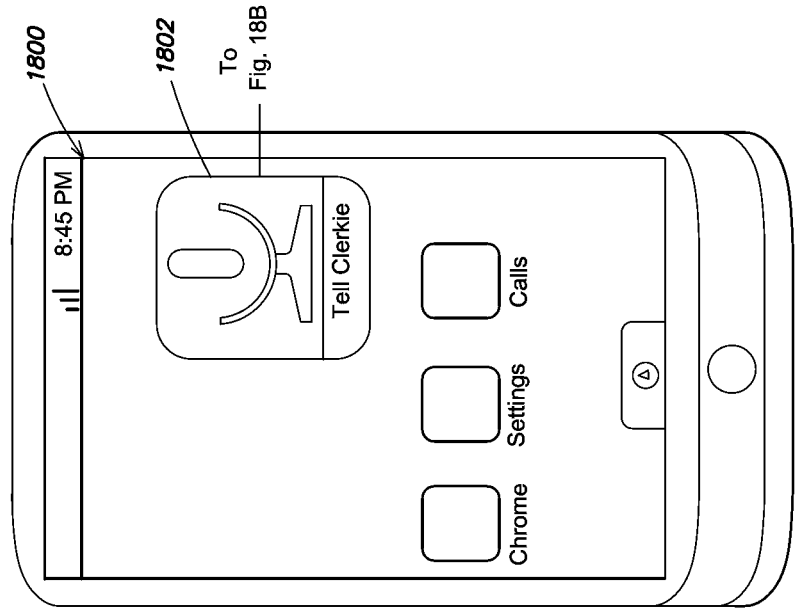
FIG. 18B
FIG. 18A

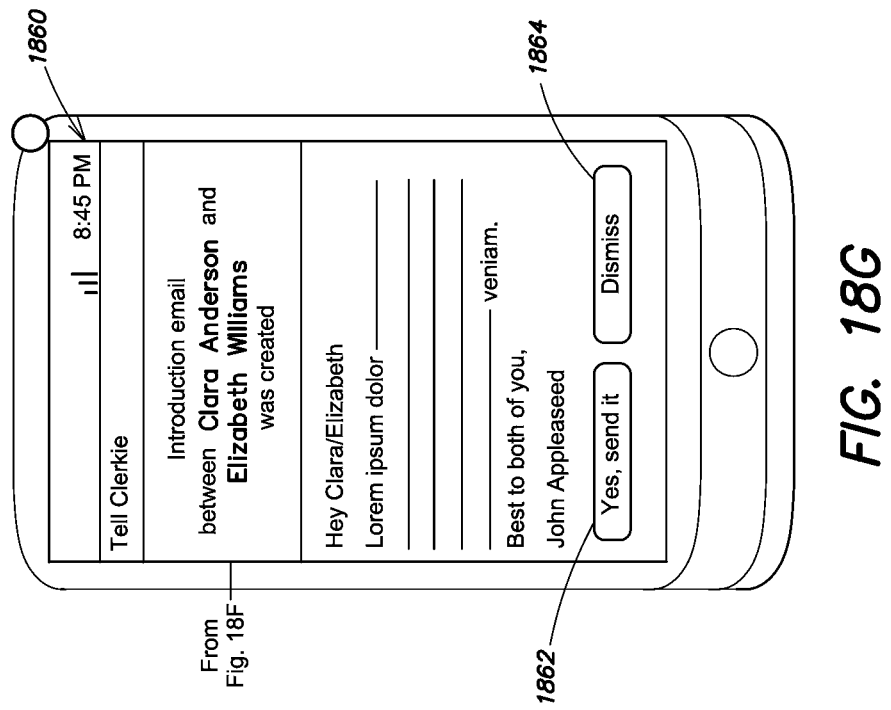

SYSTEM AND METHOD FOR METADATA CAPTURE, EXTRACTION AND ANALYSIS

RELATED APPLICATIONS

This application claims priority under 35 U.S.C. §119(e) to U.S. Provisional Application Ser. No. 61/438,841 entitled "SYSTEM AND METHOD FOR METADATA CAPTURE, EXTRACTION, AND ANALYSIS," filed on Feb. 2, 2011, which is incorporated herein by reference in its entirety.

BACKGROUND

Tim Berners-Lee, the inventor of the World Wide Web, coined the phrase the "Semantic Web" in the late 1990s, to describe "a web of data that can be processed directly and indirectly by machines." He believed this was the next step in the evolution of the World Wide Web from its current existence as a "web of documents" that cannot be processed directly by machines. However, the transition from the current World Wide Web to Semantic Web is not guaranteed and depends on many major development efforts—both individual and coordinated among multiple entities.

The first is the creation and availability of metadata about the information contained in documents and datasets that reside in public and private locations on the internet. Markup languages that are currently in use, like hypertext markup language (html), only recognize the existence of data but not the meaning behind the data. However, if data were identified through accompanying metadata as being, for example, calendar data, financial data, or other specific types of data, then machines could recognize the categorized data as such and could then perform tasks and queries that currently require human intelligence and action.

The second requirement is the adoption of open formats and standards for marking up metadata. The vision of the Semantic Web will only be achieved if users create metadata with the same open standards, so that machines can communicate with one another easily. The third is the creation of structured hierarchies of semantic information (ontologies), as well as the publishing of large sets of data, made available in publicly accessible, and queryable, repositories.

If all of this were to take place on a mass scale throughout the internet, software programs could analyze and combine information, generate meaningful analysis, and perform many tasks that currently require human intelligence and effort. For example, if all golf courses were to make their tee-time schedules available publicly in a common, open calendar standard, then a user could perform a single query that searched the calendars of all nearby courses for available tee times, and cross-check this information with the user's personal calendar, and automatically make a reservation.

There have been some pockets of limited progress in these regards. Some national and local governments are making certain repositories of data available in usable formats. There is also some progress in the private sector—for example, XBRL is a markup language that has been widely adopted to enhance financial data.

However, for the most part, from the perspective of individual users, there has been little progress toward creating a semantic-enabled, intelligent experience of the type described in the example above. Given the slow pace of evolution, this is likely to be many years away.

SUMMARY

Against the backdrop of the indefinitely delayed arrival of the Semantic Web, various aspects of the present invention, in broad overview, allow for the creation—from the ground up—of a semantic-enabled experience for individuals without depending on progress across the broader Semantic Web. Instead, the invention enables users to easily capture data and information from and about their personal lives, including metadata associated with that information. Users can connect captured information with existing repositories of their personal data that they control, as well as any existing public semantic data repositories, and perform semantic queries.

Users are able to receive recommendations on the basis of their connected data, including delivery of alerts regarding their next morning meeting, an alarm automatically set to insure timeliness for the meeting, a change in the meeting's location, directions to the new location, and warnings on when the user needs to leave their house to arrive at the meeting on time. Further, various systems and methods can already have captured the power point document being presented at the morning meeting, for example, based on semantic discovery of the topic of the meeting and associations made by the system to user e-mails received, including the power point presentation. In some embodiments, systems and methods can predict semantic meaning and/or context for a user's events, actions, and needs and deliver recommendations and/or prepare for the user's needs based on semantic data captured by or for the user about the user and their information space.

Various aspects of the invention relate to the semantic web, and more particularly, but not exclusively to a personal data and information repository with a semantic engine that enables a user to easily capture information in various formats from various devices along with rich metadata relating to that information. The information repository is configured to query the captured information and any metadata to extrapolate new meaning, including semantic meaning, and to perform various tasks, including, but not limited to sharing that information and metadata. In some embodiments, the information repository is configured to generate recommendations to a user based on analysis of the captured information.

Recommendations can identify, evaluate, and predict user events, for example, throughout the user's day. The identification, evaluation, and prediction of users events incorporate various related information sources including semantic data to provide comprehensive recommendations. Comprehensive recommendations can include identification of sub-tasks within events, required materials to complete tasks, sub-tasks, etc., and reminders/recommendations can be displayed to a user accordingly.

In some examples, setting a business meeting with George in your calendar for tomorrow can include automatic identification of the document you and George are meeting to discuss, a reminder that Jill was working with you and George on drafting the document, directions to the location of the meeting with an alarm set to get you there on time, via your preferred mode of travel, with updates delivered up until the meeting on specific traffic conditions to expect or delays/scheduling of the public transportation you plan on taking.

Further, any information captured during the meeting can be augmented with any or all of the contextual data identified above, including for example, work meeting; topic—legal document; meeting with George and Jill; location: George's office building; preferred mode of travel—bus; traffic conditions on way to meeting including time; among other examples. These contexts and any augmented data can be used to drive further recommendations and/or provide access to more information on which to augment data captures. In some embodiments, the recursive nature of data capture, analysis, augmentation, and/or recommendation can achieve the semantic network of connected data necessary to implement a truly semantic web that can be processed entirely by machines both directly and indirectly.

According to another aspect, information capture and analysis is performed by the system recursively. According to some embodiments, the system executes cycles of semantic analysis, metadata extraction, and augmentation in a recursive manner. For example, if a user captures a digital photograph of a whiteboard illustration during a meeting with four of his colleagues, OCR (optical character recognition) can be performed on the whiteboard photo in order to extract relevant textual elements. In turn, the derived textual elements can also be analyzed as well. The information captured and the derived information can be analyzed to extract relevant semantic ontologies, tags, and keywords.

Additionally, the other attendees at the meeting can also be analyzed by the system automatically to identify addition information to process for extracting relevant semantic ontologies, tags, and keywords. For example, prior meetings between the same attendees can be identified. The captured content, the context, and any associated information from these meetings can then be processed during the analysis as well. In some embodiments, processing prior meetings and information available and/or captured from the prior meetings allows the system to extract, for example, the captured notes from each of the attendees for each of the previous meetings in which the same key topics were discussed. In some embodiments, the system can be configured to perform similarity or relevance analysis on topics, subject lines, captured text, etc., to determine that the key topics discovered from other meetings are similar or relevant to the current meeting.

In one embodiment, the processing can continue, pulling in relevant sources from users' social networks, email threads in which keywords derived from an earlier "analysis cycle" appear, etc. In other embodiments, the system can perform the analysis based on keywords or other information, and can further be configured to identify information to capture for analysis based on similarity determinations made on the keywords or other information.

According to another aspect, system executed analysis and extraction processing can be executed recursively. The results of the information capture and analysis can be used in the next capture and analysis execution. In some examples, the system obtains results and analyzes those results in subsequent information capture and analysis events. In one embodiments, the system enables processing of the results derived from one level into any data captured during the procession of the input of a next level of capture and analysis. Thus, the system can be configured to build upon the result returned from any capture and analysis execution by augmenting subsequent data capture. In turn the system can augment the prior results returned from previous captures. The information repository is configured to generate newly discovered intelligence and more widely linked range of data sources, for example, by coupling capture and analysis from previously persisted and indexed data analyses, as well as external data sources that may take the form of social networks, APIs (application protocol interface), email, etc.

According to one aspect of the present invention, a system for facilitating metadata capture and analysis is provided. The system comprises at least one processor operatively connected to a memory, the processor is configured to execute a plurality of system components, the plurality of system components comprising a communication component configured to receive an information capture event, wherein the information capture event includes a captured content item and content metadata, an analysis component configured to determine semantic information for the captured content item, wherein the semantic information for the captured content item includes a context associated with the captured content item, a discovery component configured to discover any associated information for the information capture event, and an association component configured to store the content item and relationships between any discovered associated information. According to one embodiment of the present invention, the association component is further configured store to the relationship to any respective associated information as at least one semantic entity. According to another embodiment of the invention, the association component is further configured to store the at least one semantic entity as at least a data triple, wherein the data triple defines an object, predicate, object stored as URI or literal values. According to another embodiment of the invention, the plurality of system components further comprises an extraction component configured to extract additional metadata from the captured content item.

According to one embodiment of the present invention, the extraction component is further configured to process the captured content item based on a content type. According to another embodiment of the present invention, the content type includes at least one of illustration, notes, document, business card, meeting audio, and user defined. According to another embodiment of the invention, the discovery component is further configured to discover any associated information for the information capture event based on the extracted additional metadata. According to another embodiment of the invention, the system further comprises a prediction component configured to predict at least one possible context for an information capture event. According to another embodiment of the invention, the prediction component is further configured to predict the at least one possible context in response to received location information. According to another embodiment of the invention, the communication component is further configured to communicate a possible context for the information capture event to a user.

According to one embodiment of the present invention, the communication component is further configured to receive a selection of the possible context from a user. According to another embodiment of the present invention, the analysis component is further configured to determine the context of an information capture event in response to user input. According to another embodiment of the invention, the analysis component is further configured to determine a semantic entity type for the captured content item. According to another embodiment of the invention, the system further comprises a recommendation component configured to generate recommendations. According to another embodiment of the invention, the recommendation component is further configured to identify user events and associated information for the user events. According to another embodiment of the invention, the recommendation component is further configured to generate the recommendations based, at least in part, on identified semantic connections between the user event and associated information. According to another embodiment of the invention, the recommendation component automatically determines a mode of travel for the user event based, at least in part, on identified semantic connections.

According to one embodiment of the present invention, the recommendation component automatically determines a required departure time for the user event based, at least in part, on the mode of travel, current location, and if required traffic conditions. According to another embodiment of the invention, the recommendation component is further configured to generate recommendations for subsequent user events based on determining context for a preceding user event. According to another embodiment of the invention, the discovery component is further configured to discover at least one of existing information in an information repository associated with the information capture event and external information associated with the information capture event, and wherein association component is further configure to generate semantic entities based on the semantic information for the captured content item and the associated information. According to another embodiment of the invention, the system further comprises an execution component configured to execute, anonymously, service requests received from the user on an external user account.

According to one aspect of the present invention, a computer implemented method for facilitating metadata capture and analysis is provided. The method comprises receiving, by a computer server, an information capture event from a user, wherein the information capture event includes a captured content item and content metadata, determining, by the computer server, semantic information for the captured content item, wherein the semantic information for the captured content item includes a context associated with the captured content item, discovering, by the computer server, any associated information for the information capture event; and storing, by the computer server, the content item and relationships between any discovered associated information. According to one embodiment of the present invention, the act of storing the content item and the relationships between any discovered associated information includes an act of storing the content item and the relationships between any discovered associated information as at least one semantic entity. According to another embodiment of the invention, the act of storing the content item and relationships between any discovered associated information as the at least one semantic entity includes storing the at least one semantic entity as at least a data triple, wherein the data triple defines an object, predicate, and subject stored as URI or literal values.

According to one embodiment of the present invention, the method further comprises an act of extracting additional metadata from the captured content item. According to another embodiment of the invention, the act of extracting additional metadata from the captured content item includes an act of processing the captured content item based on a content type. According to another embodiment of the invention, the content type includes at least one of illustration, notes, document, business card, meeting audio, and user defined. According to another embodiment of the invention, the act of discovering any associated information for the information capture event includes an act of discovery the any associated information for the information capture event based on the extracted additional metadata. According to another embodiment of the invention, the method further comprises an act of predicting at least one possible context for an information capture event. According to another embodiment of the invention, the act of predicting is responsive to received location information. According to another embodiment of the invention, the method further comprises an act of communicating a possible context for the information capture event to the user. According to another embodiment of the invention, the method further comprises an act of receiving a selection of the possible context from a user.

According to one embodiment of the present invention, the act of determining the semantic information for the captured content item including the context associated with the captured content item, includes an act of determining the context of an information capture event responsive to user input. According to another embodiment of the invention, the method further comprises an act of determining a semantic entity type for the captured content item. According to another embodiment of the invention, the method further comprises an act generating recommendations for a user. According to another embodiment of the invention, the act of generating recommendations for the user includes an act of identifying user events and associated information for the user events. According to another embodiment of the invention, the act of generating the recommendations for the user includes an act of generating the recommendations based, at least in part, on identified semantic connections between the user event and associated information. According to another embodiment of the invention, the method further comprises an act of determining automatically a mode of travel for the user event based, at least in part, on identified semantic connections. According to another embodiment of the invention, the method further comprises an act of determining automatically a required departure time for the user event based, at least in part, on the mode of travel, current location, and if required, traffic conditions.

According to one embodiment of the present invention, the method further comprises an act of generating recommendations for subsequent user events based on determining the context for a preceding user event. According to another embodiment of the invention, the act of discovering any associated information includes discovering at least one of existing information in an information repository associated with the information capture event and external information associated with the information capture event, and wherein the method further comprises an act of generating semantic entities based on the semantic information for the captured content item and the associated information. According to another embodiment of the invention, the method further comprises an act of executing, anonymously, service requests received from the user on an external user account.

According to one aspect of the present invention, a system for facilitating metadata capture and analysis is provided. The system comprises at least one processor operatively connected to a memory, the system further comprising a communication component configured to receive an information capture event, wherein the information capture event includes a captured content item and content metadata, and wherein the content metadata includes a context for the captured content item, an analysis component configured to determine a content type for the captured content item, an extraction component configured to extract additional metadata from the captured content item based at least on the content type, a discovery component configured to discover any associated information for the additional metadata, an association component configured to associate any additional metadata and any respective associated information to the information capture event. According to one embodiment of the present invention, the discovery component is further configured to discovery any associated information based on semantic analysis of the extracted additional metadata. According to another embodiment of the invention, the system further comprises a prediction component configured to predict possible contexts for an information capture event in response to received location information. According to another embodiment of the invention, the analysis component is further configured to determine a semantic entity type for the captured content item.

According to one aspect of the present invention, a non-transitory computer-readable medium is provided. The computer-readable medium includes instructions stored thereon that as a result of being executed by a computer instruct the computer to perform a method for facilitating metadata capture and analysis, the method comprises receiving, an information capture event from a user, wherein the information capture event includes a captured content item and content metadata, determining semantic information for the captured content item, wherein the semantic information for the captured content item includes a context associated with the captured content item, discovering any associated information for the information capture event, and storing the content item and relationships between any discovered associated information. According to one embodiment of the present invention, the act of storing the content item and the relationships between any discovered associated information includes an act of storing the content item and the relationships between any discovered associated information as at least one semantic entity. According to another embodiment of the invention, the act of storing the content item and relationships between any discovered associated information as the at least one semantic entity includes storing the at least one semantic entity as at least a data triple, wherein the data triple defines an object, predicate, and subject stored as URI or literal values.

According to one embodiment of the present invention, the method further comprises an act of extracting additional metadata from the captured content item. According to another embodiment of the invention, the act of extracting additional metadata from the captured content item includes an act of processing the captured content item based on a content type. According to another embodiment of the invention, the content type includes at least one of illustration, notes, document, business card, meeting audio, and user defined. According to another embodiment of the invention, the act of discovering any associated information for the information capture event includes an act of discovery the any associated information for the information capture event based on the extracted additional metadata. According to another embodiment of the invention, the method further comprises an act of predicting at least one possible context for an information capture event. According to another embodiment of the invention, the act of predicting is responsive to received location information. According to another embodiment of the invention, the method further comprises an act of communicating a possible context for the information capture event to the user. According to another embodiment of the invention, the method further comprises an act of receiving a selection of the possible context from a user.

According to one embodiment of the present invention, the act of determining the semantic information for the captured content item including the context associated with the captured content item, includes an act of determining the context of an information capture event responsive to user input. According to another embodiment of the invention, the method further comprises an act of determining a semantic entity type for the captured content item. According to another embodiment of the invention, the method further comprises an act generating recommendations for a user. According to another embodiment of the invention, the act of generating recommendations for the user includes an act of identifying user events and associated information for the user events. According to another embodiment of the invention, the act of generating the recommendations for the user includes an act of generating the recommendations based, at least in part, on identified semantic connections between the user event and associated information. According to another embodiment of the invention, the method further comprises an act of determining automatically a mode of travel for the user event based, at least in part, on identified semantic connections. According to another embodiment of the invention, the method further comprises an act of determining automatically a required departure time for the user event based, at least in part, on the mode of travel, current location, and if required, traffic conditions.

According to one embodiment of the present invention, the method further comprises an act of generating recommendations for subsequent user events based on determining the context for a preceding user event. According to another embodiment of the invention, the act of discovering any associated information includes discovering at least one of existing information in an information repository associated with the information capture event and external information associated with the information capture event, and wherein the method further comprises an act of generating semantic entities based on the semantic information for the captured content item and the associated information. According to another embodiment of the invention, the method further comprises an act of executing, anonymously, service requests received from the user on an external user account.

According to one aspect of the present invention, a system for facilitating metadata capture and analysis is provided. The system comprises at least one processor operatively connected to a memory, the system further comprises a communication component configured to receive an information capture event, wherein the information capture event includes a captured content item and content metadata, and wherein the content metadata includes a context for the captured content item, an analysis component configured to determine a content type for the captured content item, an extraction component configured to extract additional metadata from the captured content item based at least on the content type, a discovery component configured to discover any associated information for the additional metadata, an association component configured to associate any additional metadata and any respective associated information to the information capture event. According to one embodiment of the present invention, the discovery component is further configured to discovery any associated information based on semantic analysis of the extracted additional metadata. According to another embodiment of the invention, the system further comprises a prediction component configured to predict possible contexts for an information capture event in response to received location information. According to another embodiment of the invention, the analysis component is further configured to determine a semantic entity type for the captured content item.

According to one aspect of the present invention, a method for facilitating metadata capture and analysis is provided. The method comprises receiving, by a computer server, an information capture event, wherein the information capture event includes a captured content item and content metadata, wherein the content metadata includes a context for the captured content item, determining, by the computer server, a content type for the captured content item, extracting, by the computer server, additional metadata information from the captured content item based at least on the content type, discovering, by the computer server, any associated information for the additional metadata, and associating, by the computer server, any additional metadata and any respective associated information to the information capture event. According to one embodiment of the present invention, the act of discovering includes an act of discovering any associated information based on semantic analysis of the extracted additional metadata. According to another embodiment of the invention, the method further comprises predicting, by the computer server, possible contexts for an information capture event in response to received location information. According to another embodiment of the invention, the act of determining, by the computer server, the content type for the captured content item includes an act of determining, by the computer server, a semantic entity type for the captured content item.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings:

FIGS. 11A-D illustrate examples of user interfaces, according to one embodiment of the present invention;

FIGS. 12A-D illustrate examples of user interfaces, according to one embodiment of the present invention;

FIGS. 13A-H illustrate examples of user interfaces, according to one embodiment of the present invention;

FIGS. 15A-F illustrate examples of user interfaces, according to one embodiment of the present invention;

FIGS. 16A-E illustrate examples of user interfaces, according to one embodiment of the present invention;

FIGS. 18A-G illustrate examples of user interfaces, according to one embodiment of the present invention;

DETAILED DESCRIPTION

Figure 1:
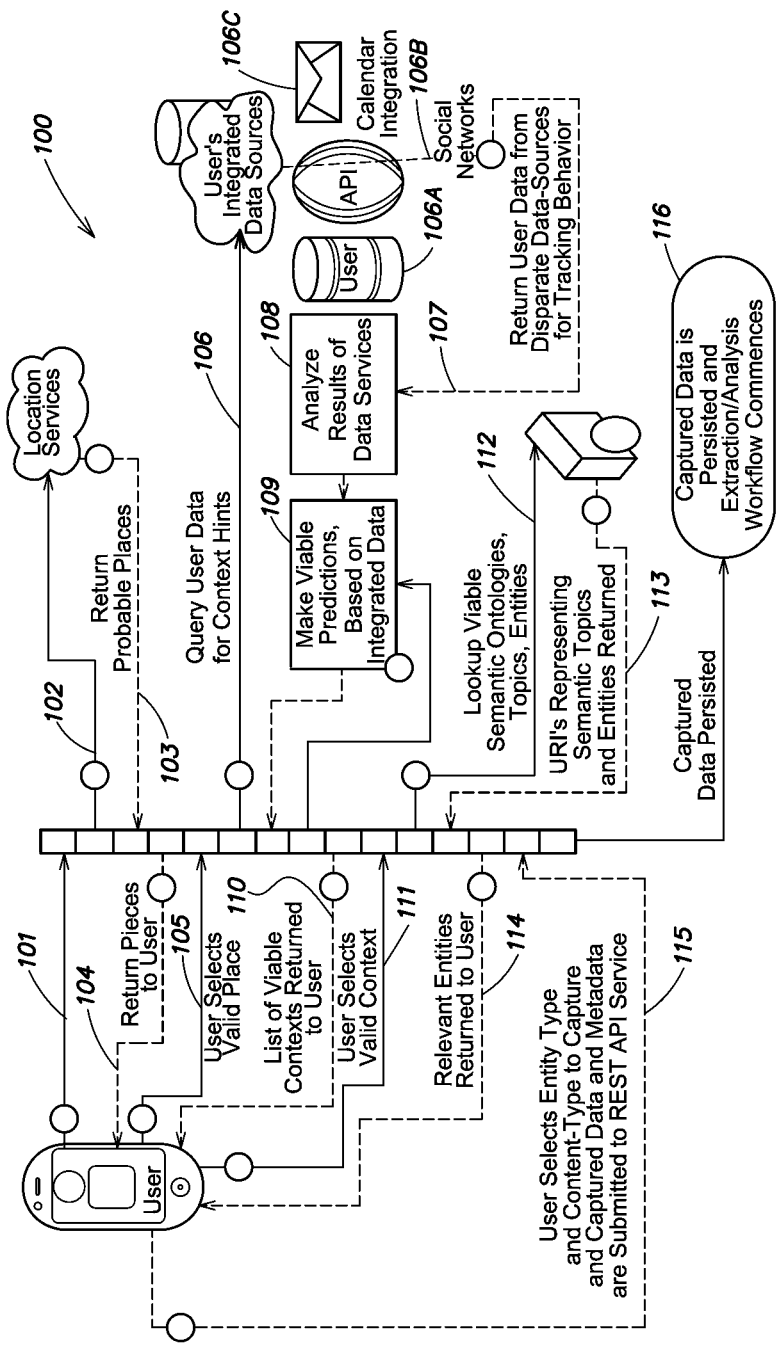
FIG. 1 is an example process and data flow model of a user capturing data, media, or information, along with additional metadata, according to one embodiment of the present invention.

Various embodiments of an information repository include a semantic data system which manages a user information repository. In one example, the information repository is configured to capture and source a user's data and content from multiple sources with semantic information (including, but not limited to location from a GPS-enabled mobile device, photos, audio, video, notes, calendar information, information about friends and social connections through social networks, transaction and purchase history, email, WebDAV synced folders, information from public data stores such as location-based services, information from public semantic data repositories). In some embodiments, the system is further configured to capture additional information and metadata about the context and subject of the information being captured (including, but not limited to identity of individual capturing the data, setting of the data capture, object type for the captured data, and other semantic information). In further embodiments, the system is also configured to analyze and manipulate and/or enhance the data to extract and generate additional information, mashups, and semantic meaning during and after the capture stage. In some examples, the system stores the data to allow it to persist.

In some embodiments, the system is configured to allow a user to make queries across single or multiple sources of data, either directly or through additional software applications designed to make pre-defined queries (which can be stored on the system or in an accessed application) of a semantic nature or otherwise. In further embodiments, the system is configured to predict virtual groups that allow the sharing and association of items implicitly, facilitating the pooling of information from different users around the same context or event. In some examples, the system is configured to automatically create the virtual groups, and in others propose the virtual groups to a user for confirmation.

Recommendations can be provided to the user based on queries against the semantic data and/or virtual groups of information. Recommendations can identify, evaluate, and predict user events, for example, throughout the users day. The identification, evaluation, and prediction of users events incorporate various related information sources, including semantic data objects to provide comprehensive recommendations. Comprehensive recommendations can include identification of sub-tasks within events, predicate items (documents, work product, displays, power point presentation) necessary at an event. For example, based on current user context, an embodiment of the information repository can determine when the user needs to leave home (current context—determined, for example, by time and/or GPS co-ordinates from a smart phone) to arrive at work on time. The repository can determine the "on time" recommendation based on associated information—traffic reports, typical route traveled, weather conditions, etc. The associated information can be stored as relationship information in semantic objects. Accessing the semantic objects can be configured to lead directly to, for example, route of travel, traffic information, and/or weather information. The more comprehensive the relationships identified for an event (and a set of semantic objects describing the event) the better the recommendations and subsequent data analysis.

In one embodiment, the repository can quickly and efficiently identify any associated information based on relationship information stored in the repository, for example, as a semantic data object, or other sources of information. In some embodiments, data capture and augmentation can be employed to develop the semantic data objects and/or relationship data, and further can employ existing semantic data and/or relationships to further augment data capture.

Various embodiments of an information repository can be configured to execute a variety of computer implemented processes for capturing and augmenting data, for associating information sources, predicting groupings of data, predicting context for capturing data, etc. In some embodiments, an information repository can include system components to execute various features, functions, operations, and/or processes discussed, including, for example, a system for facilitating metadata capture and analysis.

Figure 8A:
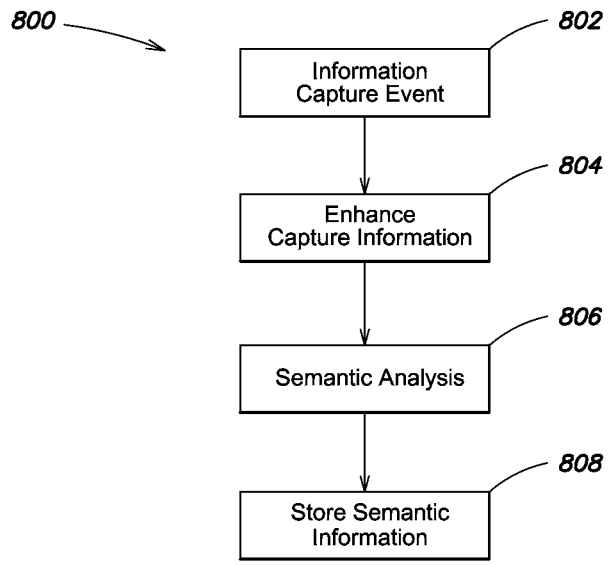
FIG. 8A illustrates an example process for capturing and augmenting data, according to one embodiment of the present invention.

FIG. 8A illustrates an example process for capturing and augmenting data. Process 800 can begin at 802, in response to a user or a system initiating a data capture event. The data being captured can include any form of digital data, and any source of digital data capable of being captured on a computer system. For example, digital pictures, files, sound recordings, video files, can be capture at 802 and the captured data augmented, discussed below.

Information capture at 802 can occur on a host computer system connected to, for example, an information repository. Host computer systems can include a variety of computing devices: laptops, desktops, mobile devices, PDA (personal digital assistant), smart phones, etc. Capture events at 802 can be triggered by capture application(s) running on the host computer system. For example, a capture application can be downloaded and installed on the host computer system and the user can execute the application when capturing data. In another example, the application can be configured to automatically capture information on a schedule, periodically, and in response to other triggering events. Triggering events can be identified by an information repository as part of other processes discussed herein (e.g., from appointment calendars, meeting services, social networks, stored user behavior, conference call services, etc.).

In some embodiments, the host computer system can include a variety of additional information sources that can be accessed and included in any information captured at 802. For example, a GPS enabled smart phone can include location information in any data captured. At 804, an initial data capture item is associated with additional information to enhance the captured data item. For example, GPS co-ordinates can be added to the capture item. In some embodiments, an application executing the data capture at 802 can be configured to identify available sources of data on the host computer system and include information from the identify sources in the capture data at 804. Additional data sources can include local information on the host computer.

In some embodiments, an application can be configured to capture information from local information sources, including e-mails, calendar requests, meeting invites, schedules meetings, social networking posts, etc., and communicate the additional information as part of data capture at 804. In other embodiments, the capture application can be configured to access sources of information external to the host computer, including for example, location services, other user data sources, e-mail services, social networks, on-line calendars, and in some examples, can be configured to query an information repository for previous enhancements to data captures stored on an information repository.

Semantic analysis can be performed on the captured data/data item and any enhanced information at 806. Semantic analysis can be executed to allow the assignment of specific meaning to the capture data. Identical data capture events, data items, or underlying data can have different meaning based on the context in which the information capture step at 802 is executed. For example, an information capture event "meeting with Jane" in the context of: time of capture—9 a.m. and location information—office will have an entirely different context than an information capture event "meeting with Jane" with time context—9 p.m. and location information—restaurant. Each semantic context can be addressed differently by, for example, an information repository in how the captured data is stored, where the captured data is stored, what relationships are stored within the captured data, what relationships to other data sources are stored, and developing recommendations for the user that are relevant to the current semantic context, among other examples.

In one embodiment, context analysis can enable an information repository and/or a system for facilitating metadata capture to predict what types of information a user is trying to capture at 806. In one example, the semantic analysis at 806 can identify the context and/or type of data being capture. A data type can be associated with a variety of expected data relationships. In another example, a data type can include expected data fields. Expected data fields and expected data relationships can be used to enhance any data captured, for example, at 802-804. In some settings, expected data fields and/or data types can be used to direct identification of associated information for data captured at 802.

The information captured at 802, enhancements to that data at 804, and any determined semantic analysis at 806 can be stored at 808. In some examples, the data, enhancements, and semantics can be stored separately in multiple repositories. For example, the initial data captured at 802 can be a content data source stored in its own content repository. In some embodiments, the content data repository can be configured to optimize storage of large data objects (e.g., video files, audio files, documents, etc.). In some embodiments, the associated data, for example, from 804, can be stored in a separate repository as well. For example, associated data can be stored in a metadata repository. Storage of the semantic data obtained from semantic analysis at 806 can also stored be to a separate repository at 808. In one embodiment, semantic data can be stored as semantic objects in a semantic datastore. In one example, the semantic datastore is a graph semantic datastore optimized for defining, accessing, and/or querying relationships amongst the stored data. Semantic analysis at 806 can identify and/or generate semantic data objects from the capture data and data enhancements. In one embodiment, semantic analysis at 806 can generate new semantic objects from the data. For example, a semantic entity can be an identified semantic data object. The semantic entity can be in the form of, for example, a data triple: subject, predicate, object. Multiple semantic entities can be identified from the original source data from 802. Each entity can be stored in a semantic datastore, and can include identification of any relationships between the semantic entities, metadata, and content data.

Once the captured data and any semantic analysis is stored, the captured data can be used as a source for further data enhancements on subsequent information capture events, and/or subsequent execution of process 800. In one example, contextual/semantic identifiers can be used to analyze similar data capture events. Subsequent captures of data content (e.g., at 802) can be analyzed against prior associated data captures (e.g., at 804) to determined what metadata could be available and queried, and in some embodiments, the metadata from a prior capture could be used to augment a current data capture event.

In some embodiments, enhancement of captured data at 804 and semantic analysis at 806 can occur interactively with an end user. For example, location information can be used to identify probable places where the user is located during the capture event. User interaction can enable more detailed information on locations having multiple possible matches (e.g., multiple establishments at one address or in close proximity, including coffee shop, clothing store, restaurant, bar, etc.). Probable places can be communicated to the user for selection on the host computer. Semantic analysis at 806 can also return probably contexts and/or probable data types for information captured at 802-804. Semantic analysis at 806 can also include consideration of returned place selection by the end user. In one embodiment, process 800 can execute other processes or process steps. In one example, interactive data capture can include operations discussed with respect to FIG. 1, process 100. In some embodiments, process 800 can be configured to execute one or more steps, discussed with respect to process 100.

Figure 8B:
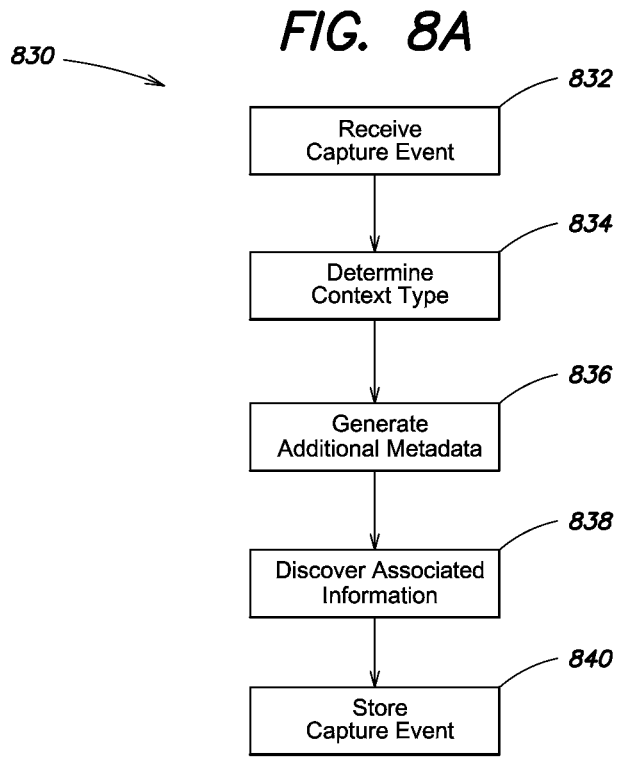
FIG. 8B illustrates an example process for determining context for an information capture event, according to one embodiment of the present invention.

Further, various embodiments of information repositories and/or system components of an information repository can be configured to execute other processes, for example, to determine context associated with an information capture event. Shown in FIG. 8B is an example process 830 for determining context for an information capture event. In one embodiment, process 830 can begin at 832 with receiving data for an information capture event. In some embodiments, a context for the information capture event can be determined at 834. For example, the location for a data capture event from 832 can provide the context for the information being captured.

A user location can be identified at work based on any one or more of, for example, time of day, GPS location, meetings scheduled in a calendar application, collaborative work services (e.g., web-ex meetings), participation accounts (listing the user as a participant), conference services, etc. A user's location can also be identified indirectly by other users having relationships (e.g., semantic links or metadata associations) to the current user. For example, another user can have a meeting scheduled with the current user in their independent calendar application. Data capture processing performed by this additional user or the additional user's application can identify the current user in the scheduled meeting, save the semantic link between the two users, and then employ the new semantic data (e.g., the link between the two users) in further data enhancement and/or recommendation delivery to either user. In some embodiments, data captures by the other user (e.g., edits to a document, meeting notes, audio recordings, etc.) can become readily available to the current user based on, for example, the identification of the semantic link between the users, the shared context between the users (in the same meeting), or other explicit or implicit connections within the users' data.

In some embodiments, other user contexts can be established at 834 based on data stored on the user or related to the user in an information repository. For example, gaming accounts, social networking sites, and/or other location based services may be associated with a user. A current state with those accounts (on-line, off-line, active, etc.) can be determined at 834 and used to determine a user's context. In some embodiments, all available information (data stored on the user, data related to the user, and/or data obtained on the user from external sources) can be accessed at 834 to determine context. In one example, context determinations cannot be made unambiguously. In some embodiments, probable contexts can be ranked and the highest rank context selected. In other embodiments, analysis of historic contexts can be analysis and used to resolve ambiguity. In further embodiments, a user can be presented with the highest ranked context and/or a plurality of determined contexts to select or confirm the user's actual context. Such selections by the user can also be stored for later use to determine context at 834. Process 830 can optionally continue, at 836. Additional metadata information can be identified and/or generated at 836. In some embodiments, the identification-generation of additional metadata information at 836 can be based on the determined context at 834. In one example, context for an information capture event can be used to generate additional metadata information to associate with the information capture event at 836. For example, an information capture event received at 832 can include a data capture item and information associated with the data capture item.

At 836, a content type can be identified for the data capture information, or more specifically for a data capture item. In some embodiments, determination of the data capture type can include execution of additional processes to parse the received data, for example, based on the data format received. In one example, any one or more of processes 300, 320, 350, and 375, discussed in greater detail below, can be executed as part of 836 and/or 838. In some embodiments, extraction of addition metadata can occur in conjunction with discovery of additional associated information at 838. In some embodiments, discovery of associated information at 838 can include the identification of semantic data within the information capture event. In other embodiments, discovery of associated information at 838 can include discovery of related information existing in the repository based on, for example, the information received as part of the information capture, additional metadata from 836, and/or on other discovered information at 838 which can lead to further associations and connections between existing data and the information capture event. Any new information, new data, new connections, contexts, relationships, etc. can be stored at 840.

In some examples, various types of data can be treated differently when stored at 840. In some embodiments, datastores can be configured to store specific types of data—content data (e.g., a data item subject to the data capture event) can be stored in a content datastore and/or database; metadata (e.g., additional information about the content data—which can be location information, author, user, or any data providing information about the content, etc.) can be stored in a metadata datastore and/or database, semantic data (e.g., context information, entities, relationship information, context links, etc.) can be stored in a semantic datastore and/or database. The separation of the data can be used to improve the organization and access to, for example, the semantic information, the metadata information, and/or content data as each one or combination can be accessed separately and analyzed to identify additional information sources, employed to augment data capture, and/or analyzed to generate recommendations for users.

Figure 8C:
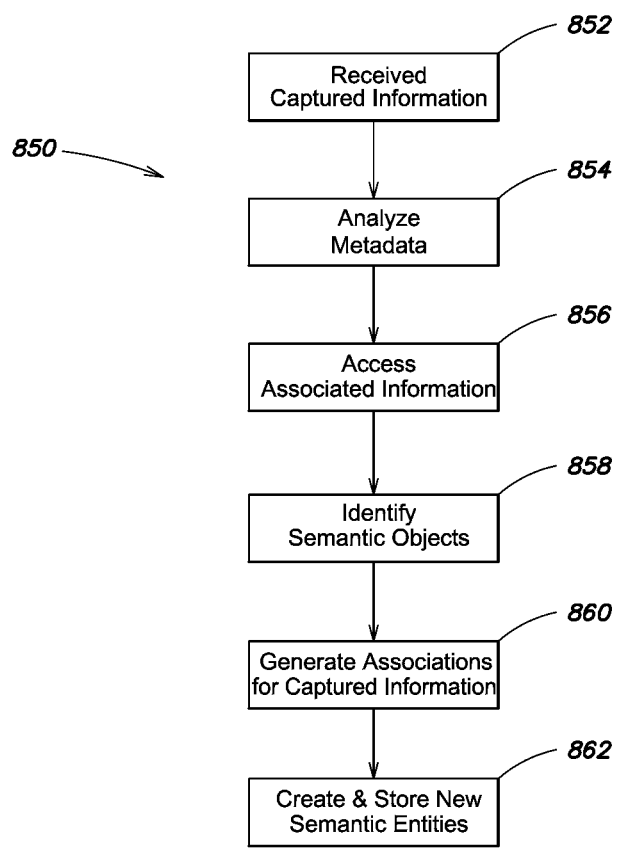
FIG. 8C illustrates an example process for storing semantic objects, according to one embodiment of the present invention.

Further, various embodiments of information repositories and/or system components of an information repository can be configured to execute other processes in conjunction or instead of process 830, for example, process 850 can be executed to capture semantic objects from an information capture event. Shown in FIG. 8C is an example process 850 for storing semantic objects. In one embodiment, process 850 can begin at 852 with receiving data for an information capture event. At 852 the information received (e.g., a content item and metadata) can be analyzed to identify any metadata associated with the information capture event at 854. The metadata can be used to identify any associated information for the information capture event and/or the content item. Associated information can be accessed at 856, which in some embodiments can lead to additional associated information to access.

At 858, the information capture event, including any content item, metadata, and accessed information can be further analyzed to identify semantic objects within the collection of information. Identified semantic objects can include semantic entities, semantic categories, semantic tags, and semantic objects among other examples. "Semantic" refers to the stored data's definition of or configuration that establishes a connotation for the stored data as well as any particular values for each aggregation of stored data. In one embodiment, semantic entities can comprise a set of data elements that describes a unique object. In one setting, a semantic entity can be represented by a URI, for example, within a particular graph datastore. In some embodiments, semantic entities are serialized as an RDF (resource description framework) format or a triple—standard formats for representing triples of data. In some embodiments, triples all conform to the same basic structure to define chunks of semantic meaning, taking the form of subject, predicate, and object. In some embodiments, additional formats for semantic entities having additional fields can also be used, having subject, predicate, object, and metadata—a "quad" or subject, predicate, object, metadata, and graph—a "quint."

In one embodiment, each item within a triple is either a URI or a literal. A URI typically references a globally unique identifier intended to represent a particular semantic entity, which can be, for example, an individual, an organization, a place, or concept. A literal is often a simple value that does not need an abstraction, such as the number 3 or the string "blue." However, subjects, predicates, and objects are typically represented by URIs. The URIs are resources that can be referenced and further correlated within, for example, a particular semantic graph datastore. In one embodiment, a graph datastore presents the interrelationships between semantic data elements graphically. As discussed, the interrelationships can be analyzed by an information repository to augment data capture and/or deliver contextually relevant semantic data, for example, as recommendations.

According to one embodiment, semantic discovery can generate semantic URIs for identified people, places, and/or organizations at 860 from the information delivered at 852. Semantic discovery can also generate content about those entities, for example, individuals, which can be stored at 862. In some embodiments, the URIs (or the discovered people entities) are attached to the content metadata received at 852. For example, the people entities identified are related to the received metadata and are persisted at 862. In one embodiment, metadata and the associations can be persisted in a metadata datastore at 862. Also, the URIs can be serialized into RDF, and persisted to a graph datastore at 862. The content about the individuals resulting from the semantic discovery, as well as the information about events and subjects/topics, can be extracted and summarized into text. The text can be further analyzed to determine classifications for the text. In one example, the text can be analyzed to extract semantic categories, entities, and tags. Free text and tags/categories can be indexed to enable search and storage in a searchable index, and any semantic entities (including categories, topics, places, contexts, people and captured entities) are aggregated and serialized into RDF format and stored at 862. In one example, the free text and tags/categories can be indexed to enable search and storage with a searchable index, and any semantic entities are aggregated and serialized into RDF format and persisted to the graph datastore.

In some embodiments, process 850 can be executed recursively to establish content, metadata, associations, and/or semantic objects, which can be used to further extrapolate metadata, associations, and/or semantic objects for an information capture event and/or subsequent information capture events.

In some embodiments, any one of, combination of, or parts of processes 800, 830, and 850 can be executed to recursively capture and analyze information. According to one embodiment, the system is configured to execute cycles of semantic analysis, metadata extraction, and augmentation in a recursive manner. For example, any information identified during processes 800, 830, and/or 850 can be used to identify additional information available from prior semantic analysis and the additional information can be processed for further extraction of relevant semantic ontologies, tags, and keywords. In some embodiments, the system can be configured to perform similarity or relevance analysis on topics, subject lines, captured text, etc., to determine that the key topics discovered from other meetings are similar or relevant to the current meeting, for example, at 838.

In one embodiment, the processing of the information can continue, by capturing data from other sources. For example, the system can be configured to capture relevant sources from users' social networks, email threads in which keywords derived from an earlier "analysis cycle" appear, etc. In some embodiments, the system can perform the discovery based on keywords or other information, and can further be configured to identify information to capture based on similarity determinations made on the keywords or other information.

According to one embodiment, the system can also be configured to build upon a result returned from any capture and analysis execution by augmenting subsequent data capture. In turn the system can augment the prior results returned from previous captures. The information repository is configured to generate newly discovered intelligence and more widely linked range of data sources, for example, by coupling capture and analysis from previously persisted and indexed data analyses, as well as external data sources that may take the form of social networks, APIs, email, etc.

Figure 9:
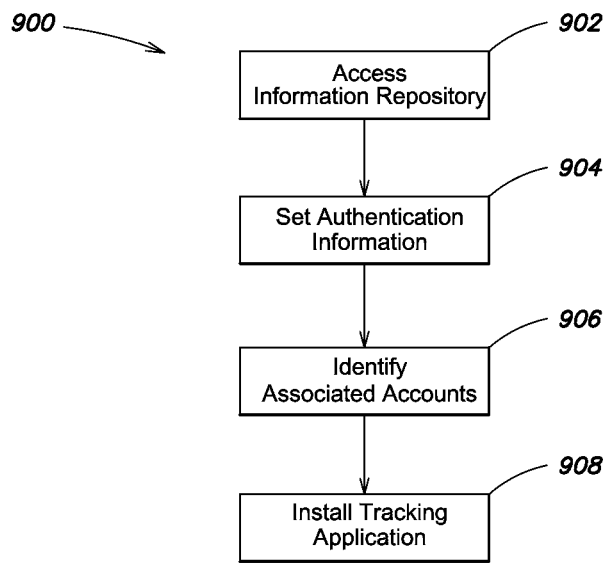
FIG. 9 illustrates an example process for registering a user, according to one embodiment of the present invention.

In some embodiments, a user can register to access an information repository having semantic search capability. FIG. 9 illustrates an example process for registering a user according to one embodiment. Process 900 can begin at 902, with a user accessing a website associated with in information repository service. At 904 the user can establish a user name and password for accessing an account with the information repository service. The account can be configured to permit the user to access management features and profile information associated with the user account. In one example, the user can use the management features to establish data sources associated with the user at 906. For example, the user can have access to a variety of on-line information sources and can use a variety of computer applications, each of which can serve as a source of information for enhancing data captures events. For example, the user can be prompted to provide e-mail service authentication information. Other accounts can also be requested. In another example, access information for on-line document management services (e.g., the Web-DAV and GOOGLE DOCS services) can be input and/or requested. The user can also be prompted for account information, including user name and password, for any cellular service, data plan, etc.

Process 900 can continue at 908, where the user is prompted to install a tracking application on their host computer. In some embodiments, the tracking application can be configured to identify and capture data sources accessed on the host computer. In one embodiment, the tracking application can identify e-mail accounts accessed, phone service accounts, location services, scheduling applications executed, etc.

In one example, the tracking application can be configured to access other applications on the host computer to obtain and/or access information available on the user's host computer. In another embodiment, the tracking application can be configured as a data capture and data augmentation application. For example, a user can execute the data capture event application to capture data on an event and augment the captured data using the host computer system as discussed herein. Upon execution of the application for data capture, the application can be configured to access other applications installed on the host computer to obtain information on the user, the user's location, and/or provide metadata to associate with a data capture event.

In some embodiments, the user does not need to separately register for an information repository. For example, the user can download, install, and/or purchase an application for their host computer system. The application can be configured to access other applications and/or obtain information from the other application on the host computer system.

In some embodiments, a registration process (e.g., 900) can be executed prior to data capture and data augmentation processing (e.g., process 800, 830, and/or 850) for information capture events.

Data Capture Event

According to some embodiments, an information or data capture event can be defined and represented as a semantic resource. The data capture event can be based on capturing a content item. The data associated with the content item can be enhanced with additional metadata based available information sources available on or connected to a user's host computer system. For example, users may optionally choose to associate an event with a captured item (e.g., a content item). In some examples, a data capture event can be automatically associated with a captured item. Various embodiments can predict and recommend likely event candidates to the user by pulling relevant data from internal and external data sources associated with a user's account, such as a calendar service, or e-mail account (e.g., Gmail or Exchange Services).

According to some embodiments, once an event is defined, subsequent content items can be captured within the scope of the defined event. The subsequent content items may inherit the context, associated metadata, and semantic resources identified for the first defined event. Enabling enhancement based on prior data captures can further streamline subsequent capture processing and imbue subsequently captured data with more relevant information. Furthermore, the data capture event may be used to further associate other data sources, including other users participating in the same event. The identification of other data sources can be used not only to add the semantic resources identifying other event participants, but also to associate the content items captured by any of the other event participants, facilitating the enhanced sharing and collaboration of all the contributions provided by an entire group of the participants to an event.

Data Context

According to further embodiments, a context can be defined and used to represent a particular mode or type of behavior, indicative of the behavior for a particular user. Context for a user can be used to make further inferences and develop reasoning regarding a user's intentions during an information or data capture event. In some examples, the user can create and/or enter their own context for a data capture event. In some embodiments, the context can also be used to infer the semantic types of content items the user intends to capture. Additionally, data contexts can be used to infer what events a user may be participating in, in order to provide better and more accurate predictions and recommendations to the user. Predictions and recommendations can be delivered to a user identifying events, semantic topics, and semantic entities for selection by a user in a user interface. In other embodiments, a data capture context can also be used to associate multiple users to a particular event. Associating multiple users to a particular event facilitates sharing of captured items, associated metadata, and any semantic entities between the multiple users.

According to one aspect, focusing on the silo defined by an individual's personal experiences as well as the items, information, and/or events they "capture" during their experiences permits embodiments of the system to achieve the same value and benefits afforded by the yet unrealized semantic web, and can do so without requiring external dependencies on other generalized semantic repository endpoints. As the development of the semantic web progresses, and more semantic data becomes available, various embodiments of the present invention can take advantage of the new information sources by incorporating this data into the discussed processes, and allowing users to access and incorporate this data where possible or helpful. For example, analysis of the user's silo of information can generate comprehensive recommendations for the user that, for example, predict a user's needs, activities, and facilitate organization of day to day tasks.

Figure 10:
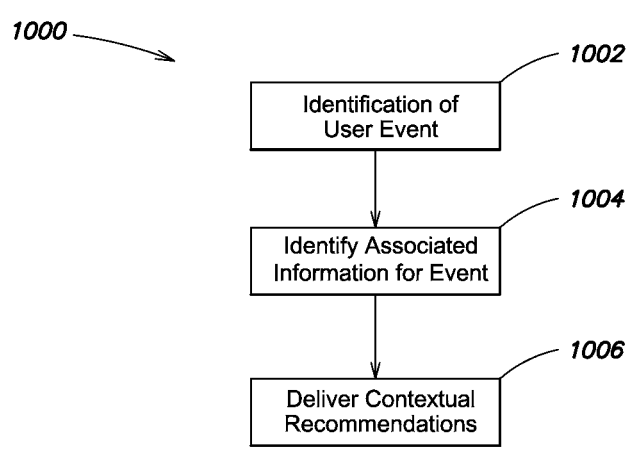
FIG. 10 illustrates an example process for generating recommendations for a user, according to one embodiment of the present invention.

Shown in FIG. 10 is an example process for generating recommendations for a user. Process 1000 begins at 1002, with identification of a user event. In one embodiment, user events can be identified from information sources associated with a user. For example, a user may have identified e-mail accounts during a registration process, that can be accessed and analyzed to identify meeting requests. A meeting request can be identified as a user event. In some examples, a user can register a calendaring service, and scheduled meetings obtained from the calendaring service can be identified as user events. In another example, the user can register an Exchange account including, for example, a calendar. In other examples, the user can identify other on-line sources of information which can be queried to identify user events at 1002.

User events can include a variety of events, tasks, and/or sub-tasks important to a user. Meetings are one example of a user event on which recommendations can be provided, however, other events can be identified and recommendations delivered based on the identified events. In another example, deadlines can be identified in e-mail exchanges. In yet another example, project tracking applications can store deadlines, milestones, etc., that can be used to identify user events at 1002. Reservations, tickets, travel itineraries, etc., can also be identified from information sources associated with a user and establish user events at 1002 on which recommendations can automatically be provided.

In other embodiments, a tracking application can be installed on the user's host computer system. The tracking application can also be configured to identify user events at 1002. The tracking application can be configured to access information on the host computer system, for example, an Exchange application that holds a user's appointments and/or e-mail. In another example, the tracking application can access other online accounts through the host computer system to identify user events at 1002.

According to one embodiment, the identification of a user event signals the tip of the information iceberg. In response to identification of a user event at 1002, any associated information on the event and/or the user participating in the event is identified from available information sources at 1004. In one example, information can be captured from an information repository storing, for example, semantic information on the user. A semantic entity may be defined for the user in the information repository. Based on semantic analysis/discovery of the user and the user's behavior, the information repository can be configured with a rich data set of information associated with the user.

For example, the user's preferred mode of travel can be defined as a semantic link that is executed to obtain information on the user's preferred mode of travel. The semantic information can include multiple links on a preferred mode of travel based on, for example, context. The preferred mode of travel can be linked, for example, to contexts including, time, day, weather conditions, etc. The information on the user's travel preferences can be readily accessed on the information repository, and the identification of the user event at 1002 can provide the context on which to identify associated information at 1004.

In one embodiment, a semantic entity can be previously defined on the system for a business meeting with the similar or the same characteristics as the identified user event at 1002. In one example, the resulting information can indicate a travel mode: car; which can trigger generation of recommendations for the user that include driving direction to the meeting, traffic reports for the identified route (in some settings traffic predictions for the time of the event can be generated based on information store on the repository—traffic prediction can be accompanied by current traffic reporting, with recommendations focusing on the current traffic reporting as the time for the event approaches), expected time to leave to arrive at the meeting on time, and parking suggestions, among other examples.

Directions and expected time to leave to arrive on time can depend on other information associated with the user and/or event identified at 1004. In particular, identification of associated information can include a determination on an expected location for the user prior to the user event. Prior data captured on the user can be accessed to determine an expected user location. Location information can be stored on the user in the information repository with, for example, a time context. Based on a time context for location information, for example, 6 a.m., the user's location can be predicted as: home. Real time information obtained on the user can update recommendations generated based on predictions. For example, the user can have a smart phone with GPS capability. The user's GPS coordinates can be accessed, via a tracking application installed on the user's phone, or based on access information available on the information repository. The user's current location information can confirm the predicted information or serve as a update to the recommendations generated for delivery at 1006.

In another example, the user's historic information can indicate a preference for public transportation, in which case directions over available public transportation can be obtained. Further, weather conditions which may affect traffic can be generated for delivery as recommendations. Weather conditions plus public transportation context can also trigger a recommendation to bring an umbrella to the meeting.

In another embodiment, associated information can be collected on the user identified event at 1004. For example, the same source of information used to identify the user event at 1002 can be used to identify context for the event for further identification of information associated with the user event. For example, e-mail exchanges on an upcoming meeting can be analyzed to identify participants, timing, subject, required items, etc. E-mails exchanged on the meeting including attachments can be used to identify the attached document as required for the meeting. Further exchanges via e-mail can identify that signatures are required for the document, in which case recommendations can be generated indicating the need to print a number of copies of the document prior to the meeting.

Identified participants can also be the source of associated information for an event at 1004. In particular, the other identified participants can also be associated with records in the information repository, their own associated information, which can be used to identify further information at 1004. The relationships between the all the information sources, for example, the user, the other participants, and all of the associated information associated with them, including the place at which the meeting can occur, the organization, that is located at the meeting can defined a universe of connected information, information relationships, and information association that can be exploited to generate and deliver contextual recommendations at 1006.

Additional examples of recommendation generation and delivery are discussed in greater detail herein. Process 1000 can be executed multiple times for a plurality of events over the course of a single day, days, weeks, months, etc. The current information obtained to provide recommendations at 1006, can be used as a current context for delivering subsequent recommendations upon further executions of process 1006. Process 1000 can be executed in conjunction with, or augmented by, the various data enhancement processes discussed, which can, for example, generate semantic entities used to capture associated information on which to generate recommendations at 1006. Further, the process 1000 can provide, for example, context information to other process to enhance data capture. In some embodiments, process 1000 can generate and/or store semantic data, including for example, semantic entities based on the identification of associated information at 1004. The generation and storing of semantic data can facilitate subsequent execution of recommendation processing.

Example Processing Use Cases

FIG. 1 illustrates an example process and data flow model 100 of a user capturing data, media, or information, along with additional metadata, using a mobile device with GPS capabilities on which the a mobile software application is installed. The mobile software application can be configured to permit the user to capture information on their mobile device with enhancements to the metadata associated with any information captures. A mobile device is one of many possible devices through which a user can capture information according to various embodiments of the invention.

According to some embodiments, users may also capture data by directing content to a special email address, copying files to a WebDAV-mounted directory, uploading data directly, or through detecting events from a user's social network.

According to one embodiment, process 100 can begin at 101. At 101, in response to the user or the mobile application initiating a data capture event, the user's mobile device, using its GPS capabilities, sends information about the user's latitude and longitude, which can include a UserID for identifying the user, to the server. In some examples, the user can enter information about the user's location in a user interface to provide location information. In other examples, tracking services can be queried to identify a user location in response to a user initiating an information capture session. In one example, the user initiates an information capture session on a cell phone, smart phone, or wireless device which can be tracked and the location for the device determined and queried automatically.

At 102, a server can transmit latitude and longitude information to a third-party location service to query its database about what places are located at that latitude/longitude intersection. In some embodiments, this step can be omitted. For example, when the user enters their location directly, no query is required or the user's location is obtained based off of a tracked device. At 103, the location service can return to the server a list of probable places where the user is located (such as specific addresses, retail establishments, offices, etc.). In some examples, proximate locations can be returned as well. At 104, the potential location matches can be displayed to user on the user's mobile device. The user can be presented a list of options from which the user is requested to selection a specific location. An example user interface displaying a selectable list of places is shown in FIG. 2A.

Figure 2A:
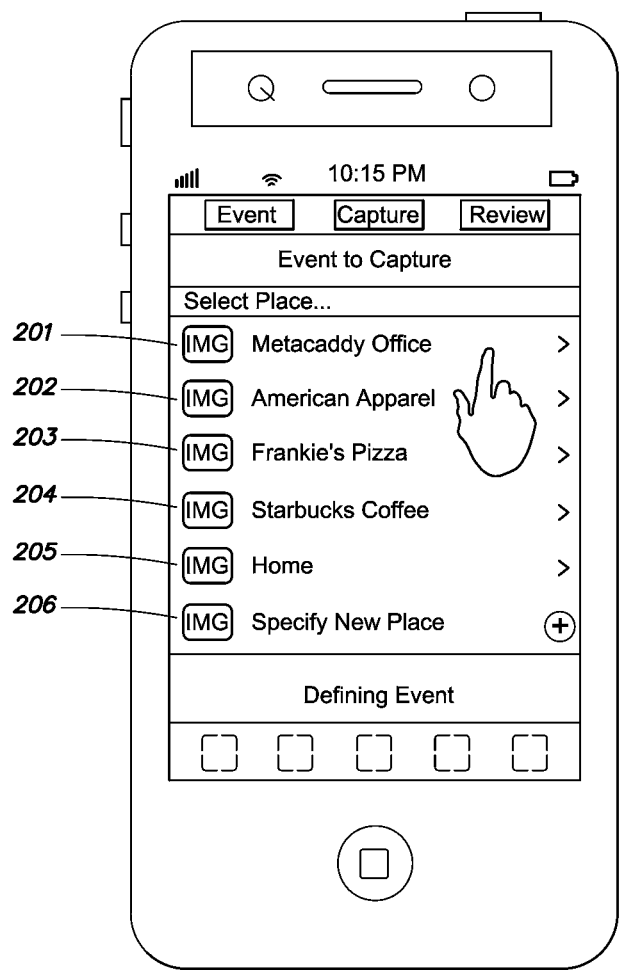
FIG. 2A is an example user interface, according to one embodiment of the present invention.

As shown in FIG. 2A, an example list of places can include "Metacaddy Office" at 201, American Apparaell at 202, Frankie's Pizza at 203, Starbuck's Coffee at 204, and Home at 205. In some embodiments, the user can also be prompted to identify a new place at 206.

At 105, the user can select the user's location from the list. In some examples, the user can input his/her own location manually, for example, at 206. In some embodiments, steps 100-104 can be omitted if, for example, the user enters their location directly in their mobile device.

At 106, in response to selection of a place, integrated data sources can be interrogated (including but not limited to past history, social networks, calendar, email, and location-based service profiles) to determine the context in which the user is capturing information or media. In one example, integrated data sources can be identified by the user during a registration process. In other examples, a user device can provide access to and/or information on integrated data sources. In some embodiments, applications can be installed on the mobile device to track information on data sources for a user. Integrated data sources can include, for example, stored data on user behavior 106A, social network sites 106B, calendar and/or e-mail integration 106C, as well as other data services used and/or accessed by the user.

At 107, relevant user data from these integrated data sources is captured. In some embodiments, relevant user data can be returned as the result of query operations performed on the integrated data sources. The results of the query can be analyzed at 108. Responsive to the analysis at 108, one or more contexts for a data capture event can be identified. In some embodiments, a server configured to executed process 100 can be configured to predict the context in which the user is trying to capture information or media at 109. In some examples, the server determines a number of probable contexts for a data capture event. The server can be configured to rate the probable contexts based on the likelihood of a match, which can be reflected as a ranking of the probable contexts on the degree of probability. Information returned on the user at 108 can be used to determine a likelihood for a context match at 109.

Figure 2B:
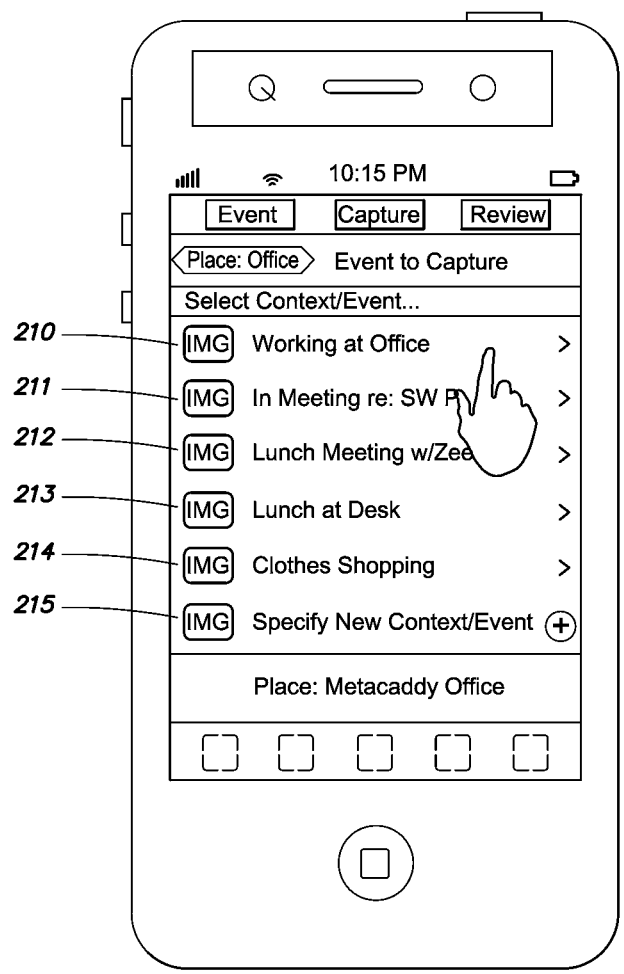
FIG. 2B is an example user interface, according to one embodiment of the present invention.

At 110, the user is presented a list of probable contexts. In one embodiment, a server is configured to send the user's device a list of probable contexts. One example user interface and an example display of probable contexts is illustrated in FIG. 2B. Example contexts can include: working at office at 210, in meeting re: SW project at 211, lunch meeting with Zeeshan at 212, lunch at desk at 213, and clothes shopping at 214. In one example, the list of example contexts can be selected from contexts already associated with the user. In another example, the list of contexts can be derived from information obtained from integrated data sources at 108.

At 111, the user can select one of the contexts from the list. In some embodiments, the user can also input his/her own context. For example, a user interface display on the user's mobile device can prompt the user to input their own context for a data capture event, e.g., at 215 FIG. 2B.

At 112, the identified context is used to query existing internal and/or external data sources to identify semantic ontologies into which the data being captured can be stored or classified. An ontology formally represents knowledge as a set of concepts within a domain, and can establish the relationships between the set of concepts. The ontology can also provide information about the entities that are stored within a domain and can also describe the domain. The semantic ontology can organize semantic entities, and each semantic entity can define a concept type or object and its meaning. For example, the user can be described by a "person" semantic entity, and identifying information for the user can be references in the semantic entity for the user. The ontology can also include semantic topics under which entities can be organized. According to one embodiment, based on the user identified context, a server process queries various internal and external data sources to look up viable semantic ontologies, topics, and/or entities related to the context identified, for example, by a user at 111.

At 113, the query can return URIs (uniform resource identifiers) representing semantic topics and/or entities that may be used to store and/or categorize the data captured by the user. In one embodiment, semantic entities can be defined on URI triples of subject, object, and predicate. The subject denotes the resource, and the predicate denotes traits or aspects of the resource and expresses a relationship between the subject and the object.

In one example, the notion "the sky has the color blue" can be represented as a triple: with a subject denoting "the sky," a predicate denoting "has the color," and an object denoting "blue." Semantic entities can identify meaning and define a data type for captured data.

A list of possible semantic entities can be returned in response to the query at 113. At 114, the list of possible semantic entities can be communicated to a user's device. In one embodiment, a server process is configured to communication the potential semantic entities and/or semantic topics to the user on a display of the user's mobile device. In some embodiments, any available options for a data item the user wishes to captures can also be displayed to the user having any previously specified context. According to one embodiment, if the context is a meeting, the item can correspond to a whiteboard illustration, notes, a business card, or audio from the meeting. In one example, each potential match can be returned to the user. In other examples, the list of potential entities and/or items can be filtered and/or sorted to reflect relevance of the options. Various contexts can have specific items or sets of items associated with them. In other examples, the user can specify a new item type or entity at 235-236. In one example, a participant can be identified at 235. Each participant can be stored as a semantic entity in an information repository. All the information associated with the participant can be used in data capture processing and/or recommendation generation and delivery as discussed herein. In another example, the user can specific a new item type if a returned list of options does not match a data item the user wishes to capture. The context (including, for example, place, participants, time, etc.) for the new item can be stored 116 and used in subsequent data capture and/or recommendation generation.

Figure 2C:
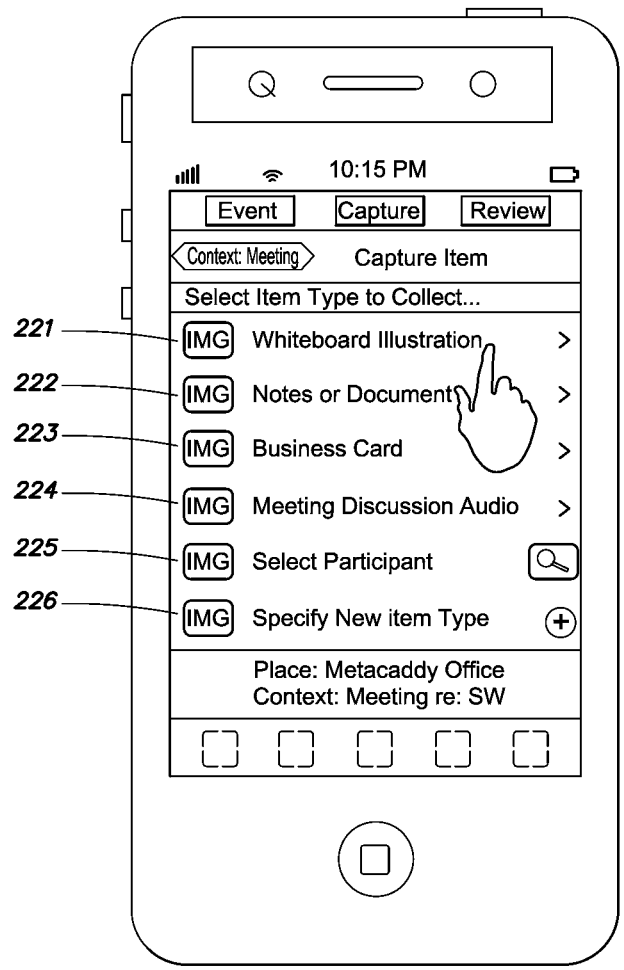
FIG. 2C is an example user interface, according to one embodiment of the present invention.

An example user interface displaying an example list of possible data item type is illustrated in FIG. 2C. As shown in FIG. 2C, some example data item types can include whiteboard illustration at 221, notes or document at 222, business card at 223, and meeting discussion audio at 224. Another item type can include video recording, for example.

Figure 2D:
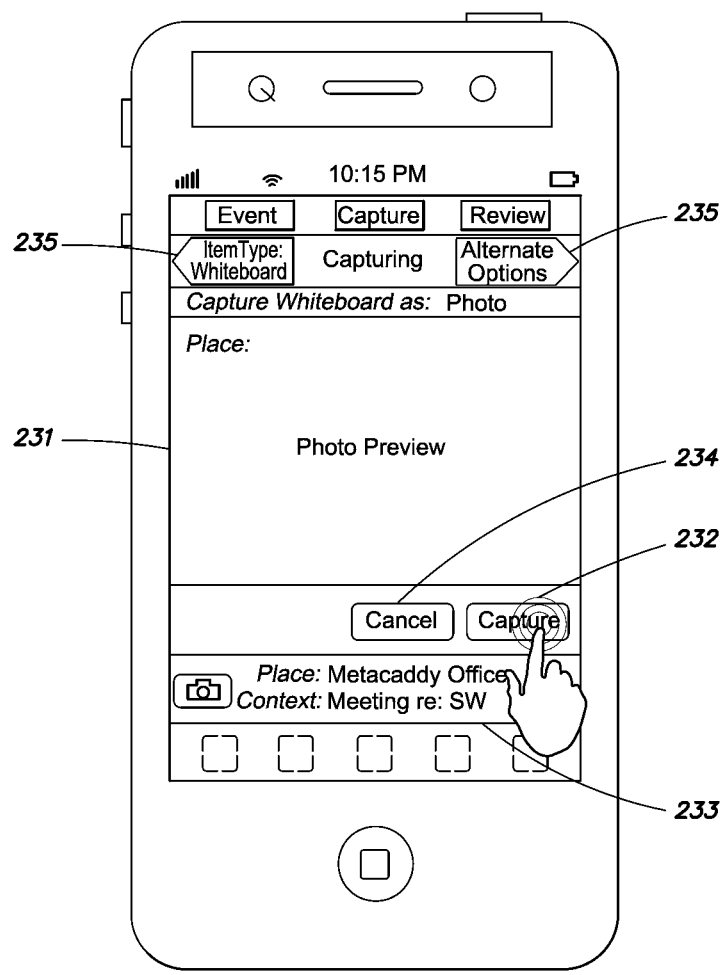
FIG. 2D is an example user interface, according to one embodiment of the present invention.

At 115, the user can select the item to capture. Based on the item selected, the application on the mobile device shows the user a display specific to that type of item to allow the user to capture the item easily. In some embodiments, each capture item is associated with pre-defined characteristics that establish the specific display. An example user interface for photo capture is shown in FIG. 2D. A user can capture a photo of the data item using, for example, the user interface display on their mobile device at 232. Additional options are provided to the user which can include, redefining the item type, place, and/or any context for the data capture by selecting, for example, 230. The user may also select 235 to return selection options for the data item type.

A preview of the data capture can be shown to the user in the user interface. In one example, the user can view a preview of a photo capture at 231. Context and metadata identified for the data capture can also be displayed to the user. For example, at 233, the place and context established for the data capture from previous steps can be displayed. If the user decides not to capture the data time, the user may cancel the data capture by selecting 234, cancel.

Once the user captures the item (e.g., takes the picture), the captured data and metadata, which can include any information input by the user during context and/or entity identification, are submitted for analysis and storage. In one embodiment, capture data and metadata can be communicated to a metadata capture and analysis system through an application protocol interface. The metadata capture and analysis system can be components of an information repository. Any captured data can be persisted and various extraction/analysis workflows can commence. One example extraction/analysis workflow is illustrated in FIG. 4.

Figures 1, 3A:
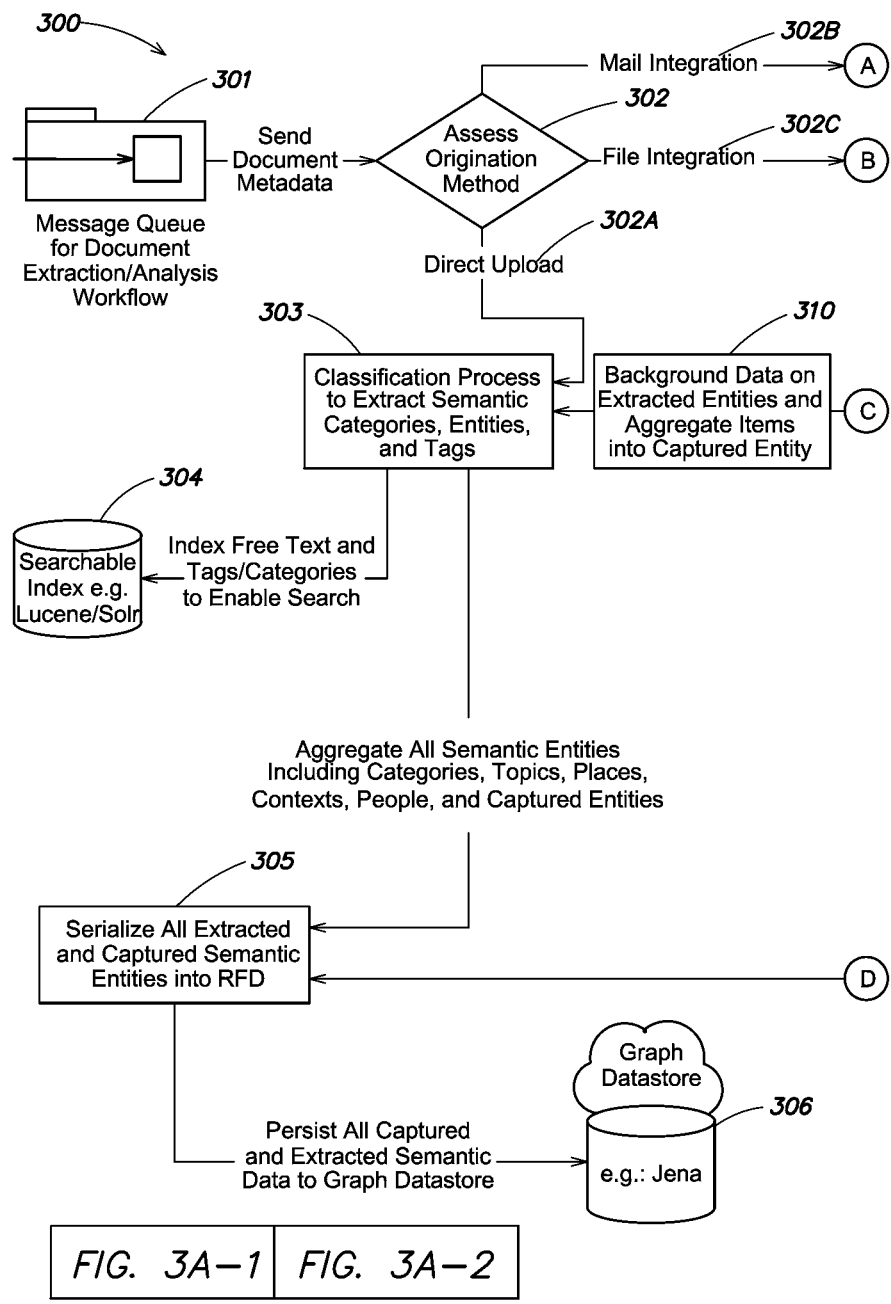
FIG. 3A is an example process and data flow model for processing capture media, according to one embodiment of the present invention.
Figures 2, 3A:
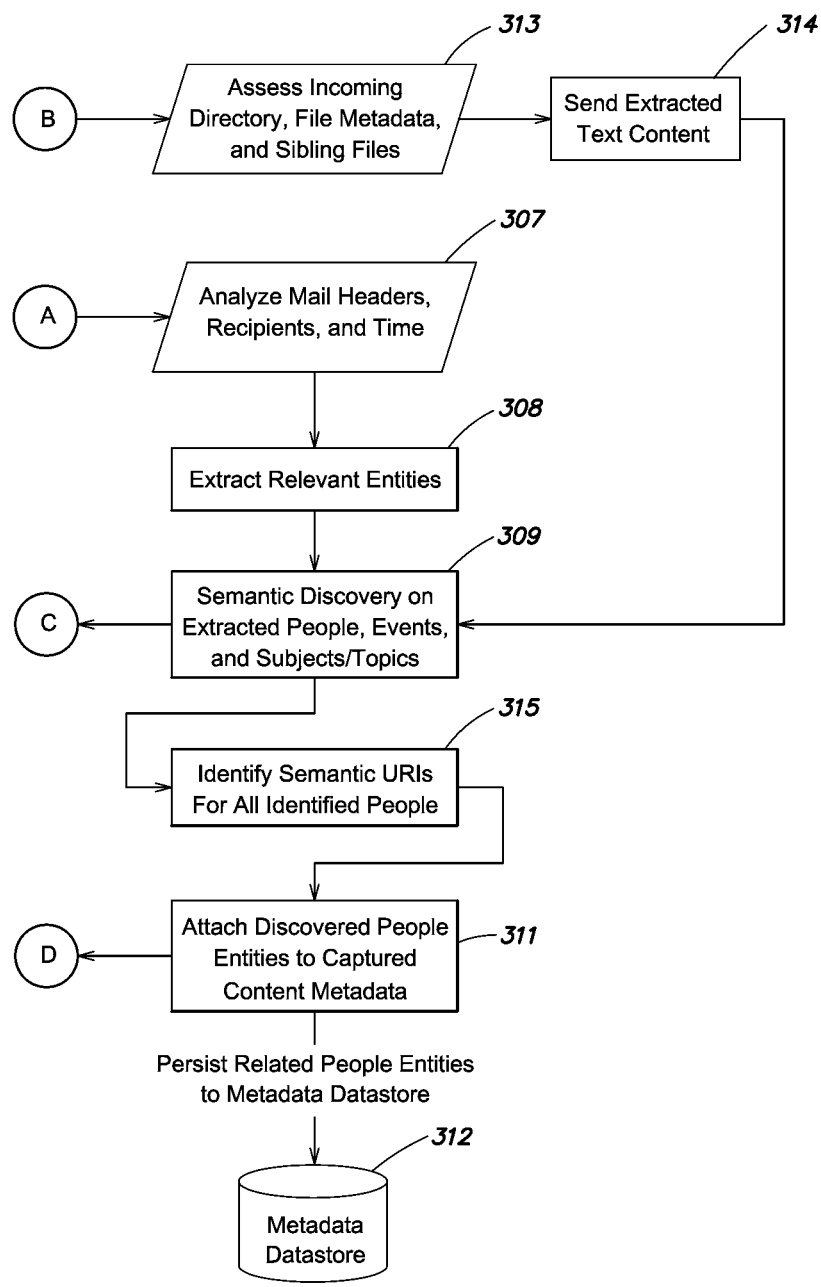
Figures 1, 3B:
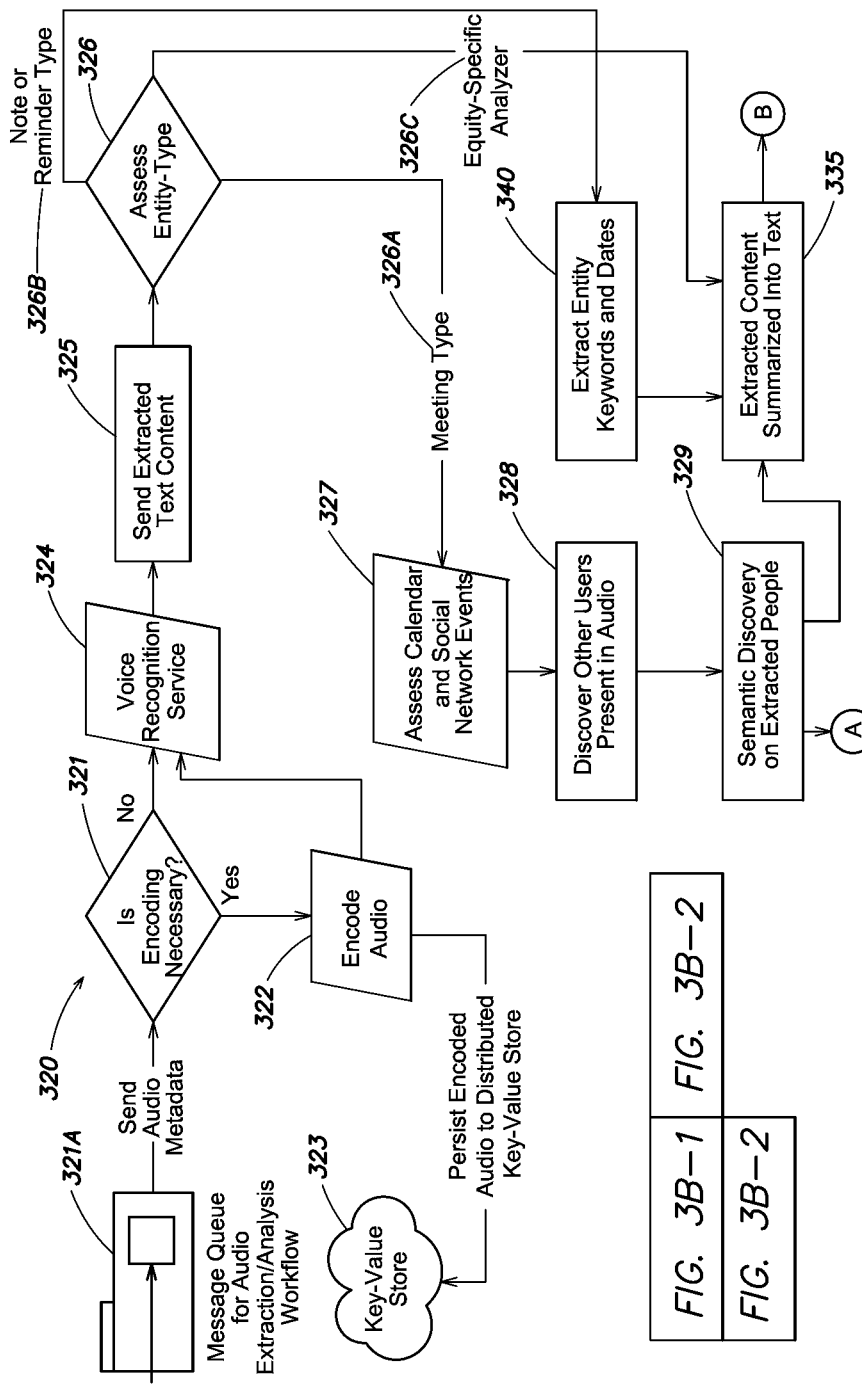
FIG. 3B is an example process and data flow model for processing capture media, according to one embodiment of the present invention.
Figures 2, 3B:
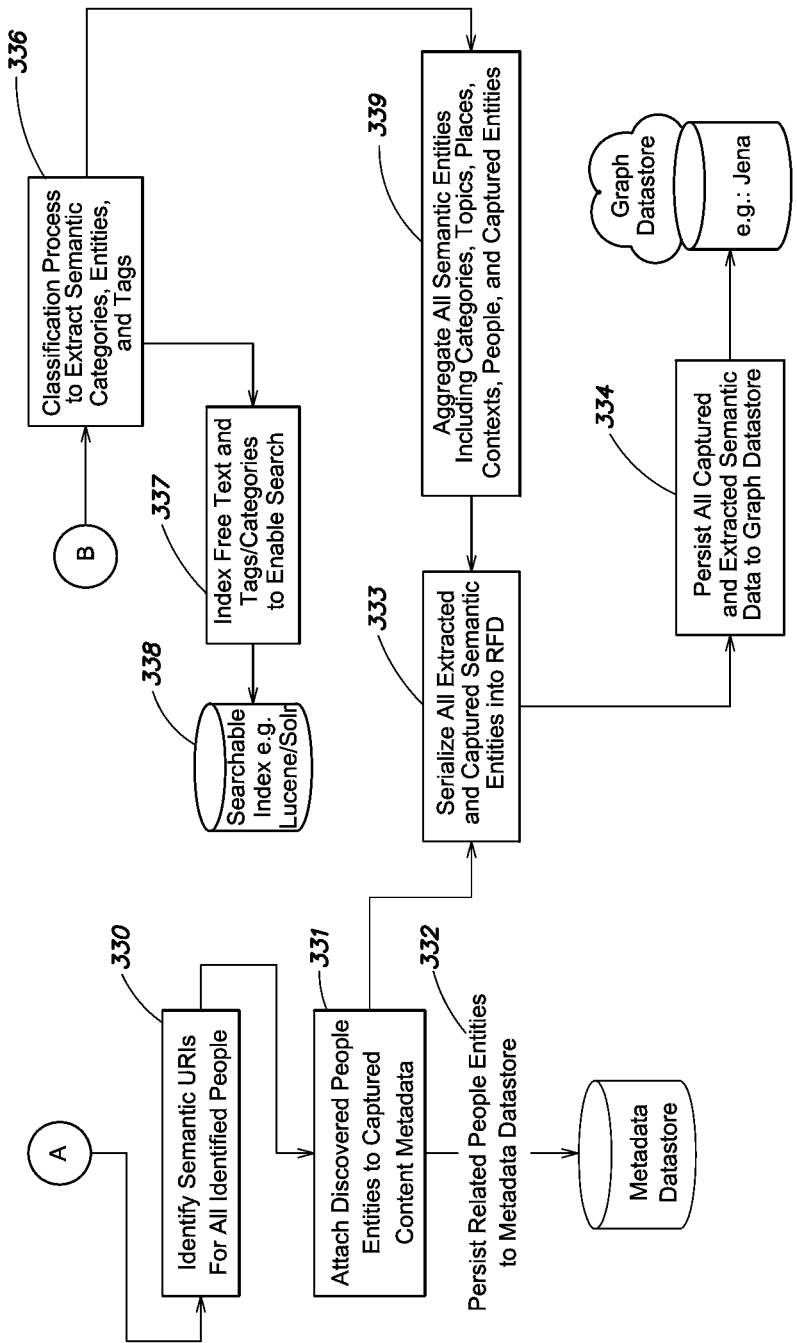
Figures 1, 3C:
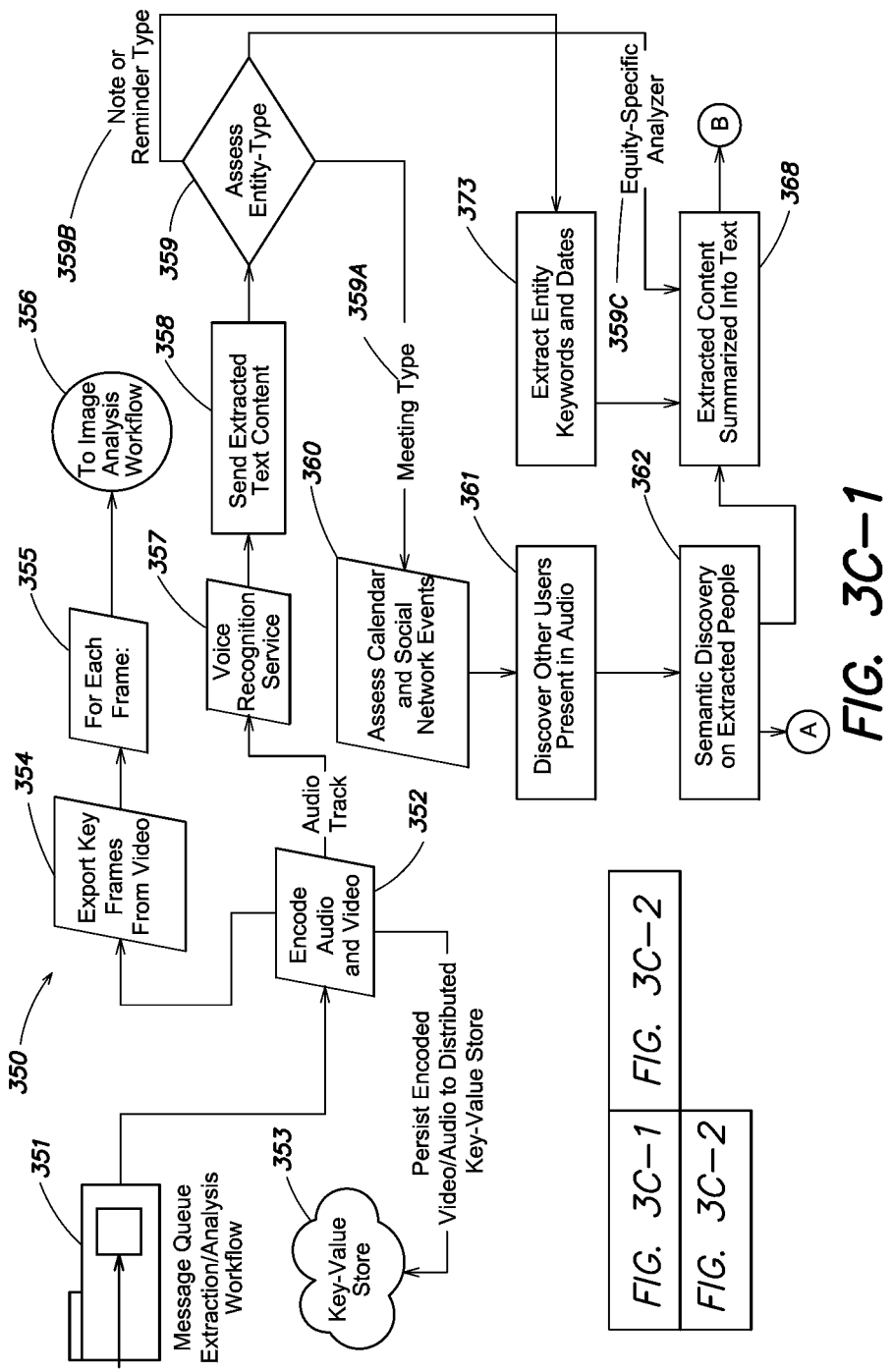
FIG. 3C is an example process and data flow model for processing capture media, according to one embodiment of the present invention.
Figures 2, 3C:
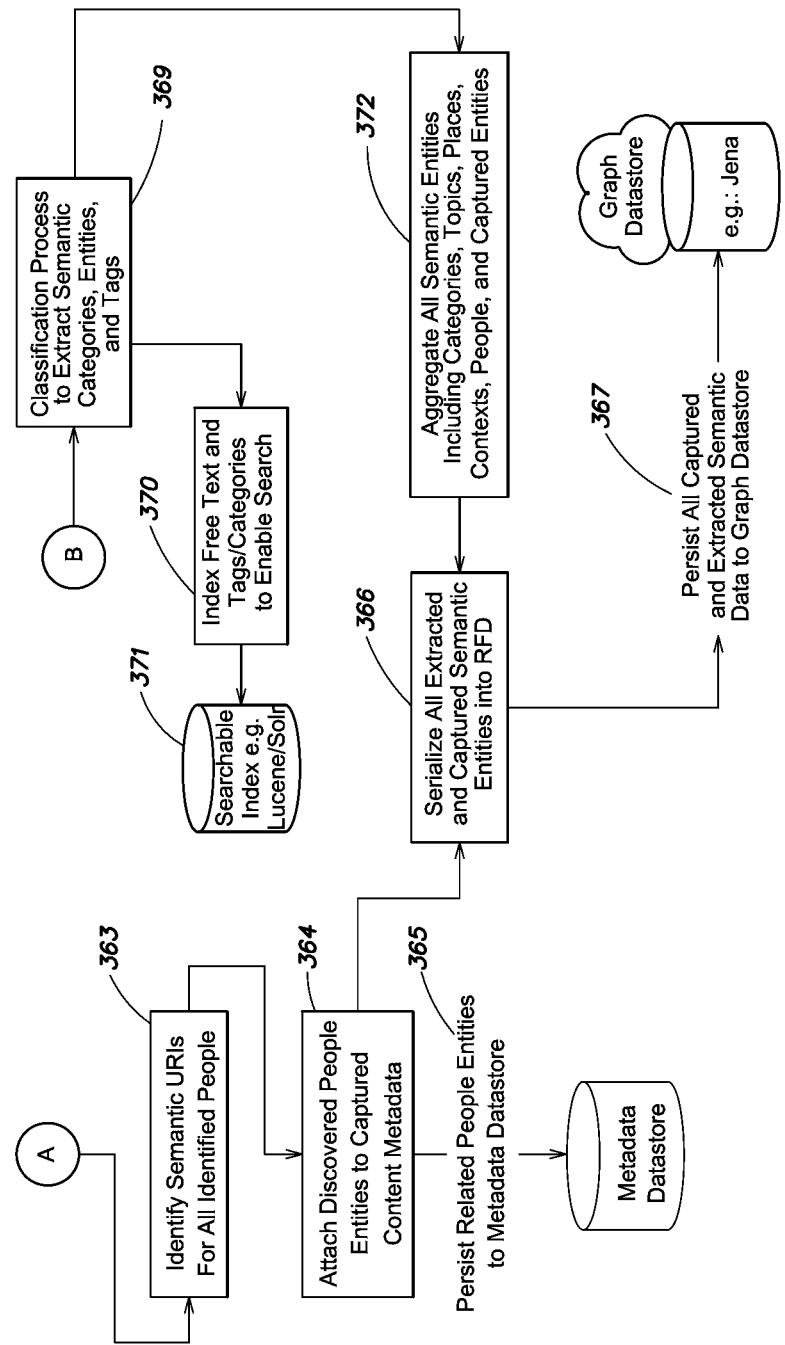
Figures 1, 3D:
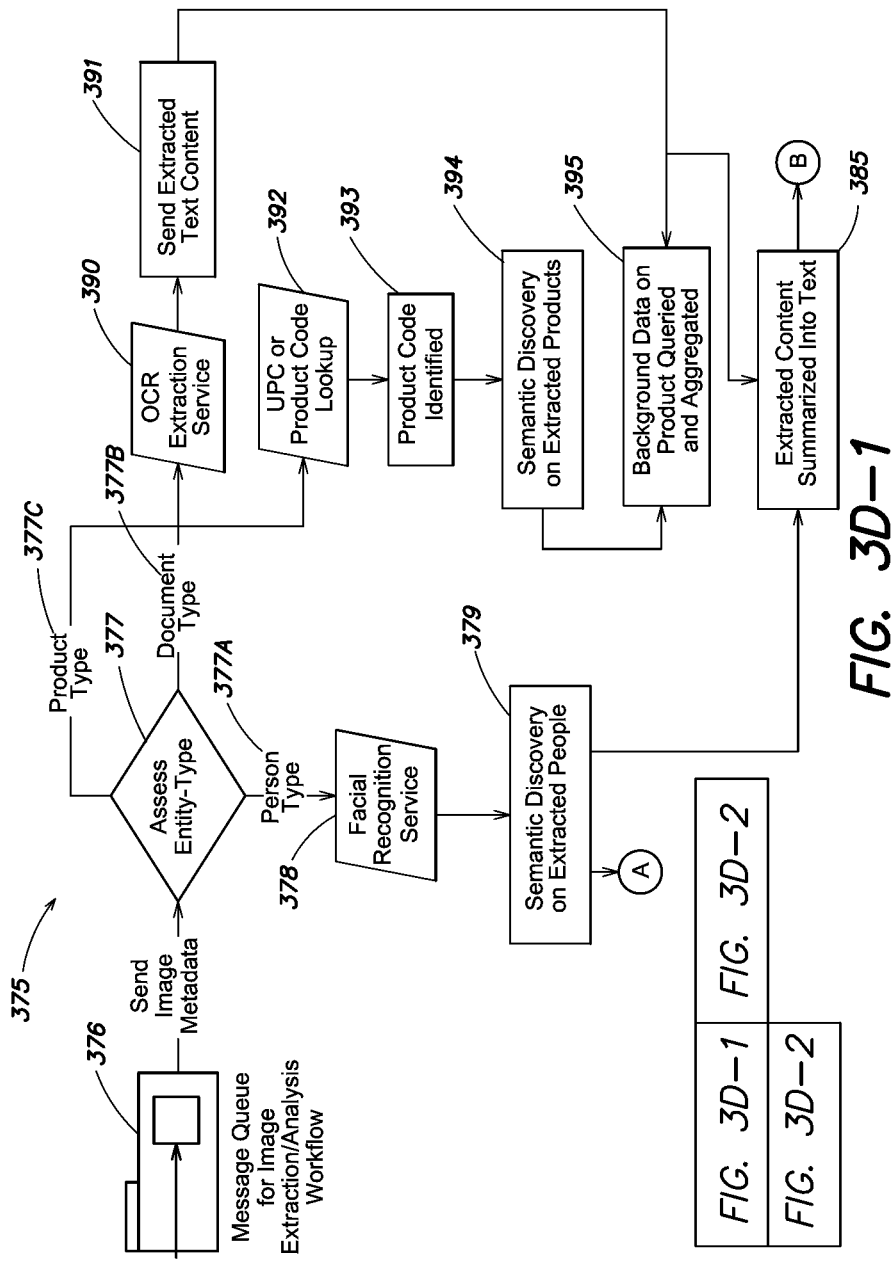
FIG. 3D is an example process and data flow model for processing capture media, according to one embodiment of the present invention.
Figures 2, 3D:
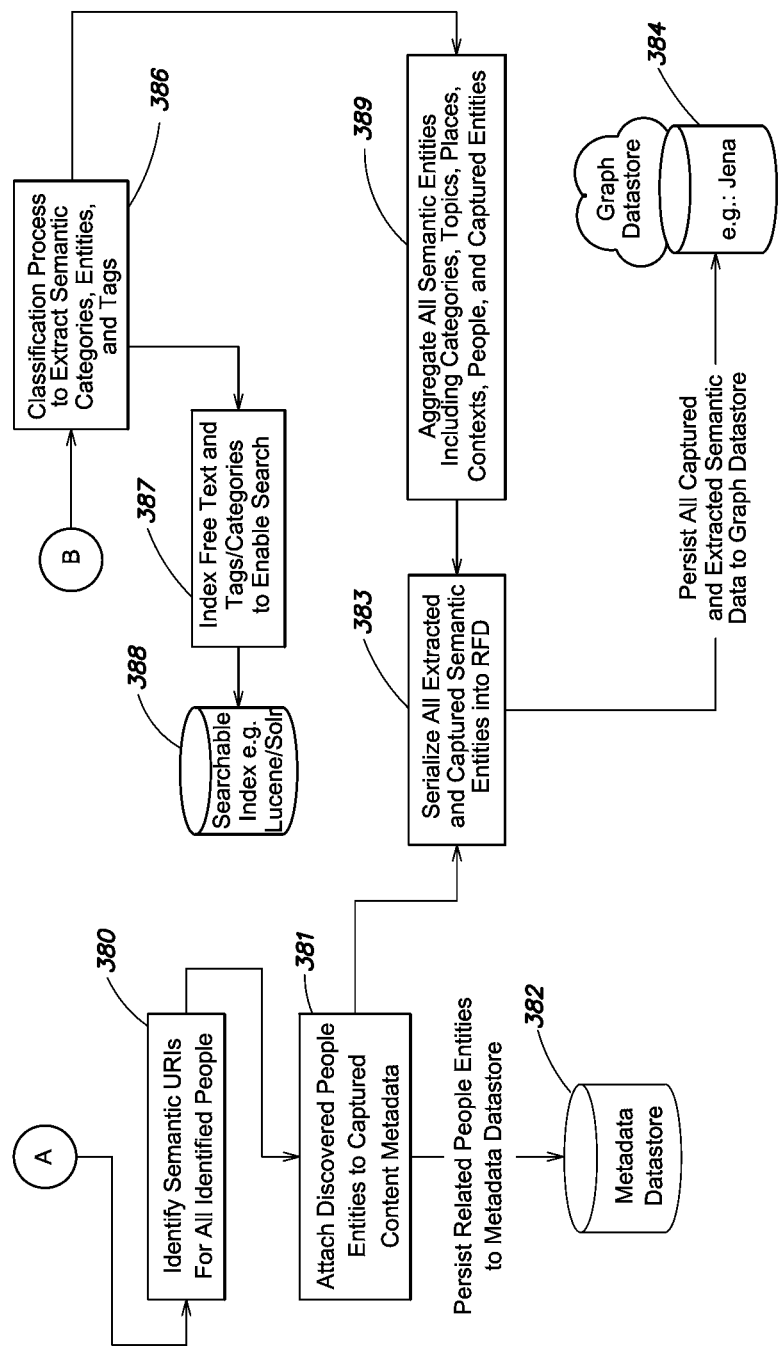
Figure 4A:
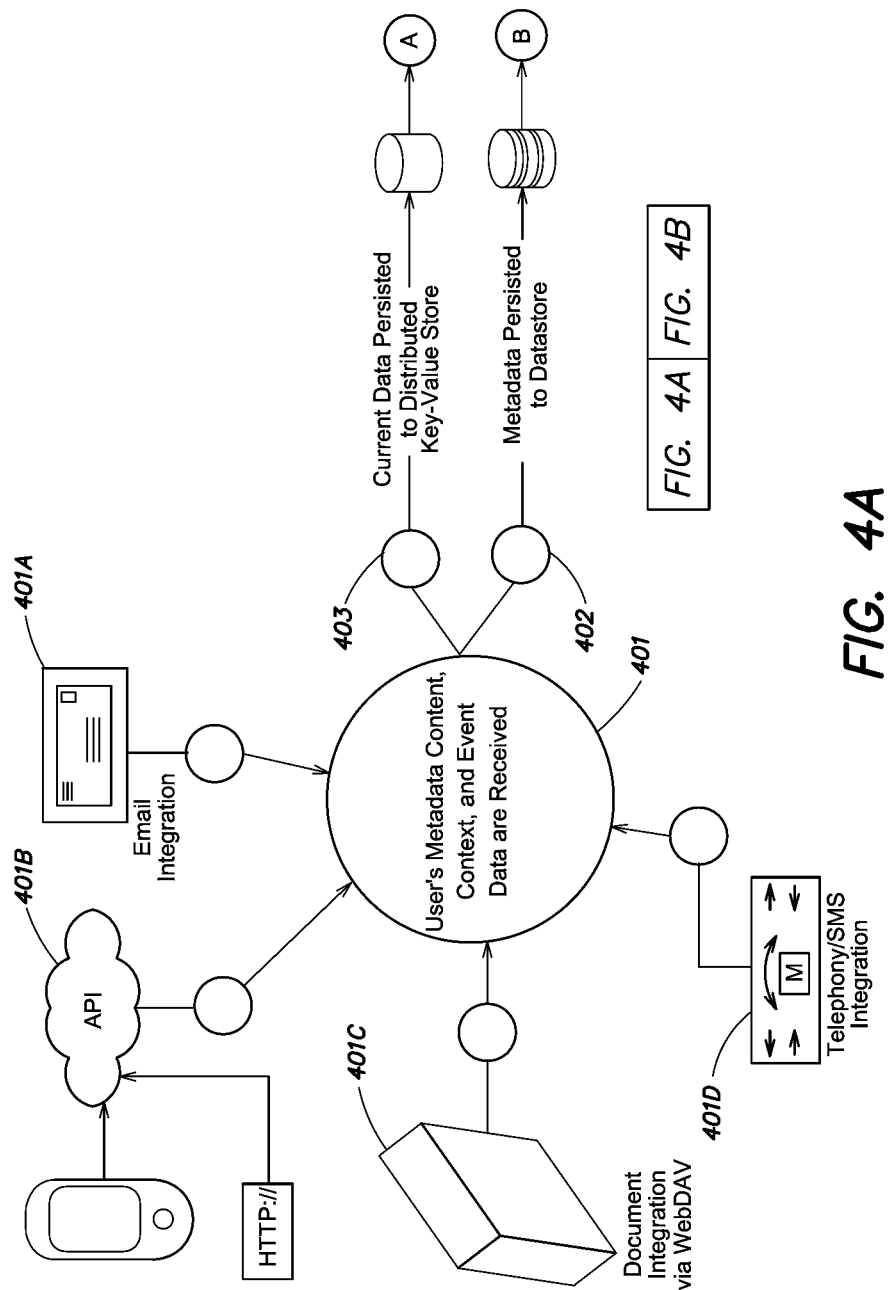
FIG. 4 illustrates an example extraction/analysis workflow for captured data and metadata, according to one embodiment of the present invention.
Figure 4B:
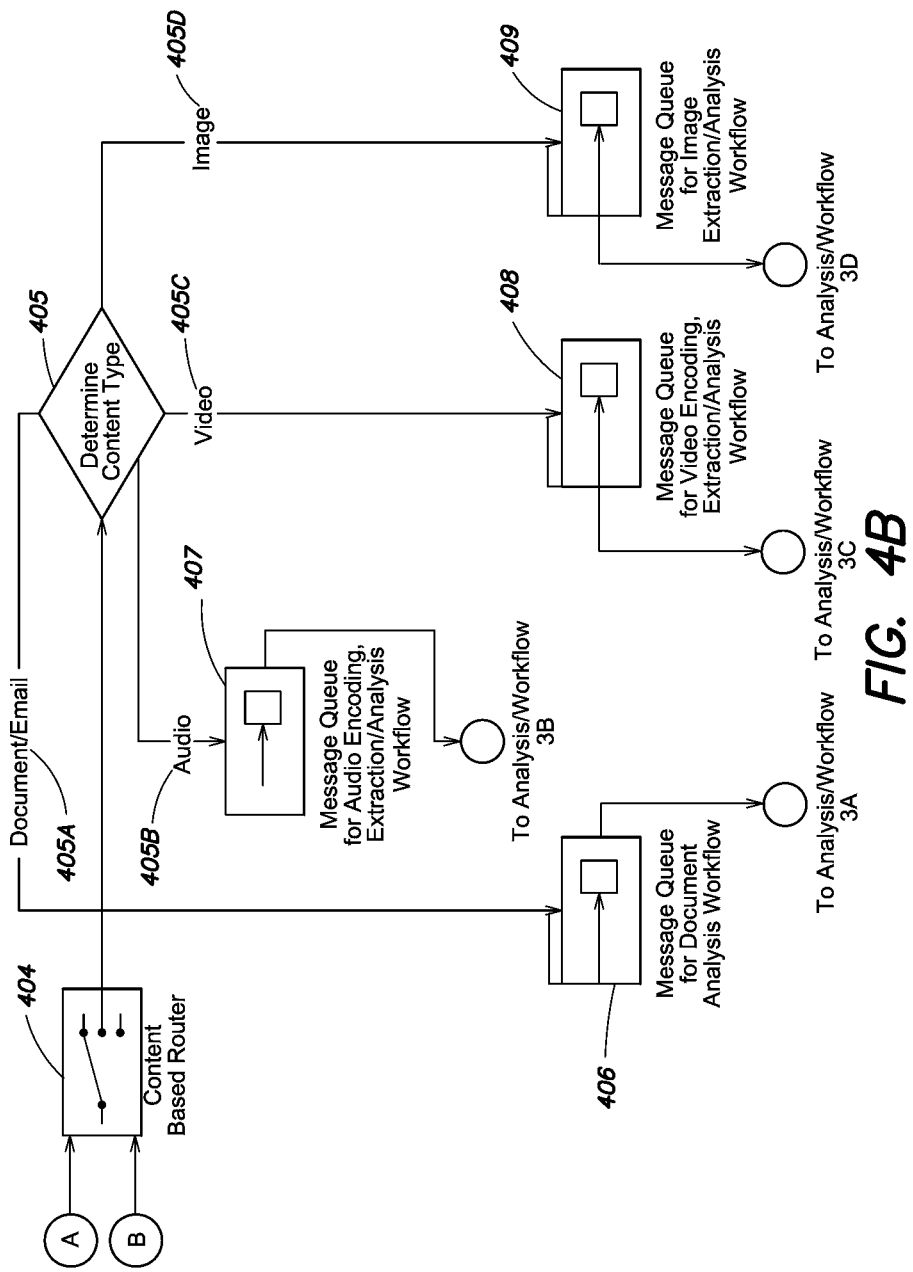

FIG. 4 illustrates an example extraction/analysis workflow for captured user data and metadata. Shown in FIG. 4 is a process for analyzing the received user data and metadata and based on content identification and triggering sub processes for further extraction/analysis. Shown in FIGS. 3A-D illustrate examples of the workflow for each media type identified in FIG. 4. According to some embodiments, additional sub processes can be employed, as well as additional content types, each additional content type associated with its own extraction/analysis sub process.

At 401, the user's metadata, content/context, and event data can be received from a number of different sources. In some examples, metadata, content/context, and event data can be received from integrated e-mail services 401A, telephony and/or messaging services (e.g., SMS, text, IM, etc.) 401D, document services (including document integration through WebDAV) 401C, user devices, user web pages, social sites, other users, etc. at 401B through, for example, an API (application protocol interface).

In one embodiment, a mobile device with a mobile application installed is a source of metadata, content/context, and event data. Another possible source of information and/or metadata includes web-hosted document services, collaborative document services, and document versioning services (for example, services known as WebDAV). Other sources can include telephony and SMS services, which can be associated with a user during registration or during interaction with an information repository, for example, system 501. Once a service is integrated into a user profile, the service can be accessed to obtain information. Applications running on user devices can also be integrated during a registration process. In some embodiments, integration can occur during an information capture session. For example, a user can respond to a request for access to applications installed on a user device. Granting permission, for example, by the user can trigger a process to capture information from an e-mail application (e.g., Outlook) or other applications. In one example, an information repository can download an executable program that runs on the user device to capture application specific information. The executable program can identify information sources on the user's device and/or accessed using the user's device and request permission to access the sources of information.

In the example of a telephony and/or SMS services, voice messages and other audio recordings, as well as text messages, can be captured. The recordings can be used as a source of information on the user, and the user's context. Copies of the recording can be stored as content data, and the recordings can be processed to extract semantic data, metadata, etc. Additional sources of information can include integrated e-mail services and/or applications.

At 402, metadata that is captured is persisted to a datastore. In some embodiments, multiple datastores can be configured to persist and/or store information. In one embodiment, metadata information that describes an data capture item can be stored in a metadata datastore. At 403, the content data that is captured is copied to a content datastore. In one embodiment, the content datastore is implemented as a distributed key-value store. At 404, both the metadata in the datastore and the content data copied to the distributed key-value store is sent to a content based router.

The content based router analyzes the received content data and metadata to determine a processing path based on the content type of the received data at 405.

If the content is a document or email that contains no additional content types 405A, then it is routed to the message queue for document analysis workflow at 406—an example process for document analysis is illustrated in FIG. 3A. If the content is a document or email that does contain additional content type(s), then only the document or text portion of the email is routed to the message queue for document analysis workflow. If the content type is determined as e-mail and any other content type, then any remaining portion of the content is further analyzed at 405 to determined additional content types and any other portion(s) are routed to the various sub processes based on their associated content.

For example, if the content is determined to be audio at 405B—whether standalone or attached to a document or an email—then that audio content is routed to the message queue for audio encoding, extraction/analysis workflow at 407. One example audio encoding extraction/analysis workflow is illustrated in FIG. 3B.

If the content is determined to be video at 405C—whether standalone or attached to a document or an email—then that video content is routed to the message queue for video encoding, extraction/analysis workflow at 408. One example of a video encoding extraction/analysis workflow is illustrated in FIG. 3C.

If the content is determined to be an image at 405D—whether standalone or attached to a document or an email—then that image content is routed to the message queue for image extraction/analysis workflow at 409. One example image encoding extraction/analysis workflow is illustrated in FIG. 3D.

Shown in FIG. 3A is an example workflow 300 for extraction/analysis of received data according to one embodiment. Content in the form of documents can be received from the message queue along with the captured and associated metadata. The first step in the workflow can include determining the origination method used in capturing the content. There are many possible origination methods, including but not limited to, the three example origination methods depicted in the workflow in FIG. 3A: direct upload, mail integration, or file integration. Other origination methods can be process as discussed in workflow 300.

A message queue process can be configured to access a message queue at 301 to obtain document content and metadata to determine the origination method for the content at 302. If the document was captured via a direct upload 302A, the content then undergoes a classification process at 303. In some embodiments, classification processing includes extracting semantic categories, entities, free text, and tags from the document content and metadata at 303. In other embodiments, classification processing can include receiving information additional on document content from other sources, including, for example, data from other origination method processing. The data extracted at 303 can be indexed at 304 to enable searching and retrieval of the content data, for example, at 304. In one example, free text, tags, and/or categories extracted at 303 can be indexed to enable searching. The index can be stored in a database at 304. Some example search and retrieval platforms/format include the known LUCENCE/SOLR data platform. The semantic entities extracted at 303 are aggregated (including categories, topics, places, contexts, people, and captured entities). The aggregated semantic entities can be serialized into RDF (resource description framework) format records at 305, for example, as a triple: subject, predicate, object. Each entity can be persisted to a semantic datastore. In one embodiment, the semantic datastore can be a graph datastore with semantic entities represented as nodes; persisting of the entities can occur at 306. In one example, an RDF triple in the semantic datastore can have a subject (start node), predicate (relationship), object (end node). Subjects, predicates, and objects are each uniquely and externally referenceable, thereby facilitating the creation of semantic links between RDF triples, by implicitly or explicitly referencing the identifier of a subject, predicate, or object from one triple to another. New links are created on inserting a new triple to the datastore, and nodes are reused if similar nodes already exist. In one embodiment, the relationships defined in the graph datastore based on the linkages permit efficient retrieval of connected information for use in data capture processing and/or recommendation generation.

If the document was captured through email integration 302B, then the mail headers, recipients, time (and other relevant information parameters) are analyzed at 307, and relevant entities (including for example, semantic entities) are extracted from the analyzed information at 308. For example, the analyzed information can be parsed to identify e-mail recipients as people, organizations, meeting locations, etc. In another example, time contexts can be captured from analyzed e-mails information. E-mails delivered as chains can include timelines for analyzed information. Based on the results of the analysis, semantic discovery is performed on the extracted people, events, context, and subjects/topics at 309.

According to some embodiments, semantic discovery can include a process(es) of analyzing available metadata and content, including but not limited to, events, location, user behavior, external services and social network, analysis performed by facial recognition, voice recognition, and OCR, to locate semantic resources, individuals, entities, and topics within or to associated with the capture data. Semantic discovery is configured to access any data and content that is available including, for example, information sources associated with the user capturing the data, other semantic data already stored, received metadata, and information identified by other origination processing, to associate semantic resources, individuals, and ontologies with the captured content. In some embodiments, the metadata associated with content items can include semantic as well as other forms of data which can be analyzed to extract relevant entities at 308 and used for semantic discovery at 309.

According to some embodiments, a semantic entity can be generated as the result of a semantic discovery operation at 309. Semantic data obtained at 309 can used in generating classifications at 303 incorporating any metadata and associated information captured on extracted entities into classification at 303. For example, background data on extracted entities can be aggregated into captured entities at 310, and then the information obtained at 310 can be used as part of classification of the information at 303. In one embodiment, a semantic entity can be represented by a URI within a particular graph datastore. In some embodiments, semantic entities are serialized as RDF records at 305. For example, semantic entities can be defined as triple: subject predicate object. Triples can conform to the same basic structure to define chunks of semantic meaning. In one embodiment, each item within a triple is either a URI or a literal. A URI in the triple can reference a globally unique identifier intended to represent a particular semantic individual or concept. A literal is often a simple value that does not need an abstraction, such as the number 3 or the string "blue". However, subjects, predicates, and objects are typically represented by URIs that reference resources that can be further correlated within a particular semantic graph datastore.

According to one embodiment, semantic discovery at 309 can generate semantic URIs for identified people at 315, and also generate content about those individuals. The URIs (or the discovered people entities) are attached to the content metadata from the images at 311. These people entities that are related to the metadata are persisted, for example, in the metadata datastore at 312. According to one embodiment, the URIs and generated content from 309, 315, and 312 are also serialized into RDF records at 305, and are persisted, for example, to the graph datastore at 306. The content about the individuals resulting from the semantic discovery, as well as the information about events and subjects/topics, is extracted and summarized into text, and can undergo a classification process to extract semantic categories, entities, and tags. From this process, free text and tags/categories are indexed to enable search and stored in a searchable index, and all semantic entities (including categories, topics, places, contexts, people and captured entities) are aggregated and serialized into RDF, and persisted to the graph datastore.

If the document was captured through file integration at 302C, then the incoming directory, file metadata, and sibling files are assessed at 313. In one embodiment, a computer system and/or system component can be configured to evaluate incoming directory, file metadata, and sibling files are assessed at 313. File integration analysis can include accessing retrieving information stored on shared network storage spaces, online storage services, ftp sites, etc. For example, text content can be extracted from incoming directory, file metadata, sibling files, and any information obtained from other file integration sites at 313. The information can be communicated for semantic discovery at 309.

In one embodiment, semantic discovery can be performed on the extracted people, events, and subjects/topics at 309. Semantic discovery can generate semantic URIs for identified people, and also generate content about those individuals at 315. The URIs (or the discovered people entities) are attached to the content metadata from the images. These people entities that are related to the metadata are persisted in the metadata datastore. Also, the URIs, are serialized into RDF, and are persisted to the graph datastore. The content about the individuals resulting from the semantic discovery, as well as the information about events and subjects/topics, is extract and summarized into text, and then undergoes a classification process to extract semantic categories, entities, and tags. From this process, free text and tags/categories are indexed to enable search and stored in a searchable index, and all semantic entities (including categories, topics, places, contexts, people and captured entities) are aggregated and serialized into RDF, and persisted to the graph datastore.

Shown in FIG. 3B is an example extraction/analysis workflow 320 according to one embodiment. Audio content can be accessed from the message queue at 321A along with the captured and associated metadata. According to one embodiment, the first step in the workflow can be to determine whether encoding is required for the audio content or not at 321. If encoding is required 321 YES, then the audio will be encoded at 322, and the encoded audio can be stored to database. In one example, encoded audio can be persisted to a distributed key-value store at 323.

After encoding is performed at 322, or if encoding is not required 321 NO, the audio can be sent to a voice recognition service to extract computer interpretable data from the audio source. In some embodiments, the voice recognition service can be an external service provider, in another embodiment the voice recognition service can be implemented as a system component configured to extract computer interpretable data from an audio source. In yet another embodiment, the voice recognition service can be a computer executed process configured to extract computer interpretable data from an audio source.

In one example, the service can extract the audio source into text format at 324, and text content can be communicated for further analysis. Based on the extracted text communicated at 325 and the metadata created during the audio capture, the entity-type of the audio is determined at 326. There are many possible entity types, including but not limited to the three depicted in the workflow in FIG. 3B: meeting, note/reminder, or other entity-specific types. In some embodiments, additional entities can be reviewed for further data extraction. In particular user defined entities can also be processed for extraction and/or classification.

In one embodiment, if the entity is a meeting 326A, then other information sources associated with the user can be accessed to discover other meeting participants. A user can be associated with an Outlook account, or other meeting scheduling applications which can be queried to obtain information on the details of the current meeting. In other embodiments, such associated information can be already be stored in an information repository, and the information repository accessed to obtain further information.

For example, the user's calendar and social network events can be assessed at 327 to discover other users present at the time the audio recording was captured at 328. Based on the results, semantic discovery can be performed on the people identified as present at 329.

According to one embodiment, semantic discovery can generate semantic URIs for the identified people at 330, and the semantic URIs can be used to capture content about those individuals. For example, the data captured and any metadata from 321 can be associated with the identified people and the semantic entities that can be newly defined for them. In another example, the identified people can have semantic entities already associated with them, that can be used to augment the extracted data being processed. The URIs representing the identified people entities can be attached to the content metadata from the data capture at 331. These people entities now include a reference identifies the relationship to the capture data and the metadata. In one example, the metadata and semantic people entities can be stored in a database.

For example, the metadata with the people entity references can be persisted in the metadata datastore at 332. According to one embodiment, the identified people, the extracted data, and the metadata can be serialized into semantic entities. For example, the URI references to the extracted data, metadata, and/or identified people, are serialized into RDF format at 333, which can be persisted to a graph datastore at 334.

Any content obtained on the discovered individuals resulting from the semantic discovery can be extracted and summarized into text at 335. In one embodiment, the content undergoes a classification process at 336 to extract/identify semantic categories, entities, and tags for the content. At 337, free text and tags/categories can also be extracted from the content, the free text, categories, tags, and/or entities can be indexed at 337 to enable search in a searchable index 338, for example, within the known LUCENCE/SOLR data platform. At 339, the semantic entities (including categories, topics, places, contexts, people and captured entities) are aggregated and then serialized into RDF at 333. The serialized data can be persisted to the graph datastore at 334.

According to one embodiment, if the entity is a note or reminder 326B, then entity keywords, dates, and other information are extracted from the content and summarized into text at 340. The content then undergoes the classification process discussed to extract semantic categories, entities, and tags (e.g., 335-339). As discussed, free text and tags/categories are indexed 337 to enable search and/or storage in a searchable index 338. Any semantic entities (including categories, topics, places, contexts, people and captured entities) are aggregated 339 and serialized into RDF at 333, and persisted to the graph datastore at 334.

In one embodiment, for other entities besides meetings and notes, the extracted content is process by an entity-specific analyzer 326C. The content undergoes a similar classification process as performed on meeting type data or note/reminder type data to extract semantic categories, entities, and tags 335-336. Free text and tags/categories are indexed 337 to enable search and/or storage in a searchable index 338, and any semantic entities (including categories, topics, places, contexts, people and captured entities) are aggregated at 339 and serialized into RDF at 333, which are persisted to the graph datastore 334.

Shown in FIG. 3C is an example workflow for extraction/analysis 350, according to one embodiment. Video content is received from the message queue at 351 along with the captured and associated metadata. According to one embodiment, the first step in the workflow can be encoding of the video at 352. The video and any audio can be encoded at 352 and the encoded video and audio can be persisted to a distributed key-value store at 353.

After encoding is performed, key frames from the video can be captured and exported at 354 to an image analysis workflow queue along with any associated metadata. Each exported frame 355 can be processed by an image analysis workflow queue at 356 along with any associated metadata. In one embodiment, key frames are processed as images using, for example, the workflow 375 described in FIG. 3D.

In addition, after encoding is performed, the audio track from the video can be sent to a voice recognition service at 357. The service then extracts the audio to text, and returns back the text content at 358. Based on the extracted text and the metadata created during capture, the entity-type of the audio is determined at 359. There are many possible entity types, including but not limited to the three depicted in the workflow in FIG. 3C or 3D: meeting, note/reminder, user define, or other entity types.

In one embodiment, if the entity is a meeting 359A, then other information sources associated with the user can be accessed to discover other meeting participants. A user can be associated with an Outlook account, or other meeting scheduling applications which can be queried to obtain information on the details of the current meeting. In other embodiments, such associated information can be already be stored in an information repository, and the information repository accessed to obtain further information.

For example, the user's calendar and social network events can be assessed at 360 to discover other users present at the time the video/audio recording was captured at 361. Based on the results, semantic discovery can be performed on the people identified as present at 362.

According to one embodiment, semantic discovery can generate semantic URIs for the identified people at 363, and the semantic URIs can be used to capture content about those individuals. For example, the data captured and any metadata from 351 can be associated with the identified people and the semantic entities that can be newly defined for them. In another example, the identified people can have semantic entities already associated with them, that can be used to augment the extracted data being processed. The URIs representing the identified people entities can be attached to the content metadata from the data capture at 364. These people entities now include a reference identifies the relationship to the capture data and the metadata. In one example, the metadata and semantic people entities can be stored in a database.

For example, the metadata with the people entity references can be persisted in the metadata datastore at 365. According to one embodiment, the identified people, the extracted data, and the metadata can be serialized into semantic entities. For example, the URI references to the extracted data, metadata, and/or identified people, are serialized into RDF format at 366, which can be persisted to a graph datastore at 367.

Any content obtained on the discovered individuals resulting from the semantic discovery can be extracted and summarized into text at 368. In one embodiment, the content undergoes a classification process at 369 to extract/identify semantic categories, entities, and tags for the content. At 370, free text and tags/categories can also be extracted from the content, the free text, categories, tags, and/or entities can be indexed at 370 to enable search in a searchable index 371, for example, within the known LUCENCE/SOLR data platform. At 372, the semantic entities (including categories, topics, places, contexts, people and captured entities) are aggregated and then serialized into RDF at 366. The serialized data can be persisted to the graph datastore at 337.

According to one embodiment, if the entity is a note or reminder 359B, then entity keywords, dates, and other information are extracted from the content and summarized into text at 373. The content then undergoes the classification process discussed to extract semantic categories, entities, and tags (e.g., 368-372). As discussed, free text and tags/categories are indexed 370 to enable search and/or storage in a searchable index 371. Any semantic entities (including categories, topics, places, contexts, people and captured entities) are aggregated 372 and serialized into RDF at 366, and persisted to the graph datastore at 367.

In one embodiment, for other entities besides meetings and notes, the extracted content is process by an entity-specific analyzer 359C. The content undergoes a similar classification process as performed on meeting type data or note/reminder type data to extract semantic categories, entities, and tags 368-369. Free text and tags/categories are indexed 370 to enable search and/or storage in a searchable index 371, and any semantic entities (including categories, topics, places, contexts, people and captured entities) are aggregated at 372 and serialized into RDF at 366, which are persisted to the graph datastore 367.

Shown in FIG. 3D is an example workflow extraction/analysis 375, according to one embodiment. Image content can be received from the message queue 376 along with the captured metadata.

According to one embodiment, the first step in the extraction/analysis process determines the entity type depicted in the image at 377. There are many possible entity types, including but not limited to the three depicted in the workflow in FIG. 3D: persons, product, and documents. (For additional entity types, such as objects, additional extraction/analysis workflow steps can be created).

If the entity depicted is a person 377A, then the image is processed through a facial recognition service at 378, which is configured to return names of individuals in the image. Facial recognition service Based on the results, semantic discovery will be performed on the people.

In some embodiments, the facial recognition service can be an external service provider. In another embodiment the facial recognition service can be implemented as a system component configured to extract computer interpretable data from an image source. In yet another embodiment, the facial recognition service can be a computer executed process configured to extract computer interpretable data from an image source.

Semantic discovery is executed at 379 on, for example, the people identified at 378. In one embodiment, the semantic discovery at 379 can generate semantic URIs for identified people at 380, and also generate content about those individuals. For example, the data capture item and associated information, including context and the metadata, include information that can be associated with identified people, and stored as content.

In another embodiment, semantic discovery can identify corresponding semantic records for the identified people. The generated or discovered semantic entities can be associated to the content metadata. For example, the URIs representing the discovered people entities are attached to the content metadata from the images at 381. Newly generated semantic entities or new relationships can be stored for subsequent access. For example, the people entities that are related to the metadata are persisted in the metadata datastore at 382. Semantic entities can be formatted as RDF format data and stored in a database for later access. For example, the URIs can be serialized into RDF at 383, and then persisted to the graph datastore at 384.

In addition to identification of semantic entities, content about the individuals discovered can be extracted for further processing. In one example, the content about the individuals resulting from the semantic discovery can be extracted and summarized into text at 385. The extracted and/or summarized content can be process to classify and/or extract semantic categories, entities, and tags at 386. Free text, tags, and categories are indexed to enable search and stored at 387, in a searchable index, for example, a LUCENE/SOLR format database at 388.

The resulting semantic entities (including categories, topics, places, contexts, people and captured entities) are aggregated at 389 and then serialized into RDF format at 383, and persisted, for example, to the graph datastore at 384.

If the entity depicted in the image is a document 377B, the document image is sent to an OCR extraction service at 390, which returns extracted text content. In some embodiments, the OCR extraction service can be an external service provider. In another embodiment the OCR extraction service can be implemented as a system component configured to extract computer interpretable data from an image source. In yet another embodiment, the OCR extraction service can be a computer executed process configured to extract computer interpretable data from an image source.

The extract content is communicated at 391 for further classification at 385. For example, the extracted text content then undergoes classification to extract semantic categories, entities, and tags, 385-386. At this stage, if the entity captured in the document has been further defined during capture—ex. receipt, business card, whiteboard diagram—then entity-specific logic will be applied. In some embodiments, entity specific logic can include the processing discussed with respect to process 320 at 326 et seq. and process 350 at 359 et seq. For example, for a receipt the OCR service will look for certain information in the text and images. For a business card, the process is configured to also extract a person from the information provided on the business card. The process can also be configured to extract an organization entity from the information extracted from the business card.

Further processing can also be configured for customized OCR services. The custom OCR services can be configured to execute OCR processing specific to the entity identified in the data capture item.

From classification at 386, free text, tags, and categories are indexed at 387 to enable search. The free text, tags, and categories are stored in a searchable index at 388. The semantic entities (including categories, topics, places, contexts, people and captured entities) are aggregated and serialized into RDF, and persisted to the graph datastore, as discussed above (389, 383, 384).

If the entity depicted in the image is a product type 377C, a UPC or product code lookup can be performed at 392. Lookup at 392 is configured to return the identification of a product code at 393. Semantic discovery is then performed on the extracted products at 394, and background data on the product is queried and aggregated at 395. Both internal and external information sources can be queried to identify background data on the extracted products. The extracted and aggregated content is classified to extract semantic categories, entities, and tags at 385-386. Free text, tags, and categories are indexed to enable search at 387 and stored in a searchable index at 388. The semantic entities (including categories, topics, places, contexts, people and captured entities) are aggregated and serialized into RDF, and persisted to the graph datastore, as discussed above (389, 383, 384).

According to some embodiments of the present invention, a user can access, analyze, replay, and query the stored information and metadata and integrated services to recall information, extrapolate new meaning, and to perform various tasks. Various embodiments can be used to provide for the following use cases. The use cases are presented by way of example of features and functions of embodiments of the present invention and are not intended to be limiting.

1) Business meeting capture. A user can capture business cards, notes, and audio within the context of a business meeting, and is then later able to correlate attendees in the meeting with other information associated with the attendees, associate the semantic individuals speaking within the recording, and extract the semantic topics and concepts being discussed. These topics can then be used to search, discover, and associate other captured meetings (events) along with their captured items, associated individuals and so on.

In one embodiment, the user accesses a data capture application that is configured to automatically identify the business meeting context. The data capture application can be further configured to capture any data item with the associated context. For example, the application can capture and automatically extract data from business cards, notes, and audio. In one embodiment, the application is configured to extract semantic entities, semantic topics, and/or concepts being discussed in the business meeting.

2) Purchasing. In a shopping setting, users can track what items or even what types of items they purchase within a month. Users can also correlate how much they spend to other parameters, analyzing by purchase type, or even whether they spend more when shopping with a particular person. Users can capture and receipts and associate items to business expenses automatically, using item type or location as indicators, allowing expense reports to be generated automatically. Users can even save costs by comparing (for example, comparing anonymously purchase data marked as shareable or data that is implicitly shared between users associated by the system) purchased item costs with other users' purchases to determine if they might reduce costs by taking advantage of sales or different stores.

In one embodiment, the user accesses a data capture application that is configured to automatically identify the purchase context or purchase items. The data capture application can be further configured to capture any data item with the associated context. For example, the application can capture and automatically extract data from, for example, a captured receipt. In one embodiment, the application is configured to extract semantic entities, semantic topics, and/or concepts being discussed from the capture date item, purchases, receipt, etc.

3) Food shopping: various embodiments of the present invention can be utilized to help users shop for groceries, by tracking receipts and purchases, assessing food items purchased and associated dates. The analysis executed by one system embodiment is configured to determine a user's purchasing behavior. For example, the system can infer a user's behavior related to frequency of particular purchases as well as the rate of use. Various embodiment can then be used to generate implicit shopping lists. Further embodiments can discover ways to save costs by locating less expensive prices for the same products or related coupons, or even better deals on competing products (as the various embodiments are configured to understand not only the identifier for a given product, but also what the product is and what the product is used for. Additionally, users can access system embodiments configured to, for example, find recipes for items currently in the fridge or being purchased.

4) Implicit sharing: in some implementations computer systems, modified as discussed herein, are able to share documents implicitly between users accessing the system (if granted privilege by users). For instance, various system embodiments can be configured to infer a user's colleagues or friends in order to implicitly share captured items with others (such as photos or notes). Further, some embodiments can be configured to determine a user's colleagues or friends based on a user's friends or colleagues working on projects of the same topic, scope—or even the same project. For instance, relevant documents and notes can be automatically shared with those working on the same efforts, without requiring this to be done explicitly.

In one embodiment, virtual groups can be generated automatically to identify users and/or a context for the virtual groups. Virtual groupings can be used in various embodiments to identify users and/or specific data items to implicitly share. The sharing enabled can be limited, in some embodiments, to the context(s) identified with the virtual group.

5) Time tracking and client billing. Currently, many professional services employees expend a lot of effort on time tracking, which often requires detailed time sheets. Various embodiments are configured to allow time tracking/time entry details to be implicitly tracked and analyzed. For example, in one embodiment, tasks such as file creation and iterative versions, notes, and emails can be automatically captured, indexed to enable searching, and categorized.

Various embodiments are configured to allow tasks, timing, and associated information to be implicitly associated with topics, projects, and clients. For example, using the WebDAV integration, time worked on creating and revising documents can be meticulously tracked automatically. Various embodiments, are configured for automatic time tracking. Automatic time tracking generates stored time records assessable by any one or combination of topic, client, and collaborators. Furthermore, sharing of documents can be enabled as described above, including sharing of as notes and minutes of meetings, as well as client specific purchases and expenses.

System Example

Figure 5:
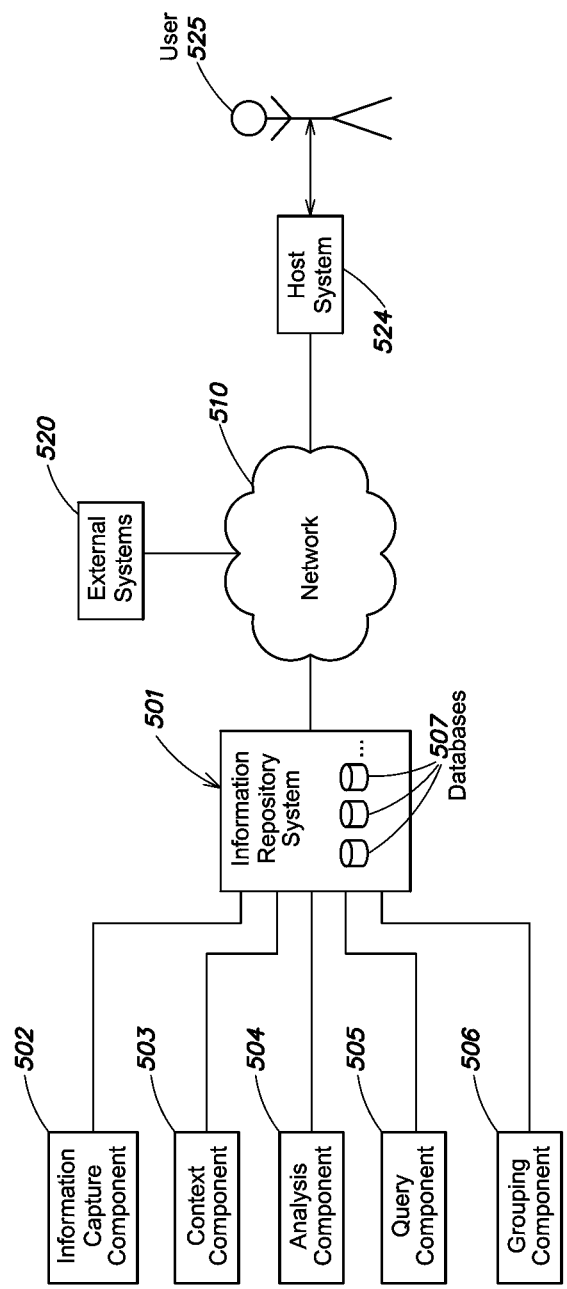
FIG. 5 illustrates an example architecture for a system for facilitating metadata capture and analysis, according to one embodiment of the present invention.

Shown in FIG. 5 is an example architecture of an information repository system 501 which may integrate with one or more components 502-506 or other systems which house one or more of components 502-506 to perform the functions associated with the information repository system.

The information repository system 501 can be configured to communicate with multiple outside information sources. For example, system 501 can capture user data over network 510, which can include intra and internet connections, as well as LAN, WAN connections and can include, for example, the Internet. System 501 can access external systems 520 directly or may do so through various interfaces and/or programs configured to permit access, for example, on a user computing device. In some examples, external systems include cellular systems and associated accounts and/or other wireless systems and associated accounts. In further examples, cellular and/or wireless accounts can be configured to permit access to GPS location information, photos, audio, video, notes, calendar information, social contacts, transaction and purchase history, e-mail, text, and other IM activity, as some examples.

Other external systems 520 include social networking sites, public data stores, public semantic data repositories, as well as private information sources reflecting any of the above. External systems 520 can also be associated with devices used to access external systems. External devices (e.g., a portable communication device such as a PDA, cell phone, GPS mapping device, smart phone, or other device) can be coupled to communication network and can be used a source of information associated with a user. In some embodiments, system 501 can be configured to query information directly from external accounts and/or associated. In other embodiments, system 501 can receive information from the external accounts and/or device and perform operations using locally stored information.

In some examples, an end user interacts with the information repository system 501 through a host system 524 connected to network 510. Host system 524 is intended to include conventional desktop computer systems, laptops, cell phones, portable computing devices, smart phones, and other portable computing media (Kindle, iPad, etc.).

According to some embodiments, executable plug-ins can be installed on host computer systems. Plug-ins can be used to facilitate user-specific or organization specific information capture scenarios. In some examples, users can "install" particular plug-ins that provide specialized functionality. Plug-ins can be downloaded from a server system for installation by any user. Various embodiments provide installable plug-ins and plug-in extensibility mechanisms. Some embodiments provide a default set of plug-ins to enable various features of the invention. Additionally, users can be permitted to create their own plug-ins as well, which can be configured for installation on the server or on client-side computer systems.

According to some embodiments, the plug-in mechanism is intended to provide ongoing, asynchronous assessment and analysis for a set of features and capabilities that a user finds useful. In one example, if a user is interested in tracking their expenses and correlating them with clients as well as summarizing purchases by product and category type, the user can elect to activate this feature by enabling the plug-in that provides this feature. Installed plug-ins can perform ongoing, asynchronous analysis of a user's captured items along with internal and external contexts, events, metadata, social networks and webservices in order to provide the discovery analysis and/or assessment. Further, installed plug-ins can perform ongoing analysis to deliver, for example, contextual assessments and/or recommendations for user activity.

According to some embodiments, all of the various features and query options are not installed for each user. Rather certain subsets can be provided as a default and functionality can be extended by selecting plug-ins to install. According to one embodiment, the plug-in mechanism enables users to select relevant queries and analyses to be performed, minimizing processing and overhead. The various features and processes discussed can be performed by installed plug-ins, supporting user relevant queries and analyses, which can include OCR, voice recognition, querying internal and external semantic RDF, graph/triple datastores using sparql and other semantic or RDF querying technologies, as well as leveraging semantic reasoners, rule engines, and performing inference across internal and external data services.

In some embodiments, system 501 captures information from user 525 in order to access various external networks (e.g., user name, password, account number, registration number, authentication information, date of birth, mother's maiden name, etc.) as part of a registration process. In some examples, system 501 is configured to automatically obtain access to external systems using any information available regarding an end user. In some embodiments, the information capture component 502 is configured to automatically obtain information from external systems 520 when information is being received by information repository 501, for example, when an end user initiates an information capture session.

User information captured during user activity can be transmitted to information repository system 501 and associated with a context based on determinations made by a context component 503. Context component 503 can be configured to determine what activity is being performed during information capture, information input, and/or information transmission providing a context to the information being stored. Context can include where the operations are being performed, specific locations at which the activity is being performed, as well information associated with the device on which the activity is being performed, information on the user capturing the information, information associated with the information being captured, and can also include other data.

According to one embodiment, context component 503 is configured to determine possible contexts for an information capture. According to one embodiment, context component 503 queries information associated with a user to determine possible contexts. Context component can be configured to query external accounts to obtain information to determine possible contexts. External accounts can include integrated user data sources, e.g., calendar integration and social network integration. Accessing, for example, calendar information can convey a user location and/or context based on scheduled meetings. Further, user behavior can be tracked and accessed by system 501, both as locally stored and/or analyzed information and as information from external sources.

A host system 524 can provide information on where the user is located (e.g., home, office, restaurant, gym, service location) and what device the user is using (e.g., home computer, portable computer, portable device) what content, if any, is being accessed (e.g., web-site, url, ftp, news feed, social network, im, text messaging, etc.) which can be used by the context component 503 to determine possible contexts for an information capture session. Further, what applications are being used on host computer 524 can provide additional information on context which can be captured/received by context component 503.

In other examples, external account systems can be accessed, for example, by context component 503, to capture context information. Capturing context information can include capturing information from location based service systems which can provide potential locations for a particular user. Lists of potential locations can be captured and displayed on a user device (e.g., 524) to permit the user to select from a list of potential locations returned based off of information retrieved, for example, from an external account. System 501 can provide a list of possible context to the user on a display on host computer 524. The user can be prompted to select a context from the list of possible contexts and the selection transmitted to system 501.

In some embodiments, system 501 can include an analysis component 504. The analysis component 504 can be configured to interpret collected information to determine semantic meanings behind particular activity, actions, context, and/or collected information. The analysis component 504 can be used to combine various sources of information and/or make associations between collected information. The analysis component can also be configured to discover any information associated with the combined sources. Associations can be made based on semantic meaning and/or predicted associations as discussed herein. In some embodiments, the analysis component can include a discovery component. The discovery component can also be configured to discover any information associated with the combined sources and/or discover associations based on semantic meaning and/or predicted associations as discussed herein. Further the discovery component can be configured to discover information from external information sources, as well as, information sources within an information repository.

Captured information, context information and analyzed information can be stored in databases, for example, at 507, connected to the information repository system 501. Data may be stored in separate databases based on the information collection and/or the component that collected it, or in some embodiments individual databases can be used to house all the information. In some examples, data is stored for access through web servers having their own databases (not shown).

According to one embodiment, system 501 can include a query component 505 can be configured to permit access to the information contained in system 501, and can also be configured to permit queries across the external systems 520, external devices, and any information associated with the user and/or user device accessible by system 501. The various sources of information can be queried individually or together. Further query component 505 can be configured to provide pre-defined queries for accessing information and information sources. Queries can be constructed using any number of approaches, boolean logic, semantic query, etc.

A grouping component 506 is configured to generate virtual groups. Virtual groups allow the sharing of information implicitly, and facilitates association of related context and/or event information. In one embodiment, virtual groups are generated from identification of a user's colleagues and/or friends. Colleagues and/or friends can be identified based on appearing in an being extracted from photos, working on the same document, participating in the meeting. External account analysis can also identify friends and colleagues. In some embodiments, virtual groups can be associated with a context. For example, in order to implicitly share captured items with others (such as photos or notes) the context can be evaluated to determine a match. In some embodiments, virtual groups and/or context for the virtual group can be communicated to the user for approval prior to use.

In some embodiments, the grouping component 506 can be configured to determine a user's colleagues or friends based on a user's friends or colleagues working on projects of the same topic, scope—or even the same project. For instance, relevant documents and notes can be automatically shared with those working on the same efforts, without requiring this to be done explicitly.

In some embodiments, system 501 can include a recommendation component. The recommendation component can be configured to generate recommendations on the basis of connected data, including delivery of alerts regarding a user's next morning meeting, an alarm automatically set where the timing for the alarm is set to insure timeliness for the meeting, a change in the meeting's location, directions to the new location, and warnings on when the user needs to leave their house to arrive at the meeting on time. Further, various systems and methods can already have captured the power point document being presented at the morning meeting, for example, based on semantic discovery of the topic of the meeting and associations made by the system to user e-mails received including the power point presentation. In some embodiments, the recommendations can be configured to identify user tasks, and other predicate needs and/or information requirements for the user's events based on, for example, determined predictions on semantic meaning and/or context.

In some embodiments, the recommendation component is configured comprehensive recommendations which can include identification of sub-tasks within events, required materials to complete tasks, required materials to complete sub-tasks, etc. The recommendation component can communicate reminders/recommendations based on the identification of any task, sub-task, and/or required acts or information.

In one embodiment, the recommendation component can capture information from an information repository storing, for example, semantic information on a user. For example, a semantic entity may be defined for the user in the information repository. Based on semantic analysis/discovery of the user and the user's behavior, the information repository can be configured with a rich data set of information associated with the user. The recommendation component can access, for example, the user's preferred mode of travel defined as a semantic link, or URI, that is accessed to obtain information on the user's preferred mode of travel. The semantic information can include multiple links on a preferred mode of travel based on, for example, context. The preferred mode of travel can be linked, for example, to contexts including, time, day, weather conditions, etc. The information on the user's travel preferences can be readily accessed to generate recommendations on, for example, departure time, automatically configured alarms, and monitoring of traffic along the travel route, etc.

Implementation Examples:

In one embodiment, the system for metadata capture, extraction, and analysis includes at least one of the following elements:
- a user information repository with semantic capabilities
    - in some examples, the information repository is installed on a computer system that enables the capture and sourcing of a user's data and content from multiple sources
    - example sources include: location from a GPS-enabled mobile device, photos, audio, video, notes, calendar information, information about friends and social connections through social networks, transaction and purchase history, email, WebDAV synced folders, information from public data stores such as location-based services, information from public semantic data repositories)
- the user information repository further configured to capture additional information and metadata about the context and subject of the information being capture
    - In some examples, including but not limited to identity of individual, setting, object type, and other semantic information
- the user information repository further configured to analyze, manipulate, and enhance the data to extract and generate additional information
    - in some examples the additional information includes metadata, mashups, and semantic meaning during and after the capture stage
- a storage component configured to store the data and any additional data to allows it to persist
- a query component configured to allow system components or a user to make queries across single or multiple sources of data, either directly or through additional software applications designed to make pre-defined queries, of a semantic nature or otherwise
- a group component configured to predict virtual groups, wherein the virtual groups are configured to allow the sharing and association of items implicitly which can facilitate the pooling of information from different users around the same context or event
- a user interface configured to permit an end user to interact with the information repository, review and/or revise data and any additional information
    - in some examples the user interface is configured to display virtual groups to the end user
    - in other examples the user interface is further configured to allow the end user to accept/deny proposed virtual groups.

Various aspects of the invention address novel application of metadata, capture, extraction and analysis. According to one embodiment, the extraction of metadata from user information, persisting of the metadata in indexed form in searchable stores, and the conversion of the metadata into relevant semantic entities facilitates metadata capture, extraction and analysis. Furthermore, in some novel embodiments, systems and methods for capturing metadata include the prediction and effective recommendation of a user's context, as well as recommendation of relevant and viable semantic entity types and topics from which a user will be able to easily select. Through the aggregation of multiple external and internal datastores (such as a user's calendar, social networks, previous behavior, physical location), a user's friend's (friend within the context of the information repository platform) contributions (i.e. a colleagues contribution of captured items and events occurring within a similar context or timeframe), along with associated explicit metadata and extracted implicit metadata provided (directly or indirectly) by the user, various embodiments of the invention are able to make useful predictions related to the context, the topic, and/or the actual nature of what a user is attempting to capture.

In one embodiment, by recommending a narrow list of prospective options for user selection, the user can imbue the content and data which they are collecting, with a variety of compelling hints, metadata, context, and the semantic topics and ontology to which the captured data relates. The user is then able to easily specify which of the recommended and predicted options are most relevant. According to some embodiments, the end-result is that the user is able to provide many orders of magnitude more data to a system for capturing metadata, along with the ability for the system to leverage this enhanced data, metadata, context, and semantic entities and topics to perform a series of extraction and analysis workflows, from which several more layers of data may be captured/extracted.

According to some aspects, the prediction/recommendation capability provided can be used to facilitate an effective analysis/extraction workflow. In some embodiments, the prediction and recommendation capability enables the user to provide an adequate level of additional metadata and context in order to reach a tipping point where these data hints can then be used to extract and analyze a further level of compelling data.

According to some aspects, instead of relying on a user to manually provide massive amounts of data with each capture attempt, various systems can leverage the many data sources, such as a user's location, a location service's correlation of a location to a particular place, a user's calendar items to provide context of a concurrent event, previous behavior and patterns. According to some embodiments, any or all of these implicit data points can be leveraged to provide the necessary hints to make a set of accurate recommendations that a user can use to quickly and efficiently specify a great wealth of meaning in terms of context and semantic meaning.

According to other aspects, capturing metadata and creating semantic information out of that metadata provides the association of more content and information with the original data and metadata. Some embodiments can continuously build more and more data and metadata, and hence intelligence, about the user and the user's information and content. In some examples, this forms a cycle of extraction, analysis, and discovery that builds upon itself to continuously create and enhance intelligence—essentially extracting layer upon layer of rich information, providing more and more inputs and context and meaning with each successive cycle.

Examples for the process of building up intelligence can start with basic inputs and the capturing of information and metadata. The processes can constantly build upon and enhance the metadata. Take, for example, an image. The user intends to capture a photo of a whiteboard. A user's location is determined by the system to asses where he or she is, and with, for example, a user's guidance, the system uses this information to infer the user's context, intention, and the scope of an event (into which multiple items may be captured). Some embodiments can asses a user's schedule by examining his or her calendar—even inspecting a user's friend's calendar. Some embodiments can then provide for far more than a simple image: the system knows that the user is at work at his office, in a particular meeting, and intends to capture some notes and diagrams of the whiteboard. Some embodiments capture all this aggregated information—such as a place, context, etc., and can now benefit from this much enhanced perspective to perform subsequent steps in which the captured content and metadata is further analyzed and extracted.

Various embodiments can recognize the content in the image—determine that the content in the image is a capture of a whiteboard image, perform OCR (Optical Character Recognition), and analyze the resultant text and diagrams within the context of the meeting, the semantic topics, and scope of the meeting's subject. The metadata now reflects even more than when the content was initially captured, since further analysis is able to deduce additional information, now that the context and the knowledge domain and intent is understood. According to some embodiments, the enhanced perspective provided is then used to benefit additional data items that are captured subsequently and this can especially be extended to those items captured within the scope of the same event and context. In one example, a business card captured immediately thereafter can benefit from the same hints and context as the whiteboard capture, but still be analyzed with a different aim, understanding that a business card is being captured (and therefore a contact should be generated), rather than notes and diagrams on a whiteboard.

Upon completion of the extraction and analysis workflow steps, the resultant extracted data can be persisted into multiple datastores. In one implementation, extracted data is stored in four separate datastores—and each can be configured with a different purpose. In one embodiment, raw data (such as free text extracted via OCR), categories, metadata, and tags are indexed into a searchable Index (such as Lucene or Solr), allowing for more free-form searching. Captured metadata can also be stored into a document datastore, using, for example, a more constrained schema. In one embodiment, the actual content that is captured, such as an image, video, audio, note, or file, can be stored into a distributed key-value store—intended for the persistence of larger content. In one embodiment, data capture includes extraction of semantic categories, topics, and resources. These semantic items can also be selected by users (e.g., during a capture phase), but in some embodiments, are predicted or recommended as options based on analysis of, for example, user's location and context. The resultant semantic entities and topics can be serialized into RDF and then persisted into a graph datastore, for example, Jena.

According to one embodiment, having multiple datastores to allows a system to synergistically represent a more compelling perspective than any of its constituent parts. In other words, by leveraging disparate datastores, each with a different focus and capability, various embodiments are able to provide a more flexible and effective strategy for both persisting and querying the data that represents a user's ongoing experience.

Some embodiments permit capturing context, events, and entities together with the underlying data, and can also combining data from disparate sources to provide a semantic experience on, for example, a user level. Various embodiments make it easier for a user to capture data/information/media and the corresponding metadata by predicting the context of capture based on location data, and other user data sources such as the user's calendar and history of the user's past behavior.

Various embodiments make it easier users to capture data/information/media and the corresponding metadata by predicting the item/entity of capture based on context, existing semantic data, location data, and other user data sources such as the user's calendar and history of the user's past behavior.

Various embodiments facilitate pooling of multiple sources of information to predict semantic meaning about the user's activities and content being captured. In one example, past history, calendar information, and location information can be used to predict the context of the user's data capture, or predict the entity being captured. Various embodiments facilitate combining GPS lat/long data from devices with information from location databases to create real-time information about the user's environment and context.

Processes and systems described above are merely illustrative embodiments of a method for pooling and sourcing user data. Such illustrative embodiments are not intended to limit the scope of the present invention, as any of numerous other implementations for performing the invention.

Processes and methods associated with various embodiments, acts thereof and various embodiments and variations of these methods and acts, individually or in combination, may be defined by computer-readable signals tangibly embodied on a computer-readable medium, for example, a non-volatile recording medium, an integrated circuit memory element, or a combination thereof. Such signals may define instructions, for example, as part of one or more programs, that, as a result of being executed by a computer, instruct the computer to perform one or more of the methods or acts described herein, and/or various embodiments, variations and combinations thereof. Such instructions may be written in any of a plurality of programming languages, for example, Java, Visual Basic, C, C#, or C++, Fortran, Pascal, Eiffel, Basic, COBOL, etc., or any of a variety of combinations thereof. The computer-readable medium on which such instructions are stored may reside on one or more of the components of a general-purpose computer described above, and may be distributed across one or more of such components.

The computer-readable medium may be transportable such that the instructions stored thereon can be loaded onto any computer system resource to implement the aspects of the present invention discussed herein. In addition, it should be appreciated that the instructions stored on the computer-readable medium, described above, are not limited to instructions embodied as part of an application program running on a host computer. Rather, the instructions may be embodied as any type of computer code (e.g., software or microcode) that can be employed to program a processor to implement the above-discussed aspects of the present invention.

Various embodiments according to the invention may be implemented on one or more computer systems. These computer systems may be, for example, general-purpose computers such as those based on Intel PENTIUM-type processor, Motorola PowerPC, Sun UltraSPARC, Hewlett-Packard PA-RISC processors, or any other type of processor. One or more of any type computer system may be used to partially or fully automate a user information repository according to various embodiments of the invention. Further, the software design system can be located on a single computer or may be distributed among a plurality of computers attached by a communications network.

The computer system can include specially-programmed, special-purpose hardware, for example, an application-specific integrated circuit (ASIC). Aspects of the invention may be implemented in software, hardware or firmware, or any combination thereof. Further, such methods, acts, systems, system elements and components thereof can be implemented as part of the computer system described above or as an independent component.

A computer system may be a general-purpose computer system that is programmable using a high-level computer programming language. Computer system may be also implemented using specially programmed, special purpose hardware. In a computer system there may be a processor that is typically a commercially available processor such as the well-known Pentium class processor available from the Intel Corporation. Many other processors are available. Such a processor usually executes an operating system which may be, for example, the Windows 95, Windows 98, Windows NT, Windows 2000 (Windows ME), Windows XP, or Windows Visa operating systems available from the Microsoft Corporation, MAC OS System X available from Apple Computer, the Solaris Operating System available from Sun Microsystems, or UNIX available from various sources. Many other operating systems may be used.

The processor and operating system together define a computer platform for which application programs in high-level programming languages are written. It should be understood that the invention is not limited to a particular computer system platform, processor, operating system, or network. Also, it should be apparent to those skilled in the art that the present invention is not limited to a specific programming language or computer system. Further, it should be appreciated that other appropriate programming languages and other appropriate computer systems could also be used.

One or more portions of the computer system can be distributed across one or more computer systems coupled to a communications network. These computer systems also may be general-purpose computer systems. For example, various aspects of the invention may be distributed among one or more computer systems configured to provide a service (e.g., servers) to one or more client computers, or to perform an overall task as part of a distributed system. For example, various aspects of the invention may be performed on a client-server system that includes components distributed among one or more server systems that perform various functions according to various embodiments of the invention. These components may be executable, intermediate (e.g., IL) or interpreted (e.g., Java) code which communicate over a communication network (e.g., the Internet) using a communication protocol (e.g., TCP/IP).

It should be appreciated that the invention is not limited to executing on any particular system or group of systems. Also, it should be appreciated that the invention is not limited to any particular distributed architecture, network, or communication protocol.

Various embodiments of the present invention may be programmed using an object-oriented programming language, such as SmallTalk, Java, C++, Ada, or C# (C-Sharp). Other object-oriented programming languages may also be used. Alternatively, functional, scripting, and/or logical programming languages may be used. Various aspects of the invention may be implemented in a non-programmed environment (e.g., documents created in HTML, XML or other format that, when viewed in a window of a browser program, render aspects of a graphical-user interface (GUI) or perform other functions). Various aspects of the invention may be implemented as programmed or non-programmed elements, or any combination thereof.

Further, on each of the one or more systems that include one or more components of system 501, each of the components may reside in one or more locations on the system. For example, different portions of the components of system 501 may reside in different areas of memory (e.g., RAM, ROM, disk, etc.) on the system. Each of such one or more systems may include, among other components, a plurality of known components such as one or more processors, a memory system, a disk storage system, one or more network interfaces, and one or more busses or other internal communication links interconnecting the various components.

System 501 can be implemented on a computer system described below in relation to FIGS. 6 and 7. System 501 is merely an illustrative embodiment of the server-based metadata capture and analysis system. Such an illustrative embodiment is not intended to limit the scope of the invention, as any of numerous other implementations of the server-based metadata capture and analysis system, for example, are possible and are intended to fall within the scope of the invention. For example, information repository functions can be implemented in a collection of systems having a collection component configured to capture user data and identify the source of the captured information. The collection component can be configured to communicate to multiple sources of information both public and private to collect data and further to identify the source of information.

Further, the information repository functions can also be implemented in an analysis system having an analysis component configured to analyze, manipulate, generate additional information, and/or manipulate captured or generated information both during and after any information capture. The analysis component can also be configured to determine semantic meaning from any data and provide data mashups for use by the system. Further, the information repository functions can be implemented in a query system having a query component configured to allow an end user to make queries across single or multiple sources of data directly or through software applications.

According to one embodiment, the query component can also be configured to provide user access to pre-defined queries and/or automatically generated queries from the analysis system, which can be defined, for example, semantically or in other formats. Further, the information repository functions can also be implemented in a grouping system having a grouping component configured to predict virtual groups that allow sharing and association of data items implicitly. In one embodiment, the grouping component can be configured to facilitate the pooling of information from different users, and in particular identify groups when the information is associated with a same and/or similar context or event. In another embodiment, the functions discussed can also be implemented in a discovery component, which can be, for example, configured to analyze, manipulate, generate additional information, discover external information, and/or manipulate captured or generated information both during and after any information capture. The described systems and/or components can be implemented as one or multiple systems.

Various embodiments according to the invention may be implemented on one or more computer systems. These computer systems may be, for example, general-purpose computers such as those based on Intel PENTIUM-type processor, Motorola PowerPC, Sun UltraSPARC, Hewlett-Packard PA-RISC processors, or any other type of processor. It should be appreciated that one or more of any type computer system may be used to partially or fully automate play of the described game according to various embodiments of the invention. Further, the software design system may be located on a single computer or may be distributed among a plurality of computers attached by a communications network.

Figure 6:
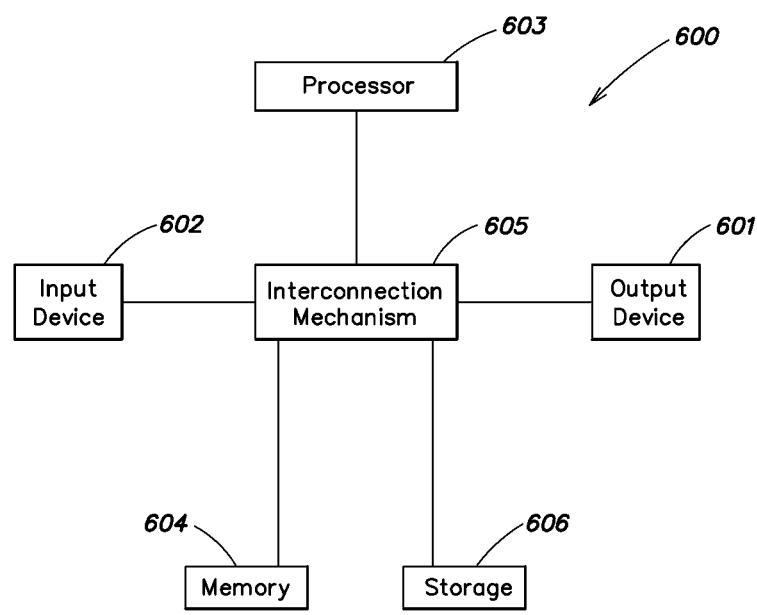
FIG. 6 is a block diagram of an example system architecture on which various aspects of the invention can be practiced.

For example, various aspects of the invention may be implemented as specialized software executing in a general-purpose computer system 600 such as that shown in FIG. 6. The computer system 600 may include a processor 603 connected to one or more memory devices 604, such as a disk drive, memory, or other device for storing data. Memory 604 is typically used for storing programs and data during operation of the computer system 600. Components of computer system 600 may be coupled by an interconnection mechanism 605, which may include one or more busses (e.g., between components that are integrated within a same machine) and/or a network (e.g., between components that reside on separate discrete machines). The interconnection mechanism 605 enables communications (e.g., data, instructions) to be exchanged between system components of system 600. Computer system 600 also includes one or more input devices 602, for example, a keyboard, mouse, trackball, microphone, touch screen, and one or more output devices 601, for example, a printing device, display screen, and/or speaker. In addition, computer system 600 may contain one or more interfaces (not shown) that connect computer system 600 to a communication network (in addition or as an alternative to the interconnection mechanism 605.

Figure 7:
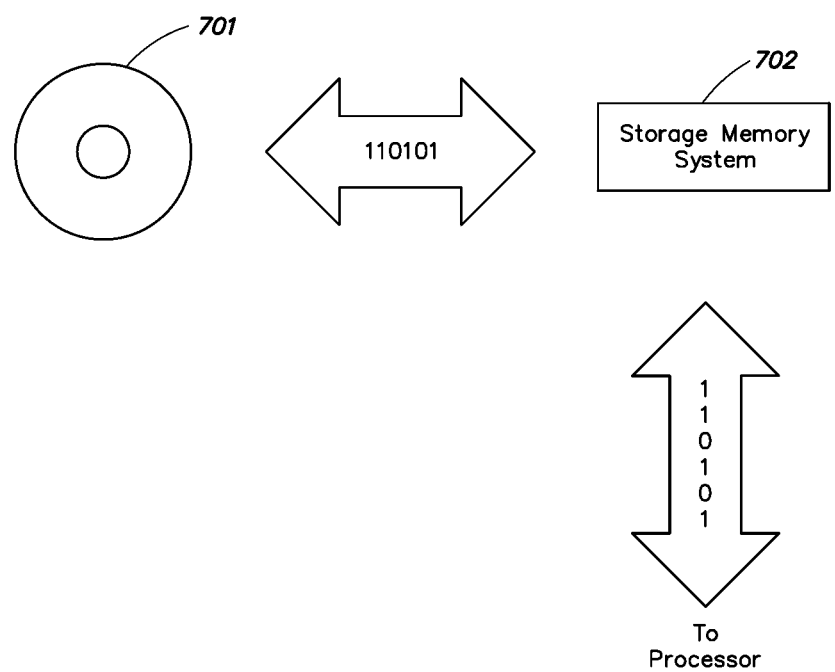
FIG. 7 is a block diagram of an example system architecture on which various aspects of the invention can be practiced.

The storage system 606, shown in greater detail in FIG. 7, typically includes a computer readable and writeable nonvolatile recording medium 701 in which signals are stored that define a program to be executed by the processor or information stored on or in the medium 701 to be processed by the program. The medium may, for example, be a disk or flash memory. Typically, in operation, the processor causes data to be read from the nonvolatile recording medium 701 into another memory 702 that allows for faster access to the information by the processor than does the medium 701. This memory 702 is typically a volatile, random access memory such as a dynamic random access memory (DRAM) or static memory (SRAM). It may be located in storage system 606, as shown, or in memory system 604, not shown. The processor 603 generally manipulates the data within the integrated circuit memory 604, 702 and then copies the data to the medium 701 after processing is completed. A variety of mechanisms are known for managing data movement between the medium 701 and the integrated circuit memory element 604, 702, and the invention is not limited thereto. The invention is not limited to a particular memory system 604 or storage system 606.

The computer system may include specially-programmed, special-purpose hardware, for example, an application-specific integrated circuit (ASIC). Aspects of the invention may be implemented in software, hardware or firmware, or any combination thereof. Further, such methods, acts, systems, system elements and components thereof may be implemented as part of the computer system described above or as an independent component.

Although computer system 600 is shown by way of example as one type of computer system upon which various aspects of the invention may be practiced, it should be appreciated that aspects of the invention are not limited to being implemented on the computer system as shown in FIG. 6. Various aspects of the invention may be practiced on one or more computers having a different architecture or components that that shown in FIG. 6.

Computer system 600 may be a general-purpose computer system that is programmable using a high-level computer programming language. Computer system 600 may be also implemented using specially programmed, special purpose hardware. In computer system 600, processor 603 is typically a commercially available processor such as the well-known Pentium class processor available from the Intel Corporation. Many other processors are available. Such a processor usually executes an operating system which may be, for example, the Windows 95, Windows 98, Windows NT, Windows 2000 (Windows ME), Windows XP, or Windows Visa operating systems available from the Microsoft Corporation, MAC OS System X available from Apple Computer, the Solaris Operating System available from Sun Microsystems, or UNIX available from various sources. Many other operating systems may be used.

The processor and operating system together define a computer platform for which application programs in high-level programming languages are written. It should be understood that the invention is not limited to a particular computer system platform, processor, operating system, or network. Also, it should be apparent to those skilled in the art that the present invention is not limited to a specific programming language or computer system. Further, it should be appreciated that other appropriate programming languages and other appropriate computer systems could also be used.

One or more portions of the computer system may be distributed across one or more computer systems (not shown) coupled to a communications network. These computer systems also may be general-purpose computer systems. For example, various aspects of the invention, may be distributed among one or more computer systems configured to provide a service (e.g., servers) to one or more client computers, or to perform an overall task as part of a distributed system. For example, various aspects of the invention may be performed on a client-server system that includes components distributed among one or more server systems that perform various functions according to various embodiments of the invention. These components may be executable, intermediate (e.g., IL) or interpreted (e.g., Java) code which communicate over a communication network (e.g., the Internet) using a communication protocol (e.g., TCP/IP).

Additional Use Case Examples

FIG. 11A illustrates an example user interface 1100 according to one embodiment. Shown in interface 1100 is an example message 1102 configured to provide a user with a "smart alarm" automatically configured for the user based on analysis of the information associated with the user (including, for example, information discovered on the user) in the information repository.

Automatic configuration can include, for example, determination of a departure time, and configuration of an alarm to notify the user of an automatically determined period of time—that is "predicted" departure time, determined from the user's information (e.g., prior departures, prior meetings, travel mode, user's behavior, etc.)

FIGS. 11A-D illustrate multiple user interfaces providing a platform for a user to interact with a plurality of related operations executed on a system for facilitating metadata capture and analysis, which can be configured to process any one or combination of a user's data, the user's metadata, and recursive metadata associated with either, which in some examples, can be collected over time, and/or discovered by data capture processes discussed above.

FIG. 11B, illustrates an example user interface 1110 displayed to a user on a user device, which can include a smart phone 1112 or other mobile computing device according to one embodiment. In one embodiment, the "smart alarm" shown in user interface 1112 is configured to automatically set a reminder/alarm for a determined amount of time before the user's first appointment. In one example, the user interface is configured to display the alarm, wherein the determined amount of time is calculated based on analysis of information associated with the user, information associated with the user's appointment, and any additional information associated/discovered with either. In one embodiment, the calculation is based on information on the time of the user's first scheduled calendar appointment, and can include, for example, the location of the first scheduled calendar appointment, and the amount of time the user typically needs in between waking up and his first appointment, which can be based on data gathered (and subsequent analysis and machine-learning) about the user's historic alarm-setting patterns relative to calendar appointments.

The determination of the smart alarm characteristics can be presented in user interface 1110. For example, the smart alarm can be presenting a countdown format at 1114, with a visual indication at 1115 regarding mode of travel used for calculating departure time. Shown at 1115 is the user's mode of travel, which can be determined by automatic processing of a system for facilitating metadata capture and analysis. In some embodiments, more than one mode of travel can be displayed at 1115, and the user interface can be configured to permit selection of a secondary mode of travel. Selection of the secondary mode can include re-calculation of the countdown timer 1114 and re-determination of the displays shown in FIGS. 11B-D.

User interface 1110 can be configured to alert the user at any given time of the day about when the user needs to, for example, leave his current location and get to the next location for a next scheduled appointment. According to one embodiment, the time of day can be automatically determined given the user's preferred means of transportation (or other transportation options, for example, based on the user current location, proximity to public transportation, and/or user behavior in the present location stored as semantic information). Based on the user's current location, which can be determined, for example, using a smart phone's GPS capabilities, the system automatically calculates the recommended departure time to reach the location of the next scheduled appointment.

In some examples, user location and/or next event location can be entered directly into the user's calendar or associated with a contact whose name is included in the calendar entry. The system can be configured to discover such associated information based on semantic analysis, including analysis of a user's information, a user's metadata, and/or discovered information on any of the preceding.

In one embodiment, the recommended departure time can be based on determinations of current traffic, weather, and other conditions which are sourced from the external information sources in real-time (including, for example, the Internet). In some embodiments, the interface can be configured to default to the transportation choice that is historically the preference of the user (based on captured metadata), the interface also allows the user to select other transportation options and associated recommended departure times (e.g., at 1115). The system can be configured to enable easy access to a map of the current location and destination, including any directions between the two points, based on the information available, including a mode of travel, for example.

Figures 11C, 11D:
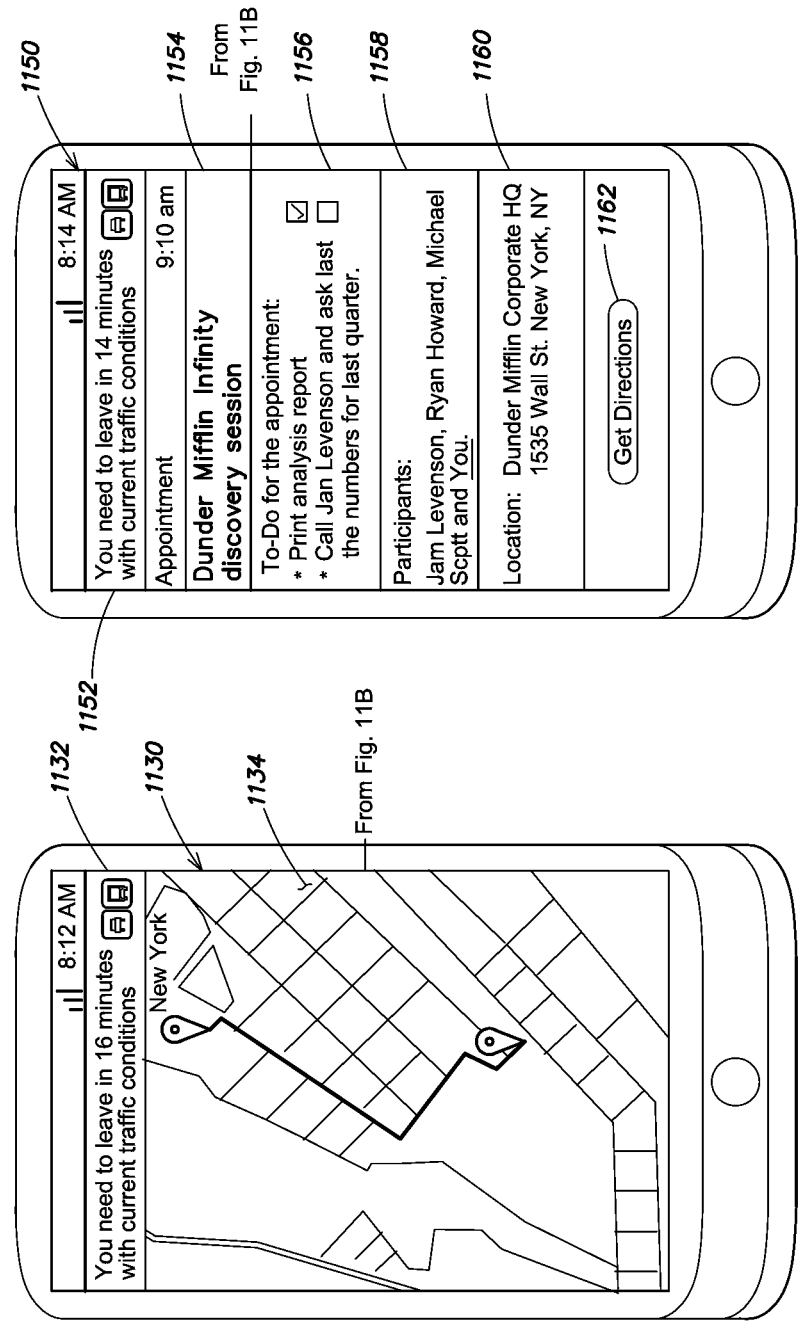

Shown in FIG. 11C is an example user interface 1130 according to one embodiment. Interface 1130 can be associated with an information display in another user interface. For example, interface 1130 can be linked to a mode of travel shown in interface 1110, providing a display of directions determined from a mode of travel displayed in another interface. Interface 1130 can include any information on a smart alarm or smart depart time. At 1132, for example, is a display of a smart depart time, providing access to a smart departure timer in a count-down format. At 1134, shown is a map for directed between a current location determined by the system and a next destination, which can be determined by the system. As discussed above, display 1134 can be associated with other information displayed in other user interfaces. For example, selection of a secondary mode of travel in interface 1110 can result in the system re-generating displayed direction based on the new mode of travel. Instead of driving directions shown at 1134, walking directions to the nearest public transportation can be displayed with respective public transportation destination locations proximate to the user's next meeting.

In some embodiments, a "smart depart" application can be configured to reference an "appointment prep" application. In one embodiment, the appointment prep processes executed by the system are configured to analyze metadata associated with a user's personal information to determined and illustrate to the user additional information about a scheduled appointment including, identification of the participants, information on the participants, location of the appointment, and information on the location. The appointment prep processes are also configured to deliver information on what the user needs to do or have in order to prepare for the appointment.

Shown in FIG. 11D is an example user interface 1150 according to one embodiment. According to some embodiments, user interface 1150 maintains a display of a smart depart time at 1152. User interface 1150 can also be configured to display information on specific requirements of the user's activities. For example, at 1154 detailed information on a next appointment can be shown. Interface 1150 can also display status information for any requirement for a particular meeting. In one example, at 1156 check boxes are displayed to reflect a state of an activity required for a user event. The user interface can be configured to accept user input in a touch screen, and responsive to the input change the state of the required activity. A check in a checkbox can indicate that the required activity has been completed. An empty checkbox can displays an incomplete status.

The user may interact with other user events in a detail display. For example, interface 1150 can also display other information associated with the event (e.g., participants for the event at 1158, location 1160, and a selectable display to generate directions to the event at 1162). The other user events displays can be responsive to selection. In one embodiment, the system can be configured to display any required activity for each event upon a first selection, and hide the required activity detail upon another selection. An event detail screen can be displayed for any user event including for example, the events display in FIG. 11B, at 1116-1122.

FIGS. 12A-D illustrate additional user interfaces configured to display information generated by a plurality of operations executed on a system for facilitating metadata capture and analysis.

In some embodiments, the operations are configured to be executed by applications on the system that analyze a user's data, the user's metadata, and recursive metadata collected over time. For example, a "smart reminder" application can be configured to detect that a user has appointments on his calendar that require additional preparation steps (e.g., in this case, dinner at a restaurant and plans to see a movie). The application can be configured to determine the need for additional steps by analyzing the semantic entities underlying the calendar entries (e.g., a movie title can be used to identify the semantic entity associated with the movie, or the word 'dinner' can be used by the system to interrogate semantic entities that provide 'dinner,' deliver food, or provide a la carte dining experiences). In some embodiments, the system is configured to determine that the current scheduled event are associated to other semantic entities and provide recommendations on the associated semantic entities. Recommendation can be modified and/or selected based on current contextual information and/or information associated with the current event.

In one embodiment, the application is configured to display a reminder alert to the user that the user has upcoming events that need action. In one embodiment, user interface 1200 can provide a display for recommendations and any associated actions. For example, user interface 1200 can include displays for "make reservation and get tickets" at 1202. Selection of 1202 in the user interface can be configured to transition the system to user interface 1220, FIG. 12B. The user can be guided to various user interfaces to take, for example, automatically identified actions at 1222 and 1224. In some embodiments, the automatically identified action can be delivered with options that are tailored to the user based on, for example, the user's data, behavioral history, metadata, and/or recursively generated metadata.

Shown FIG. 12C is an example user interface 1230 according to one embodiment. At 1222, the user is prompted to purchase movie tickets for a movie that was input into his calendar. In one embodiment selection of 1222 can be configured to transition the system to user interface 1230. In one example, the system can determine the movie title from automated analysis of the user's information. From the movie title the system can generate movie ticket purchase suggestions, including for example, suggestions with movie theater options that are: (i) close to the user's current location; (ii) among the user's historical preferred movie theaters; (iii) close to a projected user location (where the projected location can also be determined from semantic information analyzed by the system) at 1232-1234. Shown in FIG. 12D is an example user interface 1240 according to one embodiment. At 1224, FIG. 12B, the user is prompted to make restaurant reservations. In one embodiment, responsive to selection of 1224 the system can be configured to transition to user interface 1240. Interface 1240 can be configured to display recommended restaurants at 1242-1244 that are: (i) close to the user's current location; (ii) relevant based on the user's historic choices of restaurant, cuisine preferences, and rating information available from the Internet; (iii) close to a projected user location etc. The system can also determine times for a reservation that is convenient to the user based on the user's calendar and location. At 1246 the user can be prompted to make the reservation at the determined time or enter new other criteria for a reservation. If any other criteria is entered, the system can stored any new information for subsequent analysis of user context and preference.

FIGS. 13A-H illustrate additional user interfaces configured to display information generated by a plurality of operations executed on a system for facilitating metadata capture and analysis according to one embodiment.

In some embodiments, the operations are configured to be executed by applications on the system that analyze a user's data, the user's metadata, and recursive metadata collected over time. For example, a "hot case" application can be configured to analyze the user's data and metadata to identify materials, documents, actions, and/or information that the user needs to (i) review and prepare for an upcoming appointment, and/or (ii) bring to that appointment. The application can be configured when executed by the system to identify any actions or materials in the user's various connected data repositories. In one embodiment, the application can be configured to assemble any actions or materials into a series of screens easily reviewed by the user.

FIG. 13A illustrates an example user interface 1300 according to one embodiment. Shown at 1302 is a reminder message include a recommendation to leave the user's current location to arrive on time for a subsequent event. Interface 1300 displays a departure time, but can also be configured to request that the user to review the event at 1302.

FIG. 13B illustrates an example user interface 1310 according to one embodiment. Shown at 1312 is another reminder to leave the user's current location to arrive on time for a subsequent event. For example, the system can determine that train delays require the user to leave at a specific time. Shown at 1312 is a departure time recommendation that accounts for the identified issue.

The system can be configured to transition to interface 1310 in response to a user request to review an event, e.g., at 1302. FIG. 13B illustrates an example user interface 1310 according to one embodiment. Interface 1310 is configured to display information about the event (including, for example, smart depart information at 1312, event participants 1314, event location 1316, associated information for the preceding, and the ability to see directions 1318).

The displayed information can include notifications that that the user's "hotcase" for the event is ready, e.g., at 1320. The hotcase notification can be a notification delivered to a user providing an indication that system analysis on the user's, event's, and association's data has been completed generating actions or requirements for an event that should be reviewed and/or completed by the user. In one embodiment, in response to selecting 1320, or other displayed event, the system transitions to a user interface configured to display a summary of the hotcase contents, for example, as illustrated in FIG. 13C. In one embodiment, user interface 1330 illustrates an example hotcase summary which can include documents and research 1332 related to the meeting and its subject, photos and videos 1334 related to the meeting and its subject, and background information about the other attendees 1336. In some embodiments, additional information can be identified and defined by the system based on semantic links to any of the documents and research related to the meeting and its subject, photos and videos related to the meeting and its subject, and background information about the other attendees. In one embodiment, selection of any of 1332-1336 is configured to cause the system to execute a transition to another user interface to display additional information on the selected item.

In one example, the application is configured to identify documents and research items by processing the information about the event, and determining matches with items and patterns in the user's repository of data and metadata. For example, a meeting calendar entry for a user can contain a descriptive subject as well as a list of attendees (e.g., coworkers invited to the meeting). In one such setting, the application can be configured to perform semantic-enabled search on the user's repositories (including the collection of the user's data, metadata, recursively-created and indexed metadata, and extracted semantic entities). The semantic-enabled search can return any documents related to the subject. In addition, the semantic-enabled search operations can be configured to identify documents (such as photos, audio recordings, videos, and notes) that were created when this same or a similar set of attendees were assembled to discuss the same subject, or even a different subject. The identification of documents and/or documents created under similar circumstances can be used to defined semantic associations between the documents, the attendees, and/or the context in which the documents were created. For example, such semantic associations can be generated as discussed above.

Shown in FIG. 13D is an example user interface 1340 according to one embodiment. Interface 1340 can be configured to display a list of documents and research items at 1342-1348 that have been identified by the system for inclusion in a user's hotcase. The list of documents and research items can include, for example, research materials identified from internet executed queries related to the subject of the meeting; other queries can be automatically generated and executed by the system based on information and/or notes from previous meetings about the same subject.

Shown in FIG. 13E is an example user interface 1350 according to one embodiment. Interface 1350 can be configured to display a list of photos and videos organized as elements of a user's hotcase. The list of photos and videos displayed can include items related to the subject or the user event or items captured in previous meetings with the same attendees.

Shown in FIG. 13F is an example user interface 1360 according to one embodiment. Interface 1360 can be configured to display a list of those people attending an upcoming meeting 1362-1364. Interface 1360 can be configured to be responsive to selection of items within the displayed list. For example, if the user clicks on an attendee's name, the system can be configured to execute a transition to a summary page with information about the attendee, e.g., user interface 1370, FIG. 13G. Shown in FIG. 13G is an example user interface according to one embodiment. Interface 1370 can be configured to include biographical information, public and social networking profiles and information, as well as (not shown) information about historical interactions between the user and the attendee (e.g., at 1372-1378. Interface 1370 can be configured to be responsive to selection of items within the displayed list. For example, if the user clicks on a category of information about the attendee, the system can be configured to execute a transition to information available about the selected category. For example, selection of biographical information in interface 1370 can trigger a transition to biographical information shown in FIG. 13H. FIG. 13H shown an example user interface 1380 according to one embodiment.

FIGS. 14A-E illustrate examples of user interfaces configured to display information generated by a plurality of operations executed on a system for facilitating metadata capture and analysis according to one embodiment. In some embodiments, the operations are configured to be executed by applications on the system that analyze a user's data, the user's metadata, and recursive metadata collected over time. For example, a "smart task capture" application when executed on the system is configured to detect relevant information, semantic entities, and metadata, for example, in notes that the user is taking at any given moment through a variety of digital media (text, audio, or video). The application can be configured to assist the user in creating tasks for completion in the future.

Figures 14A, 14B:
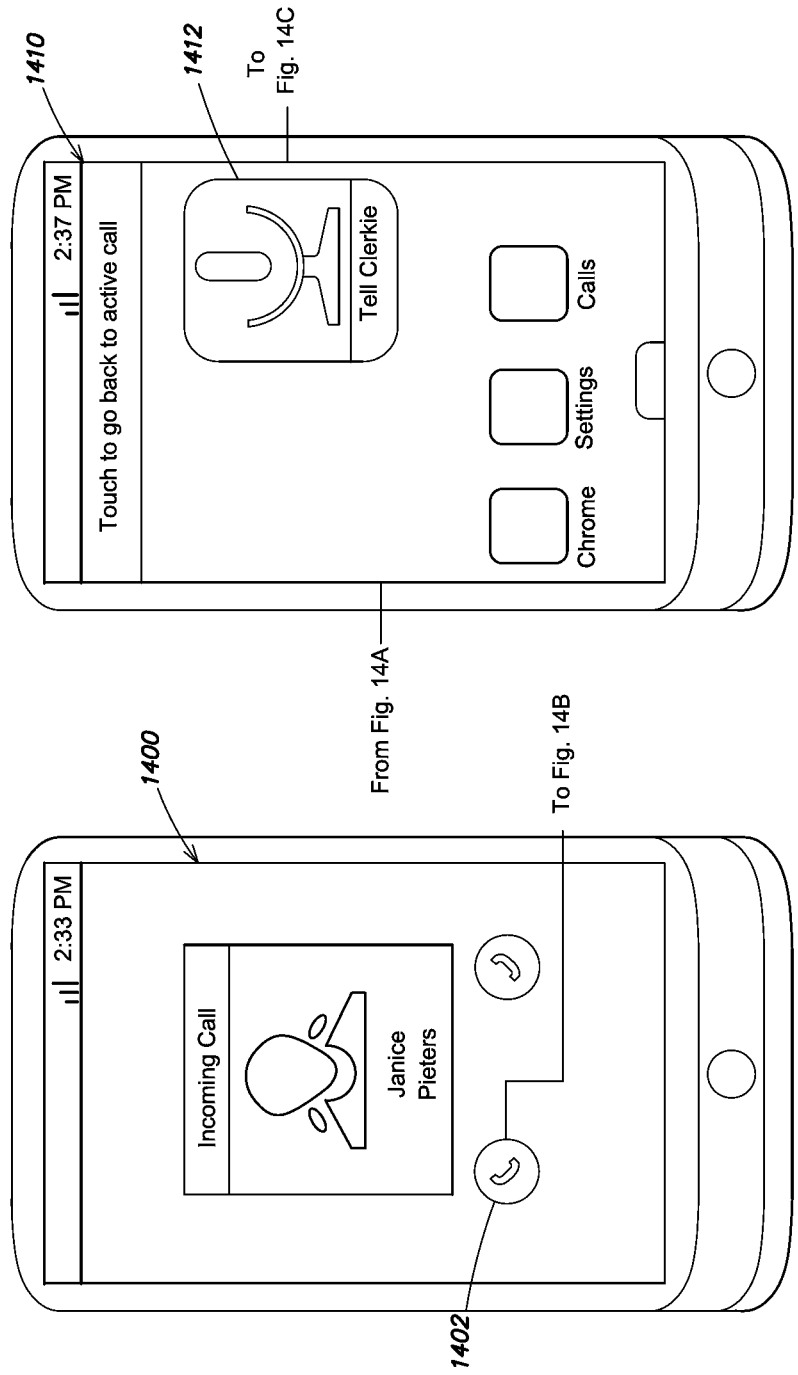
FIGS. 14A-E illustrate examples of user interfaces, according to one embodiment of the present invention.
Figure 14D:
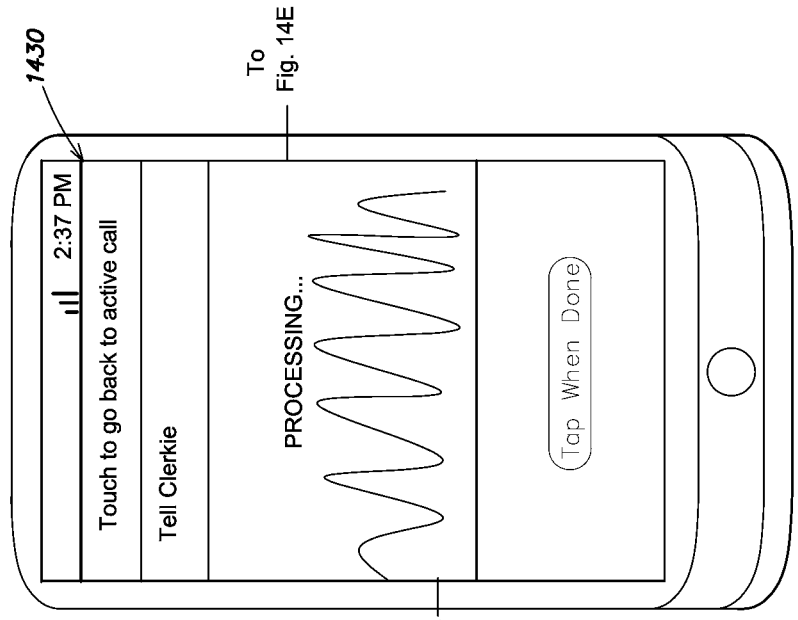
Figure 14C:
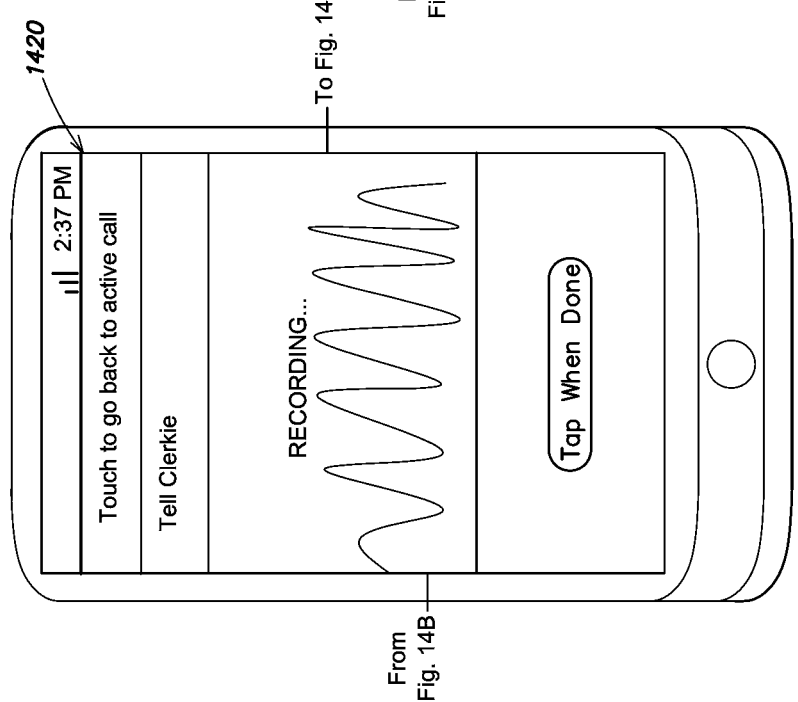
Figure 14E:
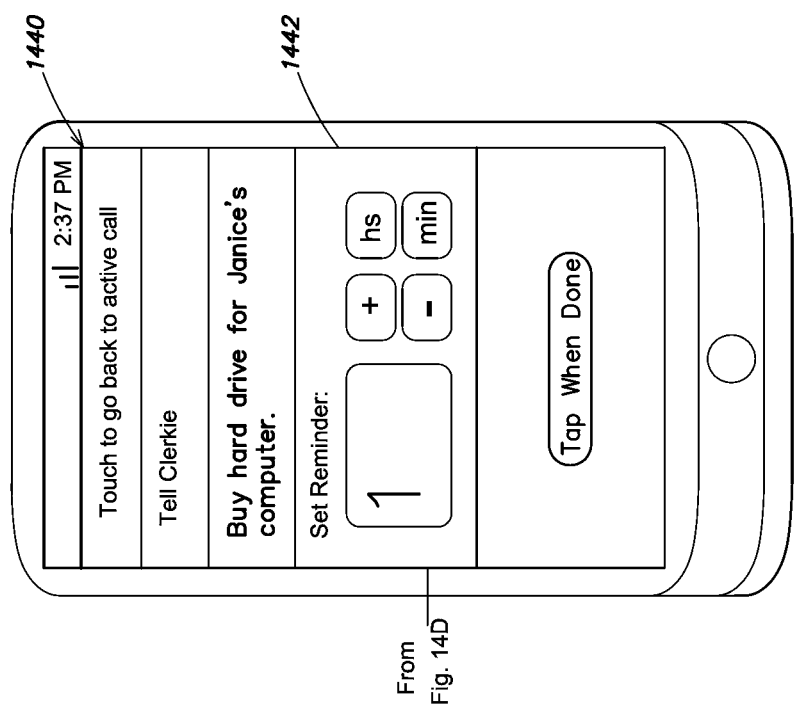

For example, illustrated in FIG. 14A-E, is an example scenario and user interfaces displayed by the system responsive to the user's needs identified during the call. Shown in interface 1400, the user receives a phone call from his wife who tells him he needs to buy a hard drive for her computer. During the call, the user puts his wife on hold and triggers the system to transition to another user interface by selecting 1402. The system displays a smart task capture screen, shown for example, in FIG. 14B 1410. The user interface is configure to allow the user to record a message via selection of 1412. In some embodiments, selection of 1412 is configured to transition the system to user interface 1420, FIG. 14C. Interface 1420 can be configured to display a recording capture event. In this scenario the user records a reminder note to himself that he needs to buy a hard drive for his wife's computer. The application when executed by the system is configured to process the audio recording, e.g., as shown in FIG. 14D at 1430. The processed information can be displayed to the user at 1440, FIG. 14E. The processed information can be displayed with a suggestion to create a task for the user with an option to set a reminder time at 1442.

Figures 15C, 15D:
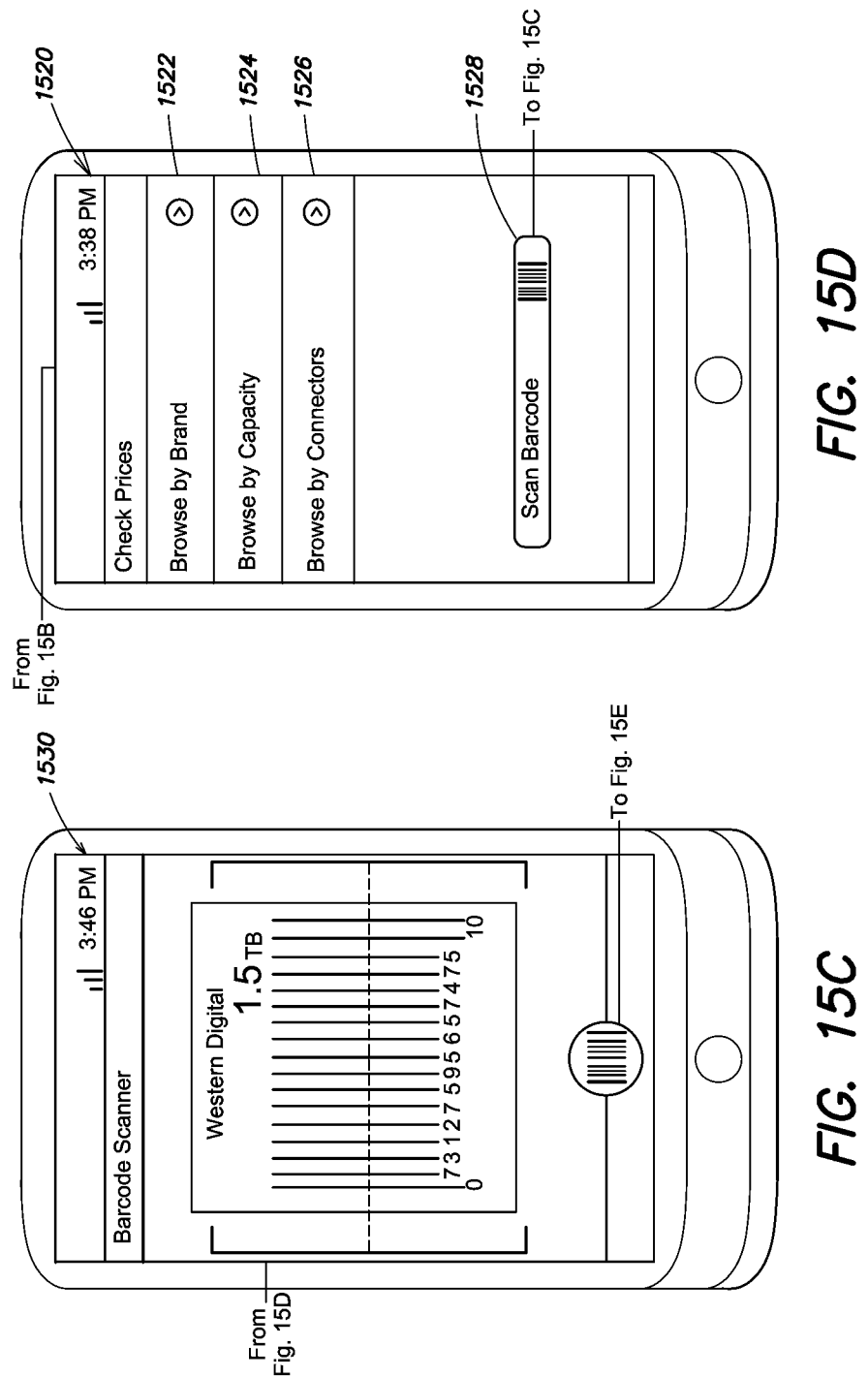

FIGS. 15A-F illustrate examples of user interfaces configured to display information generated by a plurality of operations executed on a system for facilitating metadata capture and analysis according to one embodiment. In some embodiments, the operations are configured to be executed by applications on the system that analyze a user's data, the user's metadata, and recursive metadata collected over time, and can also process publically-available information. For example, a "smart task" generated as discussed above triggers the system to display a reminder to the user in user interface 1500 at 1502, FIG. 15A. FIG. 15A illustrates an example user interface 1500 according to one embodiment.

Selection of 1504 in user interface 1500 is configured to transition the user to a series of user interfaces configured to assist the user in completing the defined task. Shown in 1500, the user receives a reminder from the application about making the computer hard drive purchase as a result of the "smart task" that was captured previously. The user is prompted to go to the task completion screen, and in response to selection of 1504 the user is presented with interface 1510, FIG. 15B by the system. The application can be configured to suggest a plurality of action steps based on semantic information associated with the user. For example, the system can be configured to generate recommendations at 1512-1514 based on the user's location, the user's history and any additional semantic information about the task. In one embodiment, the system can be configured to (i) look for stores nearby based on the action items determined (e.g., purchase hard drive); (ii) check prices online for the item that needs to be purchased; (iii) look for stores nearby a projected location based on, for example, the completion time identified by the user.

If the user opts to check prices at 1514, the user can browse items in user interface 1520 by brand 1522 or by relevant attributes, for example, capacity 1524 or connectors 1526. The user can also be given the option to scan a barcode of an item at 1528, for example, if the user is in a store. If the user scans an item's barcode, including for example, by taking a picture of it, the system can be configured to transition to another user interface for displaying information associated with the scanned bar-code. Shown, for example, in FIG. 15D is user interface 1530 for displaying a scanned bar code. Once the system processes the scanned bar-code, the user can be given a list of stores and corresponding prices for the corresponding item, shown for example, in user interface 1540 at 1542-1549, FIG. 15E.

If the user makes the purchase at the store, the user can scan and/or capture the receipts of the purchase, for example, as shown in FIG. 15F in user interface 1550. The application can be configured to process the receipt, as well as the bar code of the item. The information associated with the purchase, purchase item, and other purchases items, can be processed and added to the user's datastore. The captured information can also be augmented with additional metadata regarding the purchase prior to adding the purchase event to the user's datastore, according to some embodiments.

In some other embodiments, an application executing on the system can be configured to alert the user when the user is in proximity to a physical store that sells an item on a purchase list. In this example, if the user walks by an electronics retailer, the system can be configured to automatically generate and communicate an alert notifying the user that one even on the user's task-list includes buying a hard drive and that there is a store in the user's proximity that sells hard drives. In some conventional situations a user sets reminders for a certain time, and then forgets about the reminder or ignores the reminder, for example, as a result of receiving the reminder at a time and/or place in which they cannot complete the task the reminder was set for. According to some embodiments, the system is configured to deliver the reminders when the context allows for completion of the task.

Figures 16C, 16D:
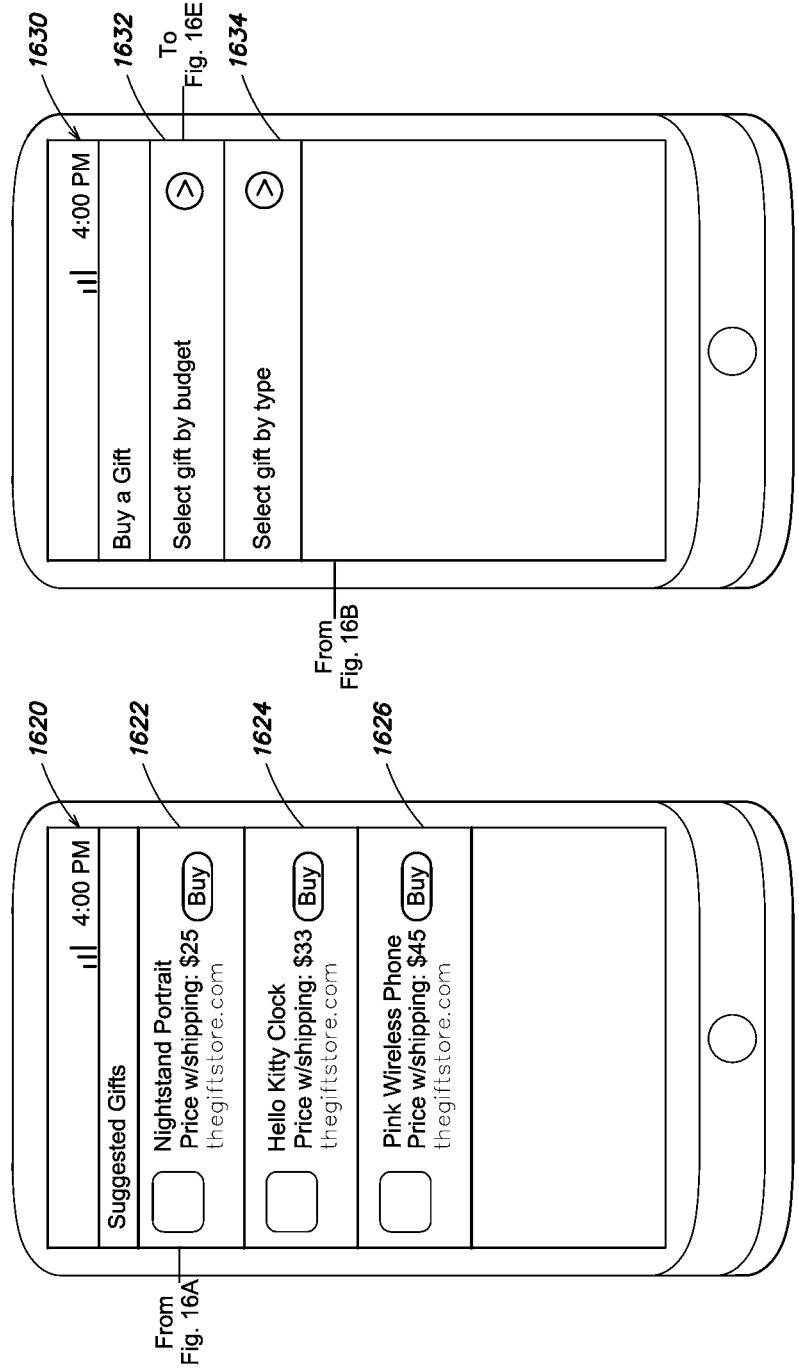
Figure 16E:
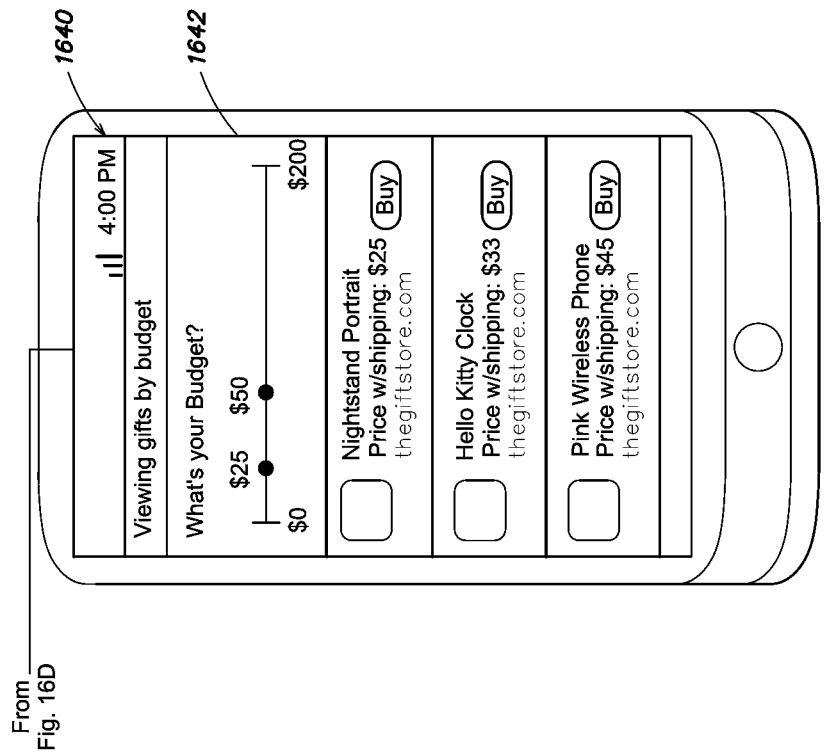

FIGS. 16A-E illustrate examples of user interfaces configured to display information generated by a plurality of operations executed on a system for facilitating metadata capture and analysis according to one embodiment. In some embodiments, the operations are configured to be executed by applications on the system that analyze a user's data, the user's metadata, and recursive metadata collected over time, and can also process publically-available information. For example, a "smart reminder" is communicated by the system notify the user of an upcoming event that requires an action(s), for example, the birthday of a relative. Shown in FIG. 16A is an example user interface 1600 according to one embodiment. Interface 1600 can be configured to display a selectable list of possible tasks to complete associated with this upcoming event at 1602, including for example, suggestions for gifts at 1604. The user can dismiss the display by selecting 1606, which results in the notification being displayed again at a later time.

The system can be configured to respond to selections made in user interface 1600. For example, if the user selects the option to review gift suggestions 1604, the user can be taken to the user interface screen illustrated in FIG. 16C, where the interface is configured to display suggestions based on information contained in the user's datastore about, for example, the recipient. Information about the recipient can include information on gender, age, location, as well as any historical preference information previously captured. The suggestions can be displayed at 1622-1626, which give the user the option to click to purchase the gifts from various online destinations.

In another example, if from the initial screen 1600 the user instead selects the option to review the list of tasks 1602, the user can be displayed user interface 1610, FIG. 16B by the system. According to one embodiment, the user has the option to buy a gift 1612, send an email to the birthday celebrant 1614, or call the birthday celebrant 1614—with the displayed options generated automatically for the user and presented to the user as a selectable display available through the click of a button.

As discussed, the system can be responsive to selection of 1612-1616, for example, if the user selects the option to buy a gift 1612, the user is presented with a new user interface 1630, FIG. 16D, where in addition to the suggested gifts shown in FIG. 16C, at 1620, the user is presented with the option to select a gift by budget 1632, by type 1634, by category, or other options. If the users opts to select gift by budget at 1632, the user can be taken to the screen illustrated in user interface 1640, FIG. 16E. The user can identify a target budget at 1642, and the system can execute a recommendation application configured to deliver recommended gifts based on the recipient's budget combined with the information contained in his datastore about the recipient—gender, age, location, as well as any historical preference information previously captured and/or information on the user making the purchase. The suggestions shown in the interfaces can be configured to be responsive to selection by the user, enabling the user to purchase the gifts from various online destinations.

Figures 17A, 17B:
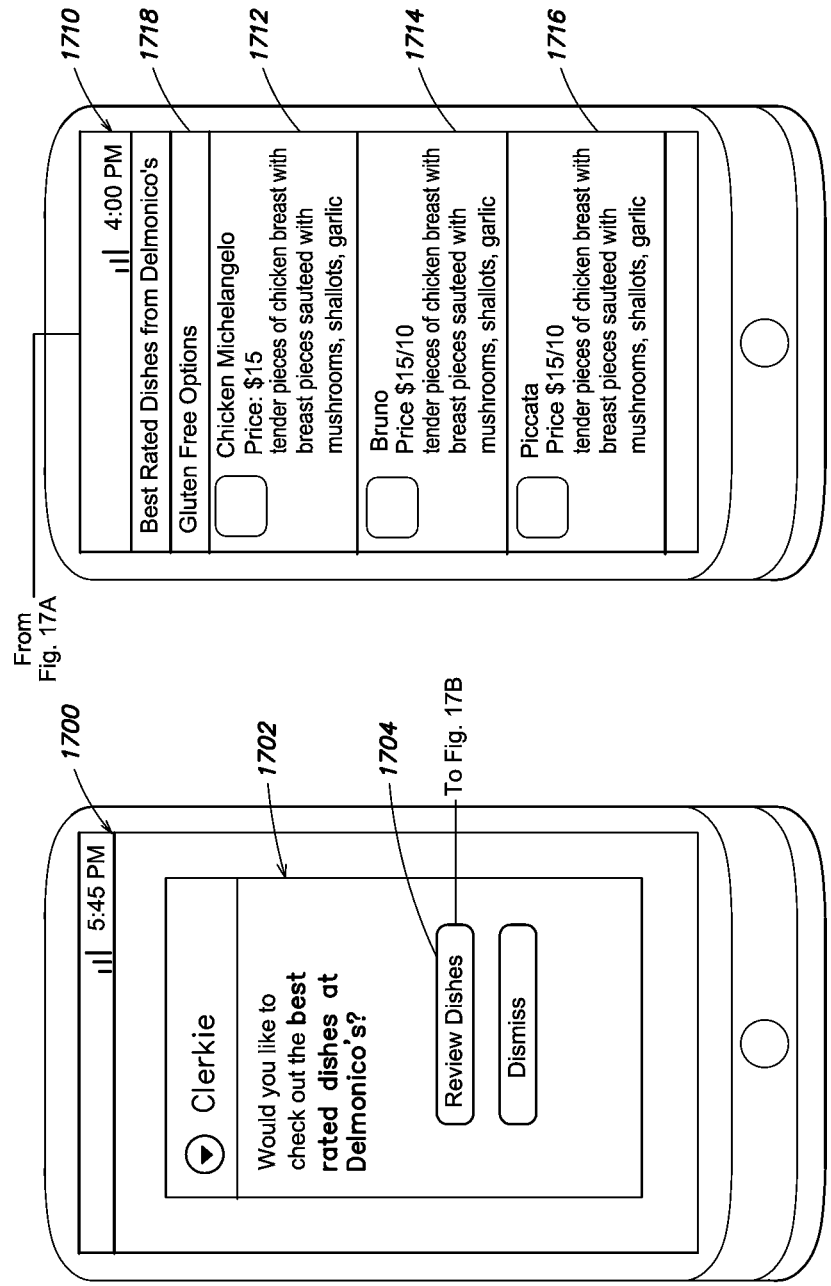
FIGS. 17A-B illustrate examples of user interfaces, according to one embodiment of the present invention.

FIGS. 17A-B illustrate examples of user interfaces configured to display information generated by a plurality of operations executed on a system for facilitating metadata capture and analysis according to one embodiment. In some embodiments, the operations are configured to be executed by applications on the system that analyze a user's data, the user's metadata, and recursive metadata collected over time, and can also process publically-available information. For example, a "smart suggestion" can be communicated by the system notify the user of system generated recommendations that are based on the user's current context. Shown in FIG. 17A is an example user interface 1700 according to one embodiment. Interface 1700 can be configured to display a notification request to the user at 1702.

In some embodiments, smart suggestions can be generated by the system, based on the user's historical data and preferences as well as existing information about upcoming events. Further application and/or application components executing on the system can make useful and informed recommendations for the user in the context of those events. In FIG. 17A, the user interface is configured to prompt the user to review a list of highly-rated dishes at the restaurant that the user is going to, at 1702. An application executing on the system can be configured to generates this alert and associated information based on a user's calendar entry, containing the name of the restaurant, and the word 'dinner' as well as through recognizing the semantic entity of a 'restaurant' in response to a query on any of the forgoing. If the user selects on the option to review dishes 1704, the user can be taken to the screen illustrated in user interface 1710 FIG. 17B. Interface 1710 can include a selectable display of a list of dishes at the restaurant that are highly rated 1712-1716. The displayed list can also be sorted by the user's individual preferences—in this case, gluten-free displayed at 1718.

FIGS. 18A-G illustrate examples of user interfaces configured to display information generated by a plurality of operations executed on a system for facilitating metadata capture and analysis according to one embodiment. In some embodiments, the operations are configured to be executed by applications on the system that analyze a user's data, the user's metadata, and recursive metadata collected over time, and can also process publically-available information. For example, an application executed by the system can combine the smart task capture discussed above with operations configured to separate out tasks to be performed automatically by machines from those tasks that could be better-performed by humans, and anonymizing the user's information for delivery to human operators who can perform certain specific tasks for the system without revealing the user's identity.

FIGS. 18A-G illustrate two processing paths and the user interfaces that can be displayed to a user during processing. One process path can include operations for human intervention/interpretation and the other can be processed automatically by the system.

Figure 18D:
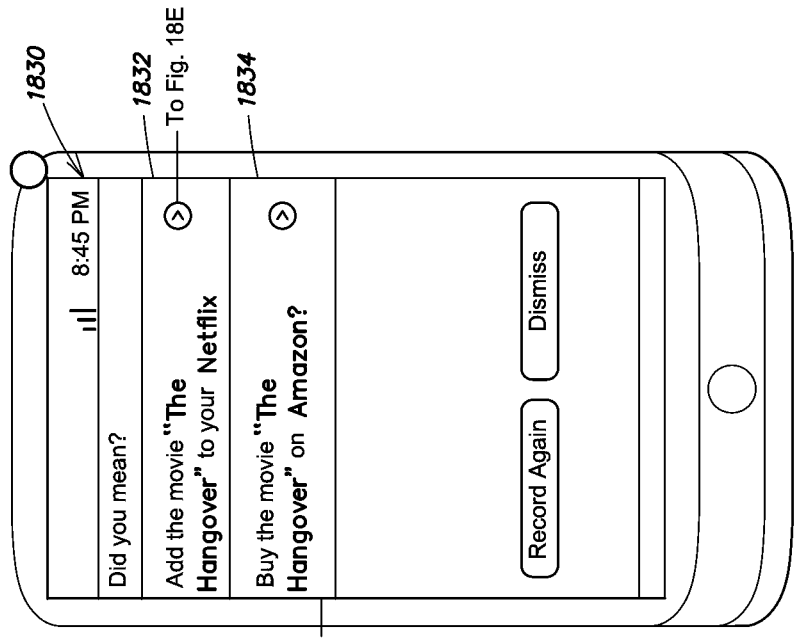
Figure 18C:
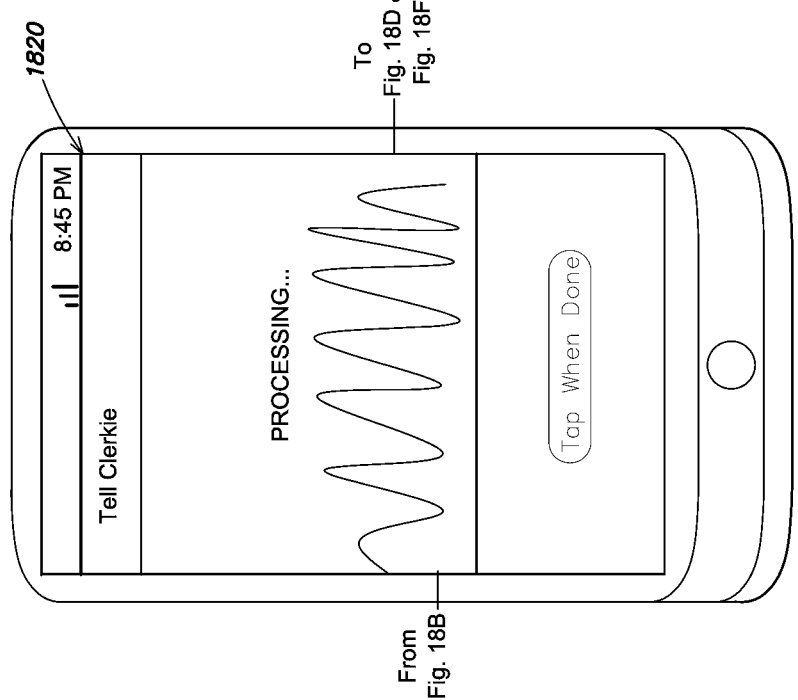

In the scenario illustrated in FIGS. 18A-G, the user is at a restaurant at dinner with friends, and during the conversation he learns of two tasks that he wishes to complete later: watching a particular film via the Netflix service of which he is a subscriber, and sending an email introduction between two of his contacts. FIGS. 18A-C depict, respectively, user interfaces 1800, 1810, and 1820 in which the user is able to select a smart task capture feature at 1802, view a user interface for capturing audio at 1810, for example, recording an audio clip (a), the user recording an audio description of the tasks (b), and the application processing this information at 1820.

Figures 18E, 18F:
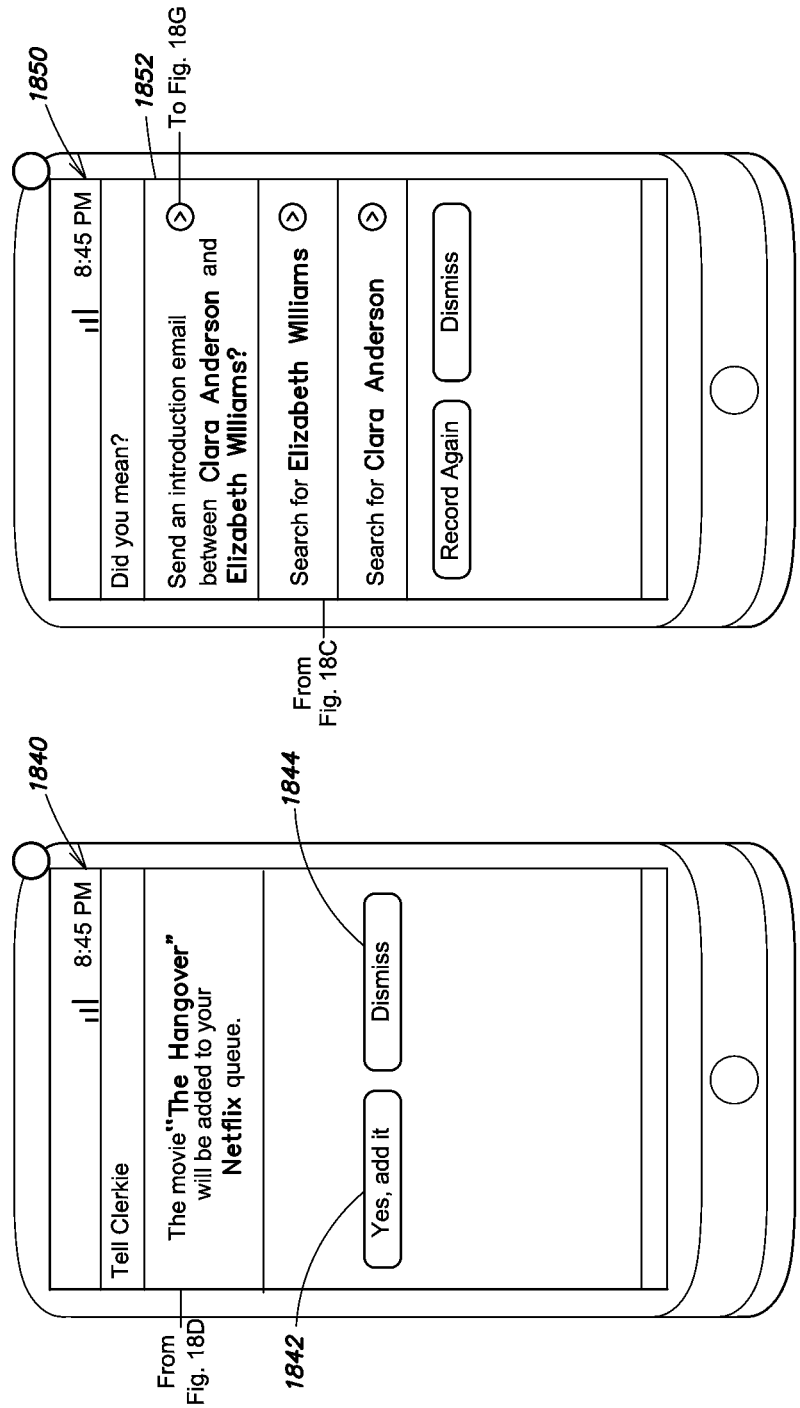

After the information is processed, the application can be configured to display task completion screens to the user for each identified task. For example, shown in FIG. 18F is an example user interface 1850 configured to generated e-mail communication for the user based on processed information. In one example, the user can be prompted to send an introduction between the two contacts whose names the application has recognized from processed information (e.g., at 1852). If the user selects this option 1852, the system is configured to transition the user to a draft introduction email. In one embodiment, FIG. 18G illustrates an example user interface 1860 for reviewing the auto-generated e-mail pre-addressed to the two identified contacts. The user can edit and/or send by choosing the "send it" option at 1862 or dismiss the auto-generated e-mail by selecting 1864.

FIG. 18D illustrates an example user interface 1830, for displaying a processing result. Interface 1830 can be configured to display the task completion screen resulting from the identification of a movie request. The application can be configured to recognize the movie request as a task of adding the movie to a user request queue. The application can be configured to give the user the option to either add it to his Netflix account queue 1832, or in another example to buy the movie at 1834. If the user selects add to Netflix queue 1832, the system can be configured to transition the display to another user interface. For example, the user can be shown a confirmation screen. FIG. 18E illustrates an example user interface 1840 configure to display a confirmation screen to a user. Interface can be configured to enable the user to confirm the information 1842 or dismiss the action, 1844.

Once a user confirms at 1842, then the task or portion of the tasks identified, which may involve human actions to complete, can be analyzed to determine if they should be directed to applications configured for task separation, completion, and anonymization.

According to one embodiment, a set of administrators, operators, or other human personnel are able to interact with the system to perform a set of manual tasks on behalf of a user. For instance, in the case of adding a movie to a user's Netflix queue the operation can require that a user manually log-in to his Netflix account, search for the movie in question, and then add this item to his queue.

According to one embodiment, in order to enable administrators perform a set of tasks on his behalf, a user can elect to provide API access to the system, leveraging authentication delegation services. One example authentication delegation service includes the known oAuth service. Using oAuth, a user is able to approve system access to certain data and/or functions in, for example, the user's Netflix account, as well as enable delegated control via the Netflix API.

According to one embodiment, once permission is granted via oAuth, administrators are able to securely log-in through the system to a specialized administrative interface to view a queue of tasks that need to be performed on behalf of many users of the application. When a worker selects a particular task off the queue, the administrative tool will bring the administrator to a screen in which the administrator may manually perform the requested task. In the case of the Netflix example above, a specialized interface will allow administrators to search for films and add them to a user's queue—without having to visit the standard Netflix website, and without having to view a significant amount of a user's private data. Furthermore, system interfaces are configured to limit access to any information that might identify a particular user or compromise their privacy.

The system provides manual service features that limit rights to view and/or access private data while providing the features that enable a specific task to be accomplished for a user. According to some embodiments, the set of features, the anonymized workflow, and tool-set provided by the system allow end-users to delegate manual tasks to a set of administrators.

In one embodiment, the features and tool sets can be installed via a plug-in architecture that incorporates, for example, oAuth APIs, which can be obtained for a variety of webservices. The plug-in architecture can be configured to enable a set of, for example, administrators to perform a set of tasks on behalf of a user, without compromising or divulging private or personal data or account passwords.

In some alternative embodiments, the manual tasks or services can be executed by automated processes configured on the system, including for example, captures of a film available on Netflix and adding the film to a user's queue.

Figure 21:
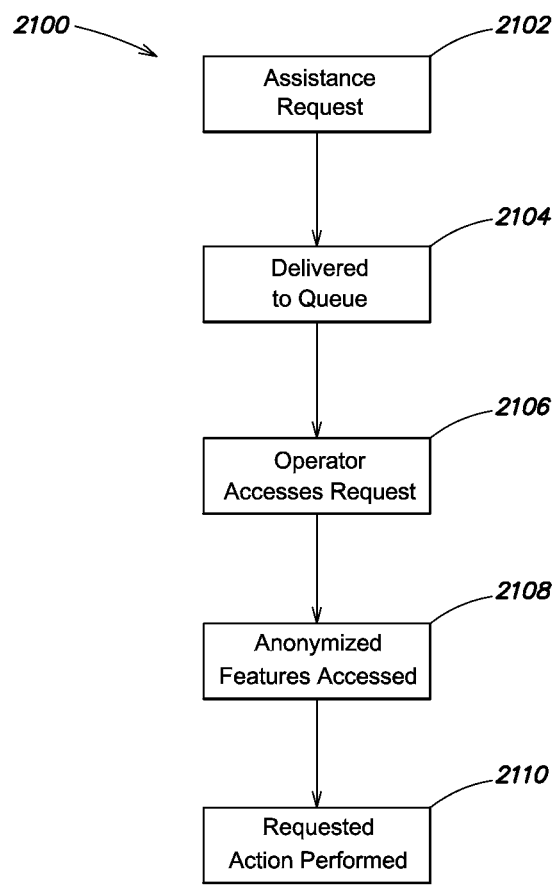
FIG. 21 illustrates an example process for integrating anonymized processing according to one embodiment of the present invention.

Shown in FIG. 21 is an example process 2100 for integrating anonymized processing by human operators, according to one embodiment. Process 2100 can begin at 2102 with a user selecting an assistance request. Assistance requests can be identified by the system for processing in an assistance request queue. In particular, the system can be configured to integrate with service providers, external information sources, etc., without the system having the capability to automatically operate features available through the service providers and/or access information on the external sources. The system can be configured to identify a request that requires a human operator and deliver the request to an assistance request queue at 2104.

At 2106, an operator can access the assistance request queue and select an assistance request to resolve. At 2108, the operator uses, for example, authentication tokens configured on the system to enable access to a service provider, information sources, etc. The authentication tokens can be specially configured to provide access to service specific functionality or information at a provider or information source. The configuration of the service specific functionality limits the operators access to the service provider and/or information source to features that do not include personal or private information of a user.

In some embodiments, the known oAuth protocol is used in conjunction with provider specific APIs. The provider specific API can be specially configured to limit access to user account. The limited access can be configured to provide access to specific features on a user account without providing access to account specific information (e.g., user address, date of birth, credit card information, payment accounts, etc). In some embodiments, the provider specific API delivers an administration user interface for accessing the user account. The administration user interface is configured to provider function specific access to the user's account. For example, a NetFlix API can be configured to provide access to movie queue management features, that allow the addition and removal of movies from a user's movie queue.

The operator is able to access features on the user's account to resolve the assistance request using the administration interface without being able to access the user specific information. In one embodiment, anonymized features are provided by the service provider or information source through the APIs, and can be accessed by the operator at 2108. The operator can then perform any operations requested by the user at 2110, as long as they are supported by the provider API.

According to some embodiments, the system can be configured to leverage the captured data and the resultant data derived through recursive extraction processing, as discussed above. In particular, some embodiments enable interaction with a powerful search and analysis that can be configured, for example, for desktop computer scenarios as well a mobile computing platforms.

According to one embodiment, the system is configured to display to users a dashboard from which users are able to perform any one or combination of the following:
 a) Perform quick and advanced searches
 b) Browse previously captured semantic entities (and resultant metadata)
 c) View and manage their devices, as well as peruse and itemize those data captured on each device
 d) Manage settings for their account
 Advanced Search Example Responsive to an entered search query, the system is configured to provide users the ability to perform complex analyses and semantic queries across captured dataset(s), as well as any derived inference(s) extracted through the aggregate dataset, where the user's aggregate dataset can include all of a user's captured items, each item's recursive semantic metadata, semantic inference(s) (e.g., based on the context information associated with the data capture), and the linkages between a user's various private and public data-sources and networks.

Figure 19:
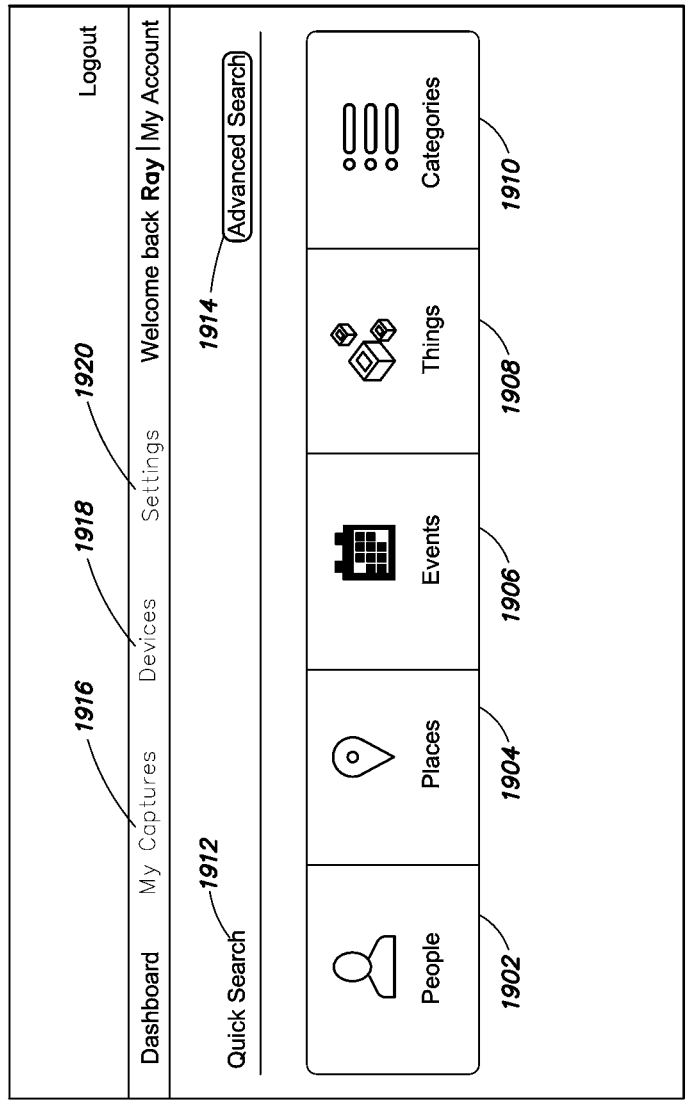
FIG. 19 illustrates an example user interface, according to one embodiment of the present invention.

According to one embodiment, the system is configured to display a series of taxonomy-specific boxes, each representing a particular facet of a high-level taxonomy used across the application in response to an entered search query. In one example, the series of taxonomy-specific boxes can include selections of any one or combination of:
 People
 Places
 Events
 Things
 My Categories Shown in FIG. 19 is an example user interface 1900 according to one embodiment. At 1902-1910 taxonomy specific selections can be made in the user interface. Responsive to selection of 1902-1910, data items associated with each can be displayed by the system, for example, in user interface 1900. According to one embodiment, interface 1900 can also be configured to provide users access to any devices configured/associated with the user 1918, access to any information captures executed by the user 1916, and access to account settings for the user 1920. The categories can be displayed for selection in a "quick search" mode 1912 (currently selected and/or presented by default) and can also be presented in an advanced search mode, reached by selecting 1914 (discussed in greater detail below).

In one embodiment, each box can be configured to display those search results related to the particular domain the enclosing box represents. In one example, within each box, a list of facets, or subcategories related to the enclosing domain, will be displayed, along with details related to the number of connections that particular item has to the search query.

According to some embodiments, the system can be configured to define a connection. Each connection represents an association between a particular facet subcategory and a semantic entity stored in the repository. In some embodiments, a subcategory's relevance to the user's search can be directly correlated to the number of connections each subcategory has to a particular captured entity. The aggregate number of connections for a particular facet represents the weight of the subcategory in context of the user's search. The weight for a subcategory can be used to order and/or filter results returned from query operations.

Figure 20A:
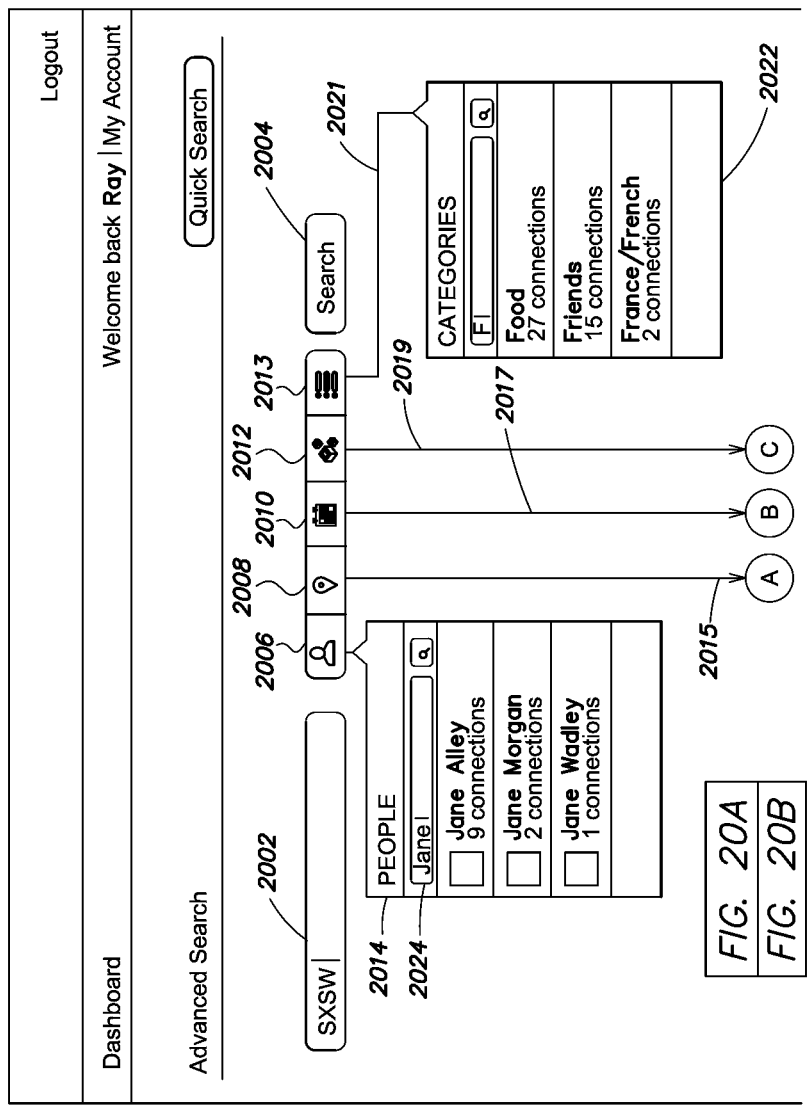
FIG. 20 illustrates an example user interface, according to one embodiment of the present invention.
Figure 20B:
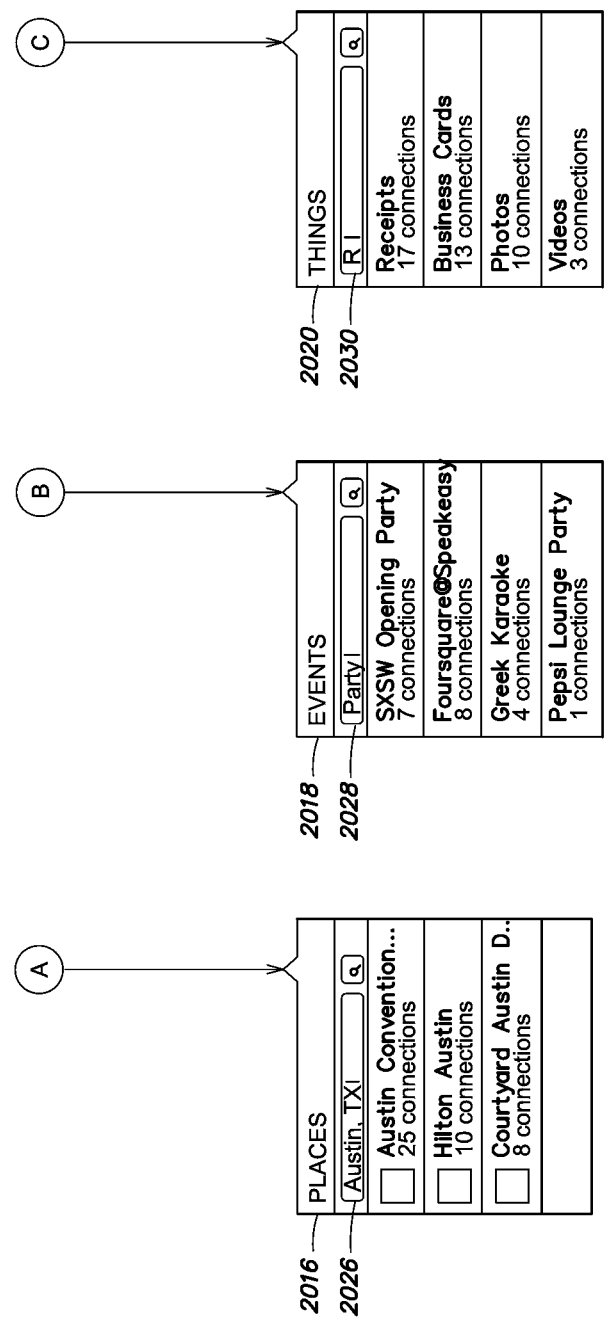

According to one embodiment an advanced search mode is configured to process text input as queries against an information repository. Shown in FIG. 20 is an example user interface for an advanced query mode. Shown at 2002 is a text input box configured to accept user entered terms that are user to generate a query on an information repository in response to selection of search at 2004. For example, searching for the conference South by Southwest, can result in grouping of the results according to five taxonomy boxes (e.g., People 2006, Places 2008, Events 2010, Things 2012, and My Categories 2013). The groupings of results can be configured to be responsive to computer focus. For example, a mouse pointer can be associated with computer focus for a user interface. By resting the mouse pointer over any one of the five taxonomy boxes a hover box can be displayed (e.g., 2014-2022). Movement of the mouse pointer away from the five taxonomy boxes can trigger the hover boxes to disappear.

According to one embodiment, hover boxes are displayed by the system responsive to a position of a user interface pointer. In some examples, each hover box contains a list of facets relevant to the particular domain displayed. Within the things facet box, subcategories such as Receipts, Business Cards, and Photos can be displayed (illustrating the existence of captured items within those facets), while within the events hover box, items such as the SXSW Opening Party, and Geek Karaoke can be displayed, indicating relevant events associated with the events domain.

In some embodiments, a colored line (e.g., 2015, 2017, 2019, and 2021) can be displayed linking each domain box with a toolbar of top-level domains, including, for example, the five high-level taxonomy items. The lines are configured to illustrating how each box relates to each of the top-level taxonomy items within the application.

At the top of each domain box, a search field can be displayed (2024-2030), allowing users to fine-tune their search query. Domain searching enables the user to further delve within the particular domain each box represents. For instance, entering the term party within the events domain search field triggers the system to executes a search across all captured entities that relate or are connected to the conference South by SouthWest, and have been analyzed to be of an event type.

To illustrate an example scenario: a user is planning to attend the South by SouthWest convention and is scheduled to present a product demonstration at the event. Typically, the user would have purchased airline tickets, booked a hotel stay, and would have scheduled a series of meetings in preparation for the presentation. Furthermore, the user could have research different events at the conference, and the system have captured multiple threads of email and Instant Message conversations related to the event, the product demonstration presentation, and even scheduled social events for when the participants have arrived at the conference.

According to one embodiment, the system can be configured to process all of these details, break the information into their most basic semantic entities, capture the information into the information repository, associate the information with the participants, and persisted and indexed the information/semantic entities for later research and discovery. In response to the user deciding to search for the term South by SouthWest, various embodiments are configured to trace the relevant semantic linkages between each of the captured entities, presenting each semantic item within one of the relevant taxonomy domains. Regardless of whether the source of a semantic entity stemmed from email, a meeting calendar entry, a purchased plane ticket, a receipt representative of a purchase for presentation materials, or an address book contact each semantic entity will be recursively analyzed, indexed, and presented within its relevant domain.

Following this example: a user can enter a quick search for a generic term or concept (such as South by SouthWest), and then be able to engage the system to narrow the search further and further to hone in on the item or area for which the user is searching. For instance, if a user is interested in figuring out what events will take place at the conference, the user can search for South by SouthWest, and view a high-level overview of all the domains that relate to the conference (e.g., as shown in FIG. 20). In one example, the user can be interested in perusing events. The system is configured to organize information into an events domain and permit the user to scroll through an events hover box, to see if it contains a relevant event. If the events hover-box does not contain the specific element the user is searching for, either the user can click on a particular facet to explore the search one level deeper, or enter a new, more specific search term within the events hover box search field in order to constrain the search to the events domain.

For example, at 2018, the user has entered the term party in order to narrow the search to party events at the South by SouthWest conference. The system can be configured to allow a user the ability to perform an additional search within a particular domain context, which can be performed at any level within the hierarchy.

In addition to performing searches across the entire semantic taxonomy, the system is configure to allow users to perform facet-specific searches, in order to view a set of results within a particular context. For example, if users are interested in querying across all their captured contacts, they can view search results as a collection of users, providing visual, image driven cues (e.g., pictures of user's faces) organized by user, illustrating each of the users related to their search query, as well as how many connections each particular user has to their search.

Similarly, the system can be configured to enable users to choose to view their search within a geographical context, by selecting the places context from within the toolbar. This action, allows users to view all the location-related semantic entities they have captured. For instance, if a user had captured notes during a series of meetings, the venue or location that encompasses this string of meetings would be visible to the user within the search results. In the same manner that the people facet can display search results in terms of facial images, the places facet can be configured to display results within the context of locations within a map. In some embodiments, selection of places can display a map with relevant locations being displayed as a pin in the map. Each pin can be associated with a hover box including detailed information on the place, which can be displayed responsive to computer focus on the pin.

In another embodiment, a reduced size map can be display next to each matching place with pins located within the reduced size map. In response to computer focus on the pin (e.g., moving a mouse pointer onto the pin) the system can be configured to display above each relevant map pin, a visual hover box element with a summary of the relevant location, as well as a list of those entities related to that particular location.

An another example, the system can be configured to enable users to perform a browse-directed analysis. According to one embodiment, the system is configured to provide a wizard-like workflow, allowing users to enter a high-level search and then step through domain-specific screens through which they can narrow their search by selecting or deselecting items or categories that relate to their search within a particular domain. In some embodiments, this feature can be useful for scenarios in which a user is not looking for an entity within a specific domain, but instead wishes to join information from entities across multiple domains.

In another user scenario: a user first selects the people domain from the dashboard toolbar, for example, as discussed above. Then, the user searches for a high-level term, such as a first or last name, a conference, or a category. After entering the search, a list of people that are associated to the entered search are returned by the system and displayed on the screen. Each person entity can be represented in a visual context, allowing users to peruse the people returned by the search by scrolling through faces, contact, and context information. The system can be further configured to enable users to select or deselect those people that they would like to include in their query. Once the user has made their selection(s), the user can click continue to show the next domain that contains entities that match their search query and any selection(s) made in previous screens.

For example, if the user had searched for the term conference (and perhaps the user had attended CES 2010 the previous year, but the user was planning to attend South by SouthWest this year), and had selected contacts (in the first screen) that had accompanied them on their trip, then the resulting screen in the workflow would show a places-driven context, allowing users to view relevant entities that relate to the places domain. According to one embodiment, the system stored information on the user's pervious travel with the contacts selected in the first screen to CES 2010 and South by SouthWest in 2009. That stored information is accessible by the user and further can be narrowed to the same set of contacts previously traveled with, but further narrowed to just CES 2010 contacts by selecting the location that matched what they were interested in exploring.

The system can be configured to permit iterative selections of results in any domain and/or across domains, allowing users to fine-tune their search further and further until they reach a level of granularity and relevance that matches the user's interest. In some implementations, the goal is to provide feedback to users as they further constrain their search. The result at each level of exploration can be presented to users limited to those entities that fit within the intersection of all the previous selections a user has made. According to one embodiment, the system can be configured to respond to a user selection of four specific co-workers, the location CES 2010, and the Treasure Island Casino, by generating a result set with those entities that directly relate to all the selections made by the user.

None of the claims set forth below are intended to be limited to any particular implementation of the system unless such claim includes a limitation explicitly reciting a particular implementation. It should be appreciated that the invention is not limited to executing on any particular system or group of systems. Also, it should be appreciated that the invention is not limited to any particular distributed architecture, network, or communication protocol.

The invention claimed is:

1. A system for facilitating metadata capture and analysis, the system comprising:
   at least one processor operatively connected to a memory, the processor configured to execute a plurality of system components, the plurality of system components comprising:
   a communication component configured to receive an information capture event, wherein the information capture event includes a captured content item and content metadata;
   an analysis component configured to determine semantic information for the captured content item, wherein the semantic information for the captured content item includes a context associated with the captured content item;
   a discovery component configured to discover any associated information for the information capture event; and
   an association component configured to store the content item and relationships between any discovered associated information.

2. The system according to claim 1, wherein the association component is further configured to store the relationship to any respective associated information as at least one semantic entity.

3. The system according to claim 2, wherein the association component is further configured to store the at least one semantic entity as at least a data triple, wherein the data triple defines an object, predicate, object stored as uniform resource identifier ("URI") or literal values.

4. The system according to claim 1, wherein the plurality of system components further comprises an extraction component configured to extract additional metadata from the captured content item.

5. The system according to claim 4, wherein the extraction component is further configured to process the captured content item based on a content type.

6. The system according to claim 5, wherein the content type includes at least one of illustration, notes, document, business card, meeting audio, and user defined.

7. The system according to claim 4, wherein the discovery component is further configured to discover any associated information for the information capture event based on the extracted additional metadata.

8. The system according to claim 1, further comprising a prediction component configured to predict at least one possible context for an information capture event.

9. The system according to claim 8, wherein the prediction component is further configured to predict the at least one possible context in response to received location information.

10. The system according to claim 1, wherein the communication component is further configured to communicate a possible context for the information capture event to a user.

11. The system according to claim 10, wherein the communication component is further configured to receive a selection of the possible context from a user.

12. The system according to claim 1, wherein the analysis component is further configured to determine the context of an information capture event in response to user input.

13. The system according to claim 1, wherein the analysis component is further configured to determine a semantic entity type for the captured content item.

14. The system according to claim 1, further comprising a recommendation component configured to generate recommendations.

15. The system according to claim 14, wherein the recommendation component is further configured to identify user events and associated information for the user events.

16. The system according to claim 15, wherein the recommendation component is further configured to generate the recommendations based, at least in part, on identified semantic connections between the user event and associated information.

17. The system according to claim 15, wherein the recommendation component is further configured to generate recommendations for subsequent user events based on determining context for a preceding user event.

18. A computer implemented method for facilitating metadata capture and analysis, the method comprising:
   receiving, by a computer server, an information capture event from a user, wherein the information capture event includes a captured content item and content metadata;
   determining, by the computer server, semantic information for the captured content item, wherein the semantic information for the captured content item includes a context associated with the captured content item;
   discovering, by the computer server, any associated information for the information capture event; and
   storing, by the computer server, the content item and relationships between any discovered associated information.

19. The method according to claim 18, wherein the act of storing the content item and the relationships between any discovered associated information includes an act of storing the content item and the relationships between any discovered associated information as at least one semantic entity.

20. The method according to claim 19, wherein the act of storing the content item and relationships between any discovered associated information as the at least one semantic entity includes storing the at least one semantic entity as at least a data triple, wherein the data triple defines an object, predicate, and subject stored as URI or literal values.

21. The method according to claim 18, further comprising an act of extracting additional metadata from the captured content item.

22. The method according to claim 21, wherein the act of extracting additional metadata from the captured content item includes an act of processing the captured content item based on a content type.

23. The method according to claim 22, wherein the content type includes at least one of illustration, notes, document, business card, meeting audio, and user defined.

24. The method according to claim 21, wherein the act of discovering any associated information for the information capture event includes an act of discovery the any associated information for the information capture event based on the extracted additional metadata.

25. The method according to claim 18, further comprising an act of predicting at least one possible context for an information capture event.

26. The method according to claim 25, wherein the act of predicting is responsive to received location information.

27. The method according to claim 18, further comprising an act of communicating a possible context for the information capture event to the user.

28. The method according to claim 27, further comprising an act of receiving a selection of the possible context from the user.

29. The method according to claim 18, wherein the act of determining the semantic information for the captured content item including the context associated with the captured content item, includes an act of determining the context of an information capture event responsive to user input.

30. The method according to claim 18, further comprising an act of determining a semantic entity type for the captured content item.

31. The method according to claim 18, further comprising an act generating recommendations for a user.

32. The method according to claim 31, wherein the act of generating recommendations for the user includes an act of identifying user events and associated information for the user events.

33. The method according to claim 32, wherein the act of generating the recommendations for the user includes an act of generating the recommendations based, at least in part, on identified semantic connections between the user event and associated information.

34. The method according to claim 32, further comprising an act of generating recommendations for subsequent user events based on determining the context for a preceding user event.

35. The method according to claim 18, wherein the act of discovering any associated information includes discovering at least one of existing information in an information repository associated with the information capture event and external information associated with the information capture event, and
    wherein the method further comprises an act of generating semantic entities based on the semantic information for the captured content item and the associated information.

36. The method according to claim 35, further comprising an act of executing, anonymously, service requests received from the user on an external user account.

\* \* \* \* \*